(12) United States Patent
Rhe et al.

(10) Patent No.: US 10,845,908 B2
(45) Date of Patent: *Nov. 24, 2020

(54) TOUCH DISPLAY DEVICE

(71) Applicant: LG Display Co., Ltd., Seoul (KR)

(72) Inventors: Ruda Rhe, Seoul (KR); JiHyun Jung, Paju-si (KR); DeukSu Lee, Paju-si (KR); SuChang An, Seoul (KR); JaeGyun Lee, Paju-si (KR); Hyangmyoung Gwon, Paju-si (KR); Yangsik Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 16 days.

This patent is subject to a terminal disclaimer.

(21) Appl. No.: 16/365,428

(22) Filed: Mar. 26, 2019

(65) Prior Publication Data

US 2019/0302944 A1 Oct. 3, 2019

(30) Foreign Application Priority Data

Apr. 3, 2018 (KR) .......................... 10-2018-0038673

(51) Int. Cl.
*G06F 3/041* (2006.01)
*G06F 3/047* (2006.01)
*G06F 3/0488* (2013.01)

(52) U.S. Cl.
CPC ............ *G06F 3/0412* (2013.01); *G06F 3/047* (2013.01); *G06F 3/0488* (2013.01)

(58) Field of Classification Search
CPC . G06F 2203/04103; G06F 2203/04112; G06F 3/0412; G06F 3/04164; G06F 3/04166; G06F 3/0443; G06F 3/0445; G06F 3/0446; G06F 3/047; G06F 3/0488
See application file for complete search history.

(56) References Cited

U.S. PATENT DOCUMENTS

| 2014/0253498 | A1* | 9/2014 | Suzuki | ..................... G06F 3/044 |
| | | | | 345/174 |
| 2017/0003775 | A1* | 1/2017 | Hu | ........................ G06F 3/0412 |
| 2019/0302934 | A1* | 10/2019 | Rhe | ......................... G06F 3/044 |
| 2019/0302943 | A1* | 10/2019 | Rhe | ......................... G06F 3/047 |

* cited by examiner

*Primary Examiner* — Afroza Chowdhury
(74) *Attorney, Agent, or Firm* — Fenwick & West LLP

(57) ABSTRACT

The present disclosure relates to a touch display device and a touch sensing method and, more specifically, to a touch display device and a touch sensing method that provide a single-layered touch sensor structure by a touch electrode connecting line that electrically connects touch electrodes arranged in one direction and is arranged to bypass and surround touch electrodes arranged in another direction, thereby enabling a simple manufacturing process, a high manufacturing yield, and a low manufacturing cost.

19 Claims, 39 Drawing Sheets

FIG.13

| Layer | Single Layer |
|---|---|
| T-BUF | T-BUF / E2 / ENCAP |
| Mask #1 (TSM) | TSM / T-BUF / E2 / ENCAP |
| Mask #2 | |
| Mask #3 | |
| Mask #4 (Passivation) | TSM / T-BUF / E2 / ENCAP / PAC |

FIG.22

TOUCH DISPLAY DEVICE

CROSS REFERENCE TO RELATED APPLICATION

This application claims priority from Republic of Korea Patent Application No. 10-2018-0038673, filed on Apr. 3, 2018, which is hereby incorporated by reference in its entirety.

BACKGROUND

1. Field of Technology

The present disclosure relates to a touch display device and a touch sensing method.

2. Description of the Prior Art

A touch display device may provide a touch-based input function that allows a user to easily input information or commands intuitively and conveniently, as well as a function of displaying videos or images.

In order to provide a touch-based input function, the touch display device is required to recognize whether or not a user's touch is performed and is required to sense touch coordinates accurately. To this end, the touch display device includes a touch panel having a touch sensor structure.

The touch panel has a touch sensor structure including a plurality of touch electrodes and a plurality of touch routing lines for connecting the touch electrodes to a touch sensing circuit.

Since the touch panel has a touch sensor structure that is complicated or requires a plurality of layers, the manufacturing process of the touch panel may be complicated, the manufacturing yield of the touch panel may be low, or the manufacturing cost may increase.

The touch panel has a plurality of touch pads electrically connected to the touch sensing circuit. The number of touch channels or the number of touch electrodes may be increased due to an increase in the size of the touch panel or the like, thereby increasing the number of touch pads. The increase in the number of touch pads makes it difficult to design the pad area.

SUMMARY

In view of the above background, it is an aspect of the embodiments of the present disclosure to provide a touch display device having a touch sensor structure that enables a simple manufacturing process, a high manufacturing yield, and a low manufacturing cost, and a touch sensing method thereof.

It is another aspect of the embodiments of the present disclosure to provide a touch display device having a single-layered touch sensor structure and a touch sensing method thereof.

It is another aspect of the embodiments of the present disclosure to provide a touch display device having a touch sensor structure capable of reducing the number of mask processes and a touch sensing method thereof.

It is another aspect of the embodiments of the present disclosure to provide a touch display device having a touch sensor structure capable of reducing the number of touch pads and a touch sensing method thereof.

It is another aspect of the embodiments of the present disclosure to provide a touch display device and a touch sensing method capable of preventing deterioration of touch sensitivity even if there is a difference in the length between the signal transmission paths in a touch sensor structure.

It is another aspect of the embodiments of the present disclosure to provide a touch display device and a touch sensing method capable of eliminating the imbalance in the area between the touch electrodes in the central area, thereby improving touch sensitivity.

According to one aspect, embodiments of the present disclosure may provide a touch display device that includes: a display panel having a plurality of subpixels arranged therein and having a plurality of touch electrodes arranged therein; and a touch sensing circuit configured to supply a touch driving signal to the display panel and configured to detect a touch sensing signal to thus sense whether or not a touch is performed or a touch position.

The plurality of touch electrodes may constitute m X-touch electrode lines and n Y-touch electrode lines arranged to intersect each other, where m may be an even number as a natural number of 2 or more and n may be an even number or an odd number as a natural number of 2 or more.

The m X-touch electrode lines may include m/2 first X-touch electrode lines and m/2 second X-touch electrode lines arranged in a first area and a second area, respectively, which are obtained by dividing the display panel in a first direction.

Each of the m/2 first X-touch electrode lines may include a plurality of first X-touch electrodes arranged in the first direction, among the plurality of touch electrodes, and a plurality of first X-touch electrode connecting lines configured to electrically connect the plurality of first X-touch electrodes to each other.

Each of the m/2 second X-touch electrode lines may include a plurality of second X-touch electrodes arranged in the first direction, among the plurality of touch electrodes, and a plurality of second X-touch electrode connecting lines configured to electrically connect the plurality of second X-touch electrodes to each other.

In the case where n is an odd number, the n Y-touch electrode lines may include a central Y-touch electrode line arranged in the center, n1 (n1 is a natural number of 1 or more) Y-touch electrode lines arranged in the first area at one side of the central Y-touch electrode line, and n2 (n2 is a natural number of 1 or more, where n1+n2+1=n and n1=n2) Y-touch electrode lines arranged in the second area at the other side of the central Y-touch electrode line.

The central Y-touch electrode line may include a plurality of Y-touch electrodes arranged in the same column in the second direction and a plurality of Y-touch electrode connecting lines configured to electrically connect the plurality of Y-touch electrodes arranged in the same column in the second direction.

Each of the n1 Y-touch electrode lines may include a plurality of Y-touch electrodes arranged in the same column in the second direction in the first area and a plurality of Y-touch electrode connecting lines configured to electrically connect the plurality of Y-touch electrodes arranged in the same column in the second direction in the first area.

Each of the n2 Y-touch electrode lines may include a plurality of Y-touch electrodes arranged in the same column in the second direction in the second area and a plurality of Y-touch electrode connecting lines configured to electrically connect the plurality of Y-touch electrodes arranged in the same column in the second direction in the second area.

A Y-touch electrode connecting line configured to electrically connect the first Y-touch electrode and the second Y-touch electrode, which are adjacent to each other, among a plurality of Y-touch electrodes included in the Y-touch electrode line arranged at the outermost position on one side, among the n1 Y-touch electrode lines arranged in the first area, may be arranged so as to surround the whole or a part of one first X-touch electrode line arranged in the first area.

A Y-touch electrode connecting line configured to electrically connect a third Y-touch electrode and a fourth Y-touch electrode, which are adjacent to each other, among a plurality of Y-touch electrodes included in the Y-touch electrode line arranged at the outermost position on the other side, among the n2 Y-touch electrode lines arranged in the second area, may be arranged so as to surround the whole or a part of one second X-touch electrode line arranged in the second area.

The first X-touch electrodes adjacent to the central Y-touch electrode line, among the first X-touch electrodes arranged at the outermost positions on both sides in the plurality of first X-touch electrodes included in each of the m/n2 first X-touch electrode lines, may have an area greater than the first X-touch electrodes arranged at the outermost positions on the opposite side, and may have an area equal or corresponding to the first X-touch electrodes, which are not arranged at the outermost positions on both sides.

The second X-touch electrodes adjacent to the central Y-touch electrode line, among the second X-touch electrodes arranged at the outermost positions on both sides in the plurality of second X-touch electrodes included in each of the m/2 second X-touch electrode lines, may have an area greater than the second X-touch electrodes arranged at the outermost positions on the opposite side, and may have an area equal or corresponding to the second X-touch electrodes, which are not arranged at the outermost positions on both sides.

A Y-touch electrode connecting line configured to electrically connect a fifth Y-touch electrode and a sixth Y-touch electrode, which are adjacent to each other, among a plurality of Y-touch electrodes included in a Y-touch electrode line adjacent to a Y-touch electrode line arranged at the outermost position on one side in the first area, among the n Y-touch electrode lines, may be arranged so as to surround a part of a first X-touch electrode line surrounded by a Y-touch electrode connecting line configured to electrically connect the first Y-touch electrode and the second Y-touch electrode.

A Y-touch electrode connecting line configured to electrically connect a seventh Y-touch electrode and an eighth Y-touch electrode, which are adjacent to each other, among a plurality of Y-touch electrodes included in a Y-touch electrode line adjacent to a Y-touch electrode line arranged at the outermost position on the other side in the second area, among the n Y-touch electrode lines, may be arranged so as to surround a part of a second X-touch electrode line surrounded by a Y-touch electrode connecting line configured to electrically connect the third Y-touch electrode and the fourth Y-touch electrode.

Y-touch electrode connecting lines included the central Y-touch electrode line may have totally different arrangement from the Y-touch electrode connecting lines included the n1 Y-touch electrode lines arranged in the first area and the Y-touch electrode connecting lines included in the n2 Y-touch electrode lines arranged in the second area.

Each of the Y-touch electrode connecting lines included the n1 Y-touch electrode lines arranged in the first area and each of the Y-touch electrode connecting lines included in the n2 Y-touch electrode lines arranged in the second area make a long detour so as to electrically connect two neighboring Y-touch electrodes.

However, each of the plurality of Y-touch electrode connecting lines included in the central Y-touch electrode line electrically connects two neighboring Y-touch electrodes without making a long detour.

A plurality of Y-touch electrode connecting lines included in the central Y-touch electrode line may be arranged between the first area where the m/2 first X-touch electrode lines are arranged and the second area where the m/2 second X-touch electrode lines are arranged.

The Y-touch electrode connecting lines included in the n1 Y-touch electrode lines arranged in the first area and the Y-touch electrode connecting lines included in the n2 Y-touch electrode lines arranged in the second area may be arranged symmetrically or to correspond to each other with respect to the central Y-touch electrode line.

A Y-touch electrode connecting line configured to electrically connect the first Y-touch electrode and the second Y-touch electrode, among a plurality of Y-touch electrodes included in a Y-touch electrode line arranged at the outermost position, among the Y-touch electrode lines arranged in the first area, may be arranged so as to surround the whole or a part of the first X-touch electrode line arranged between the first Y-touch electrode and the second Y-touch electrode.

A Y-touch electrode connecting line configured to electrically connect the ninth Y-touch electrode and the tenth Y-touch electrode arranged with the third X-touch electrode line under the first X-touch electrode line interposed therebetween, among a plurality of Y-touch electrodes included in a Y-touch electrode line arranged closest to the second area, among the Y-touch electrode lines arranged in the first area, may be arranged so as to surround the whole or a part of the third X-touch electrode line.

The Y-touch electrode connecting line arranged so as to surround the whole or a part of the third X-touch electrode line may have a length different from the length of the Y-touch electrode connecting line arranged to so as surround the whole or a part of the first X-touch electrode line.

Each of the plurality of touch electrodes may be a plate-type electrode without openings, and in this case, may be a transparent electrode.

Alternatively, each of the plurality of touch electrodes may be an electrode metal patterned in the form of a mesh to have two or more openings, and each of the two or more openings may correspond to a light-emitting area of one or more subpixels.

The electrode metal corresponding to each of the plurality of touch electrodes may be provided on a bank arranged in an area other than the light-emitting area of the two or more subpixels.

The plurality of first X-touch electrode connecting lines, the plurality of second X-touch electrode connecting lines, and the plurality of Y-touch electrode connecting lines may be provided on a bank arranged in an area other than the light-emitting area of the plurality of subpixels.

Each of the plurality of touch electrodes may have a multi-layered structure, and a transparent electrode may be patterned on or under the electrode metal.

Each of the plurality of Y-touch electrode connecting lines may be arranged along the path corresponding to the outlines of all or some of a plurality of first X-touch electrodes included in the first X-touch electrodes line surrounded by the Y-touch electrode connecting line.

A blank area, in which no Y-touch electrode connecting line is arranged, may be provided around a plurality of first X-touch electrodes included in the first X-touch electrode line, and one or more additional patterns may be arranged in the blank area.

The numbers of Y-touch electrode connecting lines arranged around the plurality of first X-touch electrodes included in the first X-touch electrode line may be different from each other, and the numbers of additional patterns arranged in the blank area around the plurality of first X-touch electrodes included in the first X-touch electrode line may be different from each other depending on the different numbers of Y-touch electrode connecting lines.

The one or more additional patterns may be in a voltage state corresponding to the touch driving signal or the touch sensing signal, in a voltage state in which a ground voltage or a specific voltage is applied, or in a floating voltage state.

The one or more additional patterns may be electrically connected to Y-touch electrode connecting lines or X-touch electrode connecting lines arranged therearound.

The m X-touch electrode lines may be driving touch electrode lines to which the touch driving signal is applied, and the n Y-touch electrode lines may be sensing touch electrode lines where the touch sensing signal is detected.

Alternatively, the n Y-touch electrode lines may be driving touch electrode lines to which the touch driving signal is applied, and the m X-touch electrode lines may be sensing touch electrode lines where the touch sensing signal is detected.

The frequencies of the touch driving signals applied to one or more of the m X-touch electrode lines may be different from each other, or the frequencies of the touch driving signals applied to one or more of the n Y-touch electrode lines may be different from each other.

As the X-touch electrode line has a longer X-touch electrode connecting line or has a longer X-touch routing line configured to connect the touch sensing circuit, among the m X-touch electrode lines, the frequency of the touch driving signal may be low.

As the Y-touch electrode line has a longer Y-touch electrode connecting line or has a longer Y-touch routing line configured to connect the touch sensing circuit, among the n Y-touch electrode lines, the frequency of the touch driving signal may be low.

The display panel may further include an encapsulation portion arranged on the light-emitting device included in each of the plurality of subpixels.

The m X-touch electrode lines and the n Y-touch electrode lines may be arranged in a single layer positioned on the encapsulation portion.

The display panel may include an active area where an image is displayed and a non-active area outside the active area.

The display panel may include: at least one dam positioned in the non-active area or positioned at a boundary between the active area and the non-active area; a plurality of X-touch routing lines electrically connected to the m X-touch electrode lines, respectively; a plurality of X-touch pads electrically connected to the plurality of X-touch routing lines and arranged in the non-active area; a plurality of Y-touch outing lines configured to electrically connect each of the n Y-touch electrode lines; and a plurality of Y-touch pads electrically connected to the plurality of Y-touch routing lines and arranged in the non-active area.

The plurality of X-touch routing lines and the plurality of Y-touch routing lines pass over the side of the encapsulation portion and the top of the at least one dam so as to be electrically connected to the plurality of X-touch pads and the plurality of Y-touch pads positioned in the non-active area.

The encapsulation portion may include two or more inorganic encapsulation layers and one or more organic encapsulation layers provided between the two or more inorganic encapsulation layers.

The one or more organic encapsulation layers may be provided at one side of the at least one dam or may be provided at one side and on the top of the at least one dam.

According to another aspect, the embodiments of the present disclosure may provide a touch sensing method that includes: supplying a touch driving signal to a plurality of driving touch electrodes by a touch sensing circuit; detecting a touch sensing signal from a plurality of sensing touch electrodes by the touch sensing circuit; and sensing whether or not a touch is performed or a touch position on the basis of the touch sensing signal by the touch sensing circuit.

The length of a path through which the touch driving signal is transmitted from the touch sensing circuit to a first driving touch electrode of the plurality of driving touch electrodes may be different from the length of a path through which the touch driving signal is transmitted from the touch sensing circuit to a second driving touch electrode of the plurality of driving touch electrodes.

A touch driving signal supplied to the first driving touch electrode and a touch driving signal supplied to the second driving touch electrode may have different frequencies from each other.

According to another aspect, the embodiments of the present disclosure may provide a touch display device that includes: m X-touch electrode lines; and n Y-touch electrode lines arranged to intersect the m X-touch electrode lines, where m is an even number as a natural number of 2 or more and n is an even number or an odd number as a natural number of 2 or more.

Each of the m X-touch electrode lines may include a plurality of X-touch electrodes arranged in a first direction and a plurality of X-touch electrode connecting lines configured to electrically connect the plurality of X-touch electrodes to each other.

Each of the n Y-touch electrode lines may include a plurality of Y-touch electrodes arranged in a second direction different from the first direction and a plurality of Y-touch electrode connecting lines configured to electrically connect the plurality of Y-touch electrodes to each other.

The plurality of Y-touch electrode connecting lines configured to electrically connect the plurality of Y-touch electrodes arranged in the second direction to each other and the plurality of X-touch electrode connecting lines configured to electrically connect the plurality of X-touch electrodes arranged in the first direction to each other may be provided in the same layer.

The plurality of Y-touch electrode connecting lines configured to electrically connect the plurality of Y-touch electrodes arranged in the second direction to each other may include a Y-touch electrode connecting line arranged so as to bypass in the first direction and surround one or more X-touch electrodes to thus connect two Y-touch electrodes, which are adjacent to each other in the second direction, and a Y-touch electrode connecting line configured to directly connect two Y-touch electrodes, which are adjacent to each other in the second direction.

The Y-touch electrode connecting line arranged so as to bypass in the first direction and surround one or more X-touch electrodes to thus connect two Y-touch electrodes, which are adjacent to each other in the second direction may include a portion arranged in parallel with the plurality of X-touch electrode connecting lines and a portion arranged in parallel with the outlines of the plurality of X-touch electrodes arranged in the first direction.

The plurality of Y-touch electrode connecting lines configured to electrically connect the plurality of Y-touch electrode arranged in the second direction may include a Y-touch electrode connecting line arranged to make a detour in the first direction from the first Y-touch electrode so as to surround one or more first X-touch electrodes to thus connect the first Y-touch electrode and the second Y-touch electrode adjacent to the first Y-touch electrode in the second direction and a Y-touch electrode connecting line arranged to make a detour in a direction opposite the flint direction from the second Y-touch electrode so as to surround one or more second X-touch electrodes to thus connect the second Y-touch electrode and the third Y-touch electrode adjacent to the second Y-touch electrode in the second direction.

According to the embodiments of the present disclosure described above, it is possible to provide a touch display device having a touch sensor structure that enables a simple manufacturing process, a high manufacturing yield, and a low manufacturing cost, and a touch sensing method thereof.

According to the embodiments of the present disclosure, it is possible to provide a touch display device having a single-layered touch sensor structure and a touch sensing method thereof.

According to the embodiments of the present disclosure, it is possible to provide a touch display device having a touch sensor structure capable of reducing the number of mask processes and a touch sensing method thereof.

According to the embodiments of the present disclosure, it is possible to provide a touch display device having a touch sensor structure capable of reducing the number of touch pads and a touch sensing method thereof.

According to the embodiments of the present disclosure, it is possible to provide a touch display device and a touch sensing method capable of preventing deterioration of touch sensitivity even if there is the difference in the length between the signal transmission paths in a touch sensor structure.

According to the embodiments of the present disclosure, it is possible to provide a touch display device and a touch sensing method capable of improving touch sensitivity by eliminating the imbalance in the area between the touch electrodes in the central area.

BRIEF DESCRIPTION OF THE DRAWINGS

The above and other aspects, features, and advantages of the present disclosure will be more apparent from the following detailed description taken in conjunction with the accompanying drawings, in which:

FIG. 13 is a view illustrating a process of implementing a single-layered touch sensor structure on a display panel according to embodiments of the present disclosure;

FIGS. 20 to 22 are views illustrating a fourth example of a single-layered touch sensor structure in a display panel according to embodiments of the present disclosure;

DETAILED DESCRIPTION

Figure 1:
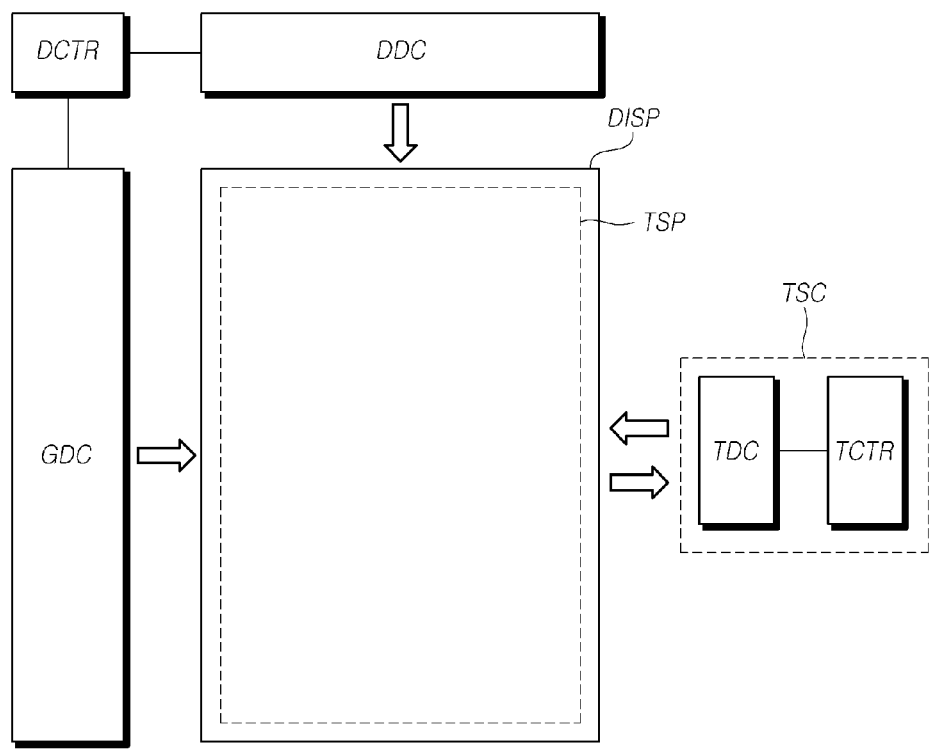
FIG. 1 is a view illustrating the system configuration of a touch display device according to embodiments of the present disclosure.

Hereinafter, some embodiments of the present disclosure will be described in detail with reference to the accompanying drawings. In the drawings, like reference numerals may be used to denote like elements throughout the drawings even if they are shown in different drawings. In the following description, a detailed and related description of known configurations or functions, which may obscure the subject matter of the present disclosure, will be omitted.

In addition, terms, such as "first", "second", "A", "B", "(a)", "(b)", or the like, may be used to describe elements of the present disclosure. These terms are intended to distinguish a specific element from other elements and are not intended to limit the nature, order, sequence, or number of the elements. The case where an element is described as being "coupled", "combined", or "connected" to another element must be construed as the case where another element is "interposed" between the elements or the elements is "coupled", "combined", or "connected" to each other via another element, as well as the case where an element is directly coupled or connected to another element.

FIG. 1 is a view illustrating the system configuration of a touch display device according to embodiments of the present disclosure.

Referring to FIG. 1, a touch display device according to embodiments of the present disclosure may provide both a function for displaying an image and a function for touch sensing.

In order to provide an image display function, the touch display device according to embodiments of the present disclosure may include a display panel (DISP) on which a plurality of data lines and a plurality of gate lines are arranged and on which a plurality of subpixels defined by the plurality of data lines and the plurality of gate lines are arranged, a data driving circuit (DDC) for driving the plurality of data lines, a gate driving circuit (GDC) for driving the plurality of gate lines, and a display controller (DCTR) for controlling operations of the data driving circuit (DDC) and the gate driving circuit (GDC).

Each of the data driving circuit (DDC), the gate driving circuit (GDC), and the display controller (DCTR) may be implemented as one or more discrete components. In some cases, two or more of the data driving circuit (DDC), the gate driving circuit (GDC), and the display controller (DCTR) may be integrated into one component. For example, the data driving circuit (DDC) and the display controller (DCTR) may be implemented as a single integrated circuit chip (IC Chip).

In order to provide a touch sensing function, the touch display device according to embodiments of the present disclosure may include a touch panel (TSP) including a plurality of touch electrodes and a touch sensing circuit (TSC) for supplying a touch driving signal to the touch panel (TSP), detecting a touch sensing signal from the touch panel (TSP), and sensing whether or not a user's touch is performed or a touch position (touch coordinates) on the touch panel (TSP) on the basis of the detected touch sensing signal.

The touch sensing circuit (TSC), for example, may include a touch driving circuit (TDC) for supplying a touch driving signal to the touch panel (TSP) and detecting a touch sensing signal from the touch panel (TSP) and a touch controller (TCTR) for sensing whether or not a user's touch is performed and/or a touch position on the touch panel (TSP) on the basis of the touch sensing signal detected by the touch driving circuit (TDC).

The touch driving circuit (TDC) may include a first circuit part for supplying a touch driving signal to the touch panel (TSP) and a second circuit part for detecting a touch sensing signal from the touch panel (TSP).

The touch driving circuit (TDC) and the touch controller (TCTR) may be implemented as separate components, or in some cases, may be integrated into one component.

Each of the data driving circuit (DDC), the gate driving circuit (GDC), and the touch driving circuit (TDC) may be implemented as one or more integrated circuits and, in terms of electrical connection with the display panel (DISP), may be implemented as a chip-on-glass (COG) type, a chip-on-film (COF) type, a tape carrier package (TCP) type, and the like. The gate driving circuit (GDC) may also be implemented as a gate-in-panel (GIP) type.

The respective circuit configurations (DDC, GDC, and DCTR) for driving the display and the respective circuit configurations (TDC and TCTR) for touch sensing may be implemented as one or more discrete components. In some cases, one or more of the circuit configurations (DDC, GDC, and DCTR) for driving the display and the circuit configurations (TDC and TCTR) for touch sensing may be functionally integrated into one or more components. For example, the data driving circuit (DDC) and the touch driving circuit (TDC) may be integrated into one or more integrated circuit chips. In the case where the data driving circuit (DDC) and the touch driving circuit (TDC) are integrated into two or more integrated circuit chips, the two or more integrated circuit chips may have a data driving function and a touch driving function, respectively.

The touch display device according to embodiments of the present disclosure may be various types of display devices such as an organic light-emitting display device, a liquid crystal display device, or the like. Hereinafter, for the convenience of explanation, a description will be made of an example in which the touch display device is an organic light-emitting display device. That is, although the display panel (DISP) may be various types of display panels, such as an organic light-emitting display panel, a liquid crystal display panel, or the like, the following description will be made of an example in which the display panel (DISP) is an organic light-emitting display panel for the convenience of explanation.

As will be described later, the touch panel (TSP) may include a plurality of touch electrodes, to which a touch driving signal is applied or from which a touch sensing signal is detected, and a plurality of touch routing lines for connecting the plurality of touch electrodes to the touch driving circuit (TDC).

The touch panel (TSP) may be provided outside the display panel (DISP). That is, the touch panel (TSP) and the display panel (DISP) may be separately manufactured and combined with each other. This touch panel (TSP) is referred to as an "external type" or "add-on type" touch panel.

Alternatively, the touch panel (TSP) may be embedded in the display panel (DISP). That is, a touch sensor structure, such as a plurality of touch electrodes, a plurality of touch routing lines, and the like, constituting the touch panel (TSP) may be formed together with electrodes and signal lines for driving the display in manufacturing the display panel (DISP). Such a touch panel (TSP) is called an "embedded-type touch panel". Hereinafter, for the convenience of explanation, the embedded-type touch panel (TSP) will be described as an example.

Figure 2:
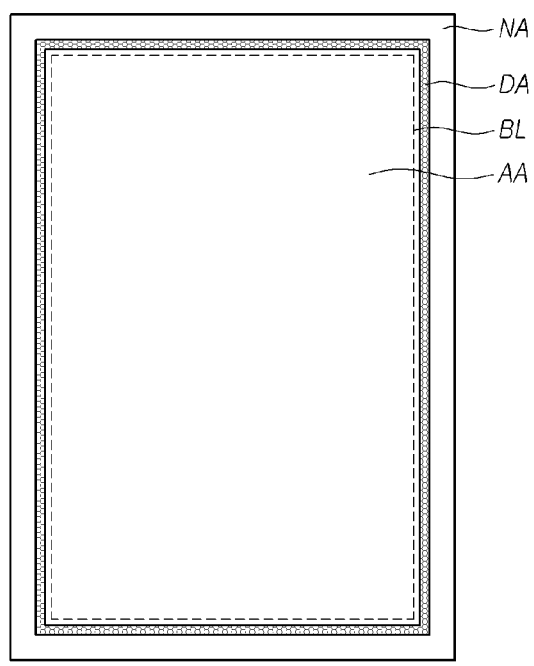
FIG. 2 is a view schematically illustrating a display panel of a touch display device according to embodiments of the present disclosure.

FIG. 2 is a view schematically illustrating a display panel (DISP) of a touch display device according to embodiments of the present disclosure.

Referring to FIG. 2, the display panel (DISP) may include an active area (AA) in which an image is displayed and a non-active area (NA) that is an outer area of an outer boundary line (BL) of the active area (AA).

In the active area (AA) of the display panel (DISP), a plurality of subpixels for displaying images are arranged and various electrodes and signal lines for driving the display are arranged.

In addition, a plurality of touch electrodes for touch sensing and a plurality of touch routing lines electrically connected to the touch electrodes may be arranged in the active area (AA) of the display panel (DISP). Accordingly, the active area (AA) may be referred to as a "touch sensing area" in which a touch is able to be sensed.

In the non-active area (NA) of the display panel (DISP), link lines, which are extensions of various signal lines arranged in the active area (AA), or link lines electrically connected to various signal lines arranged in the active area (AA) and pads electrically connected to the link lines may be arranged. The pads arranged in the non-active area (NA) may be bonded or electrically connected to the display driving circuits (DDC, GDC, or the like).

In addition, in the non-active area (NA) of the display panel (DISP), link lines, which are extensions of a plurality of touch routing lines arranged in the active area (AA), or link lines electrically connected to a plurality of touch routing lines arranged in the active area (AA) and pads electrically connected to the link lines may be arranged. The pads arranged in the non-active area (NA) may be bonded or electrically connected to the touch driving circuit (TDC).

An extended portion of a part of the outermost touch electrode, among the plurality of touch electrodes arranged in the active area (AA), may be in the non-active area (NA), and one or more touch electrodes of the same material as the plurality of touch electrodes arranged in the active area (AA) may be further arranged in the non-active area (NA). That is, the plurality of touch electrodes arranged in the display panel (DISP) may be provided in the active area (AA), some (e.g., the outermost touch electrode) of the plurality of touch electrodes arranged in the display panel (DISP) may be provided in the non-active area (NA), or sore (e.g., the outermost touch electrode) of the plurality of touch electrodes arranged in the display panel (DISP) may be provided over the active area (AA) and the non-active area (NA).

Referring to FIG. 2, a display panel (DISP) of a touch display device according to embodiments of the present disclosure may include a dam area (DA) where dams for preventing collapse of a specific layer (e.g., an encapsulation portion in an organic light-emitting display panel) in the active area (AA) are arranged.

The dam area (DA) may be positioned at the boundary between the active area (AA) and the non-active area (NA) or at any place of the non-active area (NA) outside the active area (AA).

The dam may be arranged in the dam area (DA) so as to surround the active area (AA) in all directions, or may be arranged only in the outside of one or more portions (e.g., a portion having a vulnerable layer) of the active area (AA).

The dam arranged in the dam area (DA) may have a single pattern that is continuous as a whole, or may have two or more discontinuous patterns. Further, only a primary dam may be arranged in the dam area (DA), or two dams (a primary dam and a secondary dam) or three or more dams may be arranged in the dam area (DA).

Only a primary dam may be arranged in one direction and both a primary dam and a secondary dam may be arranged in another direction in the dam area (DA).

Figure 3:
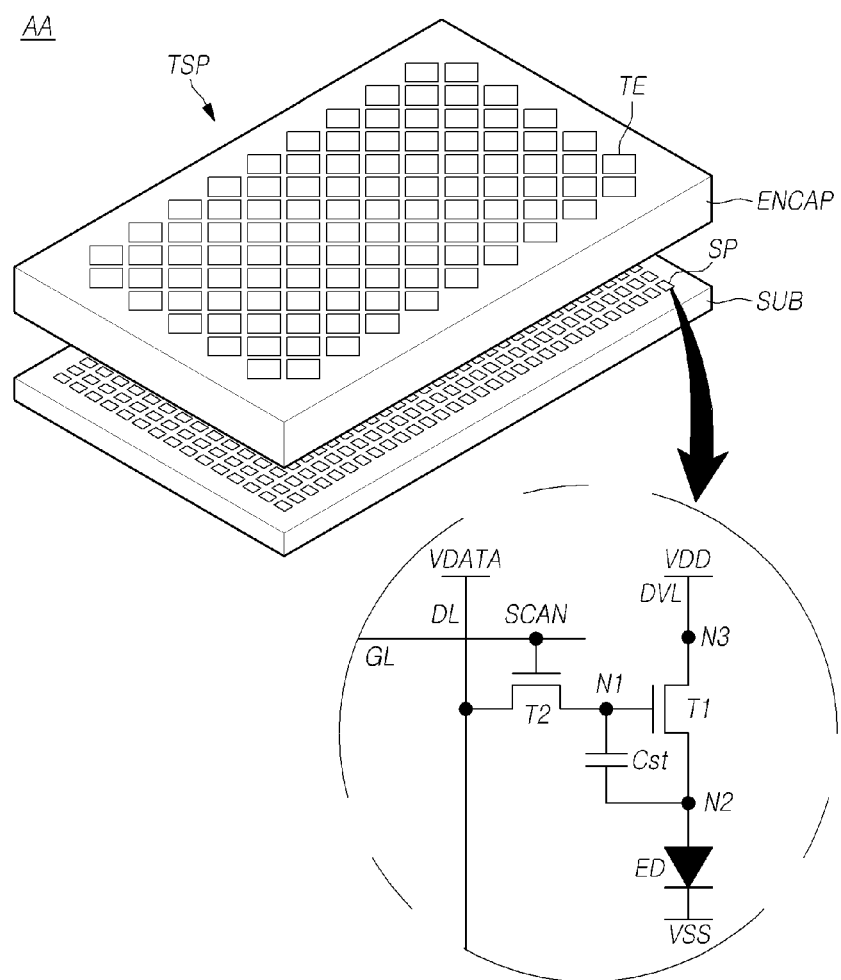
FIG. 3 is a view illustrating an example of a structure in which a touch panel is embedded in a display panel according to embodiments of the present disclosure.

FIG. 3 is a view illustrating an example of a structure in which a touch panel (TSP) is embedded in a display panel (DISP) according to embodiments of the present disclosure.

Referring to FIG. 3, a plurality of subpixels (SP) are arranged on a substrate (SUB) in the active area (AA) of the display panel (DISP).

Each subpixel (SP) may include a light-emitting device (ED), a first transistor (T1) for driving the light-emitting device (ED), a second transistor (T2) for transmitting a data voltage (VDATA) to a first node (N1) of the first transistor (T1), and a storage capacitor (Cst) for maintaining a constant voltage for one frame.

The first transistor (T1) may include a first node (N1) to which a data voltage may be applied, a second node (N2) electrically connected to the light-emitting device (ED), and a third node (N3) to which a driving voltage (VDD) is applied from the driving voltage line (DVL). The first node (N1) may be a gate node, the second node (N2) may be a source node or a drain node, and the third node (N3) may be a drain node or a source node. The first transistor (T1) is also referred to as a "driving transistor" for driving the light-emitting device (ED).

The light-emitting device (ED) may include a first electrode (e.g., an anode electrode), a light-emitting layer, and a second electrode (e.g., a cathode electrode). The first electrode may be electrically connected to the second node (N2) of the first transistor (T1) and the second electrode may be applied with a base voltage (VSS).

The light-emitting layer of the light-emitting device (ED) may be an organic light-emitting layer containing an organic material. In this case, the light-emitting device (ED) may be an organic light-emitting diode (OLED).

The second transistor (T2) may be controlled to be turned on and off by a scan signal (SCAN) applied through a gate line (GL), and may be electrically connected between the first node (N1) of the first transistor (T1) and the data line (DL). The second transistor (T2) is also referred to as a "switching transistor".

If the second transistor (T2) is turned on by the scan signal (SCAN), the second transistor (T2) transfers a data voltage (VDATA) supplied from the data line (DL) to the first node (N1) of the first transistor (T1).

The storage capacitor (Cst) may be electrically connected between the first node (N1) and the second node (N2) of the first transistor (T1).

Each subpixel (SP), as shown in FIG. 3, may have a 2T1C structure including two transistors (T1 and T2) and one capacitor (Cst), and may further include one or more transistors, or may further include one or more capacitors in some cases.

The storage capacitor (Cst) may be an external capacitor that is intentionally designed so as to be provided outside the first transistor (T1), instead of a parasitic capacitor (e.g., Cgs or Cgd) that is an internal capacitor to be provided between the first node (N1) and the second node (N2) of the first transistor (T).

Each of the first transistor (T1) and the second transistor (T2) may be an n-type transistor or a p-type transistor.

As described above, circuit devices, such as a light-emitting device (ED), two or more transistors (T1 and T2), and one or more capacitors (Cst), are arranged in the display panel (DISP). Since the circuit devices (in particular, the light-emitting device ED) are vulnerable to external moisture or oxygen, an encapsulation portion (ENCAP) for preventing external moisture or oxygen from penetrating into the circuit devices (in particular, the light-emitting device ED) may be provided in the display panel (DISP).

The encapsulation portion (ENCAP) may be formed as a single layer or multiple layers.

For example, in the case where the encapsulation portion (ENCAP) includes multiple layers, the encapsulation portion (ENCAP) may include one or more inorganic encapsulation portions and one or more organic encapsulation portions. Specifically, the encapsulation portion (ENCAP) may be configured to include a first inorganic encapsulation portion, an organic encapsulation portion, and a second inorganic encapsulation portion. Here, the organic encapsulation portion may be positioned between the first inorganic encapsulation portion and the second inorganic encapsulation portion.

The first inorganic encapsulation portion may be formed on the second electrode (e.g., a cathode electrode) so as to be closest to the light-emitting device (ED). The first inorganic encapsulation portion may be formed of an inorganic insulating material that enables low-temperature deposition, such as silicon nitride ($SiN_x$), silicon oxide ($SiO_x$), silicon oxynitride (SiON), aluminum oxide ($Al_2O_3$), or the like. Accordingly, since the first inorganic encapsulation portion is deposited in a low-temperature atmosphere, the first inorganic encapsulation portion is able to prevent the light-emitting layer (organic light-emitting layer), which is vulnerable to a high-temperature atmosphere, from being damaged during the deposition process.

The organic encapsulation portion may have a smaller area than the first inorganic encapsulation portion, and may be formed such that both ends of the first inorganic encapsulation portion are exposed. The organic encapsulation portion may serve as a buffer for relieving the stress between the respective layers due to warping of the touch display device, and may enhance the planarization performance. The organic encapsulation portion may be formed of an organic insulating material such as an acrylic resin, an epoxy resin, polyimide, polyethylene, silicon oxycarbide (SiOC), or the like.

The second inorganic encapsulation portion may be formed on the organic encapsulation portion so as to cover the upper surface and the side surface of each of the organic encapsulation portion and the first inorganic encapsulation portion. As a result, the second inorganic encapsulation portion is able to minimize or prevent external moisture or oxygen from penetrating into the first inorganic encapsulation portion and the organic encapsulation portion. The second inorganic encapsulation portion may be formed of an inorganic insulating material such as silicon nitride ($SiN_x$), silicon oxide ($SiO_x$), silicon oxynitride (SiON), aluminum oxide ($Al_2O_3$), or the like.

The touch panel (TSP) may be formed on the encapsulation portion (ENCAP) in the touch display device according to embodiments of the present disclosure.

That is, a touch sensor structure, such as a plurality of touch electrodes (TE) constituting the touch panel (TSP), may be arranged on the encapsulation portion (ENCAP) in the touch display device.

When sensing a touch, a touch driving signal or a touch sensing signal may be applied to the touch electrodes (TE). Therefore, when sensing a touch, a potential difference is generated between the touch electrode (TE) and the cathode electrode arranged with the encapsulation portion (ENCAP) interposed therebetween, thereby generating unnecessary parasitic capacitance. In order to reduce the parasitic capacitance, which may degrade touch sensitivity, the distance between the touch electrode (TE) and the cathode electrode may be designed to be equal to or greater than a predetermined value (e.g., 5 μm) in consideration of the panel thickness, panel-manufacturing processes, the display performance, and the like. To this end, the thickness of the encapsulation portion (ENCAP), for example, may be designed to be at least 5 μm or more.

Figure 4:
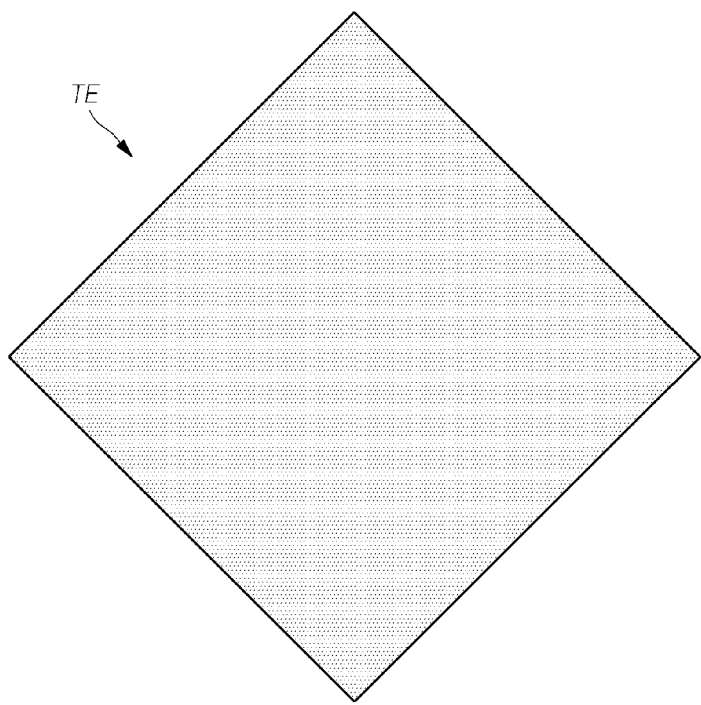
FIGS. 4 and 5 are views illustrating examples of the types of touch electrodes arranged in a display panel according to embodiments of the present disclosure.
Figure 5:
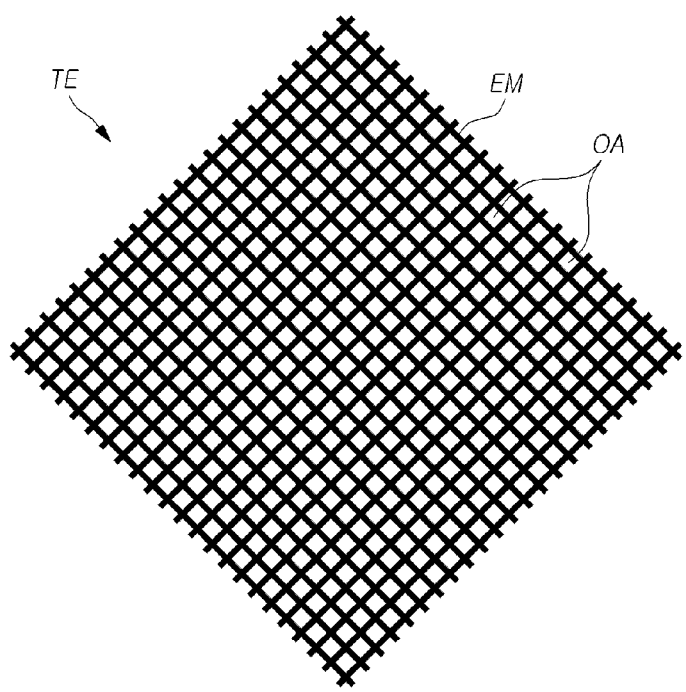

FIGS. 4 and 5 are views illustrating examples of the types of touch electrodes (TE) arranged in a display panel (DISP) according to embodiments of the present disclosure.

As shown in FIG. 4, each touch electrode (TE) arranged in the display panel (DISP) may be a plate-type electrode metal having no openings. In this case, each touch electrode (TE) may be a transparent electrode. That is, each touch electrode (TE) may be made of a transparent electrode material so that light emitted from a plurality of subpixels (SP) arranged below can pass through the touch electrode (TE) upwards.

Alternatively, as shown in FIG. 5, each touch electrode (TE) arranged in the display panel (DISP) may be an electrode metal (EM) patterned in the form of a mesh to have two or more openings.

The electrode metal (EM) corresponds to a substantial touch electrode (TE) where a touch driving signal is applied or a touch sensing signal is detected.

As shown in FIG. 5, in the case where each touch electrode (TE) is an electrode metal (EM) patterned in the form of a mesh, two or more openings (OA) may be provided in the area of the touch electrode (TE).

Each of the two or more openings (OA) provided in each touch electrode (TE) may correspond to the light-emitting area of one or more subpixels (SP). That is, a plurality of openings (OA) provide paths through which light emitted from a plurality of subpixels (SP) arranged below passes. Hereinafter, a description will be made of an example in which each touch electrode (TE) is a mesh-type electrode metal (EM) for the convenience of explanation.

The electrode metal (EM) corresponding to each touch electrode (TE) may be positioned on a bank that is arranged in the area other than the light-emitting areas of two or more subpixels (SP).

As a method of forming a plurality of touch electrodes (TE), the electrode metal (EM) may be formed to be wide in the form of a mesh, and then the electrode metal (EM) is cut into a predetermined pattern to electrically isolate the electrode metal (EM), thereby providing a plurality of touch electrodes (TE).

The outline of the touch electrode (TE) may have a square shape, such as a diamond shape or a rhombus, as shown in FIGS. 4 and 5, or may have various shapes such as a triangle, a pentagon, or a hexagon.

Figure 6:
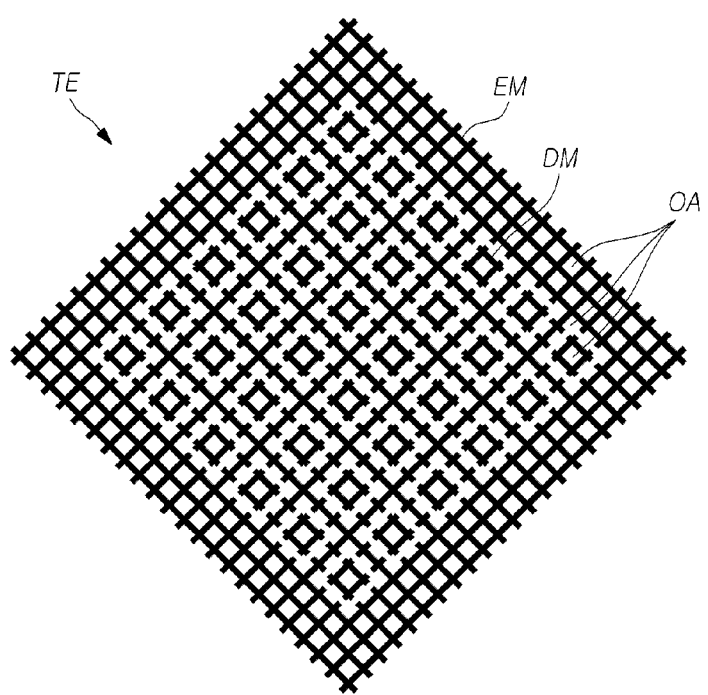
FIG. 6 is a view illustrating an example of a mesh-type touch electrode shown in FIG. 5 according to embodiments of the present disclosure.

FIG. 6 is a view illustrating an example of a mesh-type touch electrode (TE) shown in FIG. 5.

Referring to FIG. 6, the area of each touch electrode (TE) may be provided with one or more dummy metals (DM) that are separated from the mesh-type electrode metal (EM).

The electrode metal (EM) corresponds to a substantial touch electrode (TE) where a touch driving signal is applied or a touch sensing signal is detected. However, although the dummy metal (DM) is provided in the area of the touch electrode (TE), a touch driving signal is not applied thereto and a touch sensing signal is not detected therefrom. That is, the dummy metal (DM) may be an electrically floating metal.

Therefore, the electrode metal (EM) may be electrically connected to the touch driving circuit (TDC), whereas the dummy metal (DM) is not electrically connected to the touch driving circuit (TDC).

One or more dummy metals (DM) may be provided in the areas of the respective touch electrodes (TE) while being disconnected from the electrode metal (EM).

Alternatively, one or more dummy metals (DM) may be provided in the areas of some of the touch electrodes (TE) while being disconnected from the electrode metal (EM). That is, the dummy metal (DM) may not be provided in the areas of some touch electrodes (TE).

With regard to the role of the dummy metal (DM), in the case where no dummy metal (DM) is provided and only the mesh-type electrode metal (EM) is provided in the area of the touch electrode (TE) as shown in FIG. 5, there may be a visible problem that the outline of the electrode metal (EM) may be viewed on the screen.

On the other hand, in the case where one or more dummy metals (DM) are provided in the area of the touch electrode (TE) as shown in FIG. 6, it is possible to solve the visible problem that the outline of the electrode metal (EM) may be viewed on the screen.

In addition, the magnitude of the capacitance for each touch electrode (TE) may be adjusted by providing or removing the dummy metals (DM) or by adjusting the number of dummy metals (DM) (the ratio of dummy metals) for each touch electrode (TE), thereby enhancing the touch sensitivity.

Some points of the electrode metal (EM) formed in the area of one touch electrode (TE) may be cut away so that the cut electrode metal (EM) becomes the dummy metal (DM). That is, the electrode metal (EM) and the dummy metal (DM) may be formed of the same material in the same layer.

The touch display device according to embodiments of the present disclosure may sense a touch on the basis of the capacitance generated in the touch electrode (TE).

The touch display device according to embodiments of the present disclosure is able to sense a touch by a capacitance-based touch sensing method such as a mutual-capacitance-based touch sensing method or a self-capacitance-based touch sensing method.

In the case of a mutual-capacitance-based touch sensing method, a plurality of touch electrodes (TE) may be divided into driving touch electrodes (transmitting touch electrodes) to which a touch driving signal is applied and sensing touch electrodes (receiving touch electrodes), in which a touch sensing signal is detected, forming capacitance with the driving touch electrodes.

In the case of the mutual-capacitance-based touch sensing method, a touch sensing circuit (TSC) senses whether or not a touch is performed and/or touch coordinates on the basis of a change in the capacitance (mutual-capacitance) between the driving touch electrode and the sensing touch electrode depending on whether or not there is a pointer such as a finger or a pen that is in contact with the touch panel TSP.

In the case of the self-capacitance-based touch sensing method, each touch electrode (TE) serves as both the driving touch electrode and the sensing touch electrode. That is, the touch sensing circuit (TSC) applies a touch driving signal to one or more touch electrodes (TE), detects a touch sensing signal through the touch electrodes (TE) applied with the touch driving signal, and recognizing a change in the capacitance between a pointer, such as a finger or a pen, and the touch electrode (TE) on the basis of the detected touch sensing signal, thereby sensing whether or not a touch is performed and/or touch coordinates. The self-capacitance-based touch sensing method does not distinguish between the driving touch electrode and the sensing touch electrode.

As described above, the touch display device according to embodiments of the present disclosure may sense a touch using a mutual-capacitance-based touch sensing method or using a self-capacitance-based touch sensing method. Hereinafter, for the convenience of explanation, a description will be made of an example in which the touch display device performs mutual-capacitance-based touch sensing and has a touch sensor structure for the same.

Figure 7:
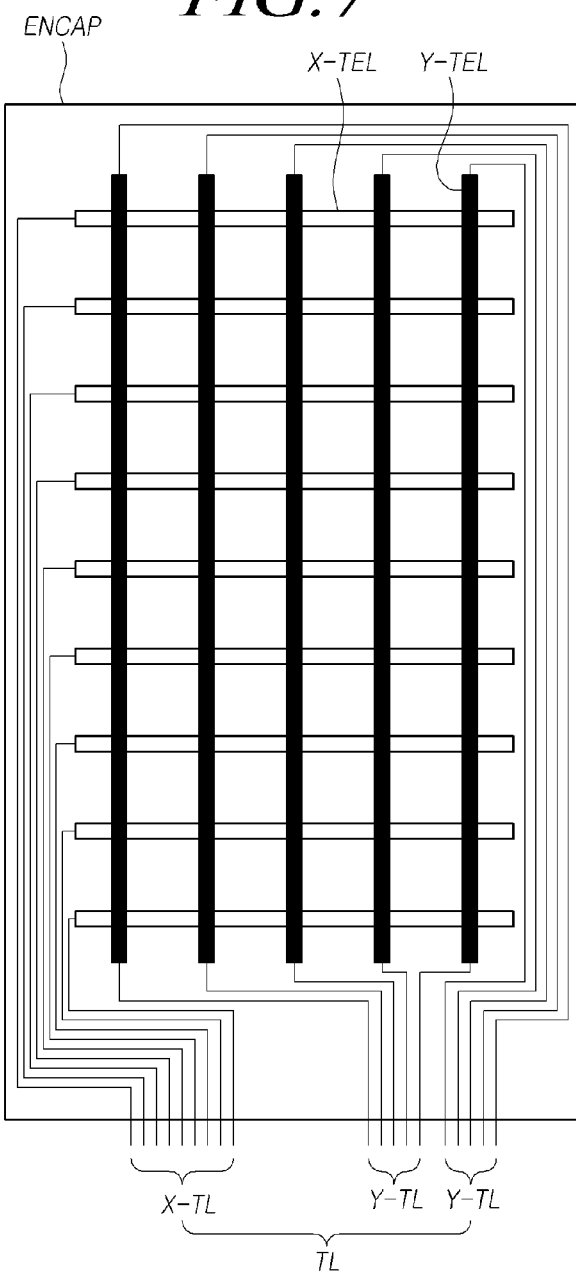
FIG. 7 is a view schematically illustrating a touch sensor structure in a display panel according to embodiments of the present disclosure.
Figure 8:
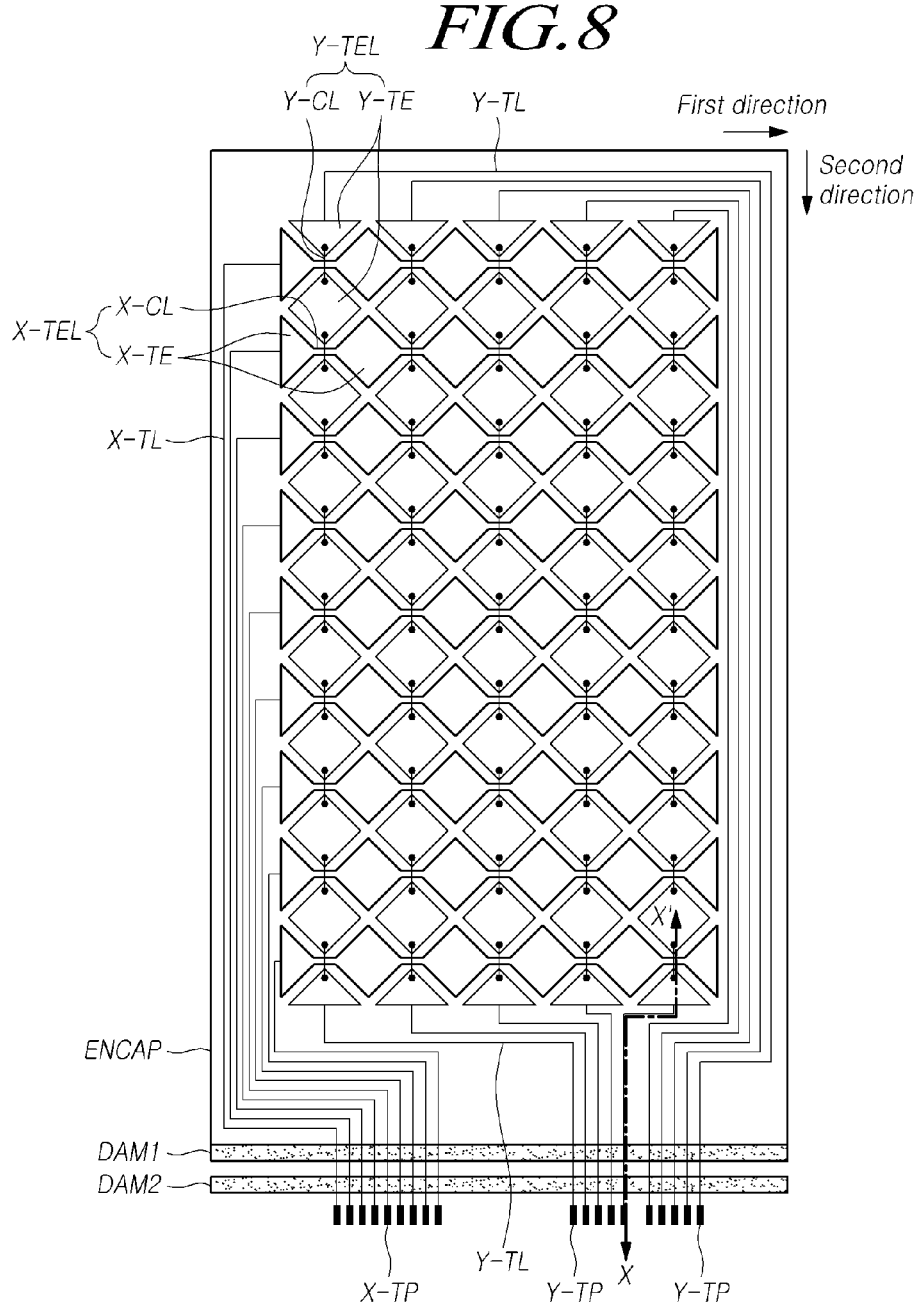
FIG. 8 is a view illustrating an example of implementing the touch sensor structure shown in FIG. 7 according to embodiments of the present disclosure.

FIG. 7 is a view schematically illustrating a touch sensor structure in a display panel (DISP) according to embodiments of the present disclosure, and FIG. 8 is a view illustrating an example of implementing the touch sensor structure in FIG. 7 according to embodiments of the present disclosure.

Referring to FIG. 7, a touch sensor structure for mutual-capacitance-based touch sensing may include a plurality of X-touch electrode lines (X-TEL) and a plurality of Y-touch electrode lines (Y-TEL). The plurality of X-touch electrode lines (X-TEL) and the plurality of Y-touch electrode lines (Y-TEL) are positioned on the encapsulation portion (ENCAP).

The respective X-touch electrode lines (X-TEL) are arranged in a first direction, and the respective Y-touch electrode lines (Y-TEL) are arranged in a second direction different from the first direction.

In the present specification, the first direction and the second direction may be relatively different, and for example, the first direction may be the x-axis direction and the second direction may be the y-axis direction. On the other hand, the first direction may be the y-axis direction and the second direction may be the x-axis direction. In addition, the first direction and the second direction may, or may not, be orthogonal to each other. In the present specification, rows and columns are relative, and may switch to each other depending on viewpoints.

Each of the plurality of X-touch electrode lines (X-TEL) may include a plurality of X-touch electrodes (X-TE) electrically connected to each other. Each of the plurality of Y-touch electrode lines (Y-TEL) may include a plurality of Y-touch electrodes (Y-TE) electrically connected to each other.

The plurality of X-touch electrodes (X-TE) and the plurality of Y-touch electrodes (Y-TE) are included in a plurality of touch electrodes (TE), and have different roles (functions) from each other.

For example, the plurality of X-touch electrodes (X-TE) constituting each of the plurality of X-touch electrode lines (X-TEL) may be driving touch electrodes, and the plurality of Y-touch electrodes (Y-TE) constituting each of the plurality of Y-touch electrode lines (Y-TEL) may be sensing touch electrodes. In this case, the respective X-touch electrode lines (X-TEL) correspond to driving touch electrode lines, and the respective Y-touch electrode lines (Y-TEL) correspond to sensing touch electrode lines.

On the other hand, the plurality of X-touch electrodes (X-TE) constituting each of the plurality of X-touch electrode lines (X-TEL) may be sensing touch electrodes, and the plurality of Y-touch electrodes (Y-TE) constituting each of the plurality of Y-touch electrode lines (Y-TEL) may be driving touch electrodes. In this case, the respective X-touch electrode lines (X-TEL) correspond to sensing touch electrode lines, and the respective Y-touch electrode lines (Y-TEL) correspond to driving touch electrode lines.

The touch sensor metal for touch sensing may include a plurality of touch routing lines (IL), as well as the plurality of X-touch electrode lines (X-TEL) and the plurality of Y-touch electrode lines (Y-TEL).

The plurality of touch routing lines (TL) may include one or more X-touch routing lines (X-TL) connected to the respective X-touch electrode lines (X-TEL) and one or more Y-touch routing lines (Y-TL) connected to the respective Y-touch electrode lines (Y-TEL).

Referring to FIG. 8, each of the plurality of X-touch electrode lines (X-TEL) may include a plurality of X-touch electrodes (X-TE) arranged in the same row (or column) and one or more X-touch electrode connecting lines (X-CL) for electrically connecting the plurality of X-touch electrodes (X-TE) to each other. The X-touch electrode connecting line (X-CL) for connecting two adjacent X-touch electrodes (X-TE) may be a metal that is integral with two adjacent X-touch electrodes (X-TE) (see FIG. 8), or may be a metal connected with two adjacent X-touch electrodes (X-TIE) through contact holes.

Each of the plurality of Y-touch electrode lines (Y-TEL) may include a plurality of Y-touch electrodes (Y-TE) arranged in the same column (or row) and one or more Y-touch electrode connecting lines (Y-CL) (e.g., a bridge) for electrically connecting the Y-touch electrodes (Y-TE) to each other. The Y-touch electrode connecting line (Y-CL) for connecting two adjacent Y-touch electrodes (Y-TE) may be a metal that is integral with two adjacent Y-touch electrodes (Y-TE), or may be a metal connected to two adjacent Y-touch electrodes (Y-TE) through contact holes (see FIG. 8).

The X-touch electrode connecting line (X-CL) and the Y-touch electrode connecting lines (Y-CL) may intersect in the area (a touch electrode line intersection area) where the X-touch electrode line (X-TEL) and the Y-touch electrode line (Y-TEL) intersect.

In the case where the X-touch electrode connecting line (X-CL) and the Y-touch electrode connecting line (Y-CL) intersect in the touch electrode line intersection area as described above, the X-touch electrode connecting line (X-CL) and the Y-touch electrode connecting line (Y-CL) must be positioned in different layers from each other.

Accordingly, in order to arrange such that the plurality of X-touch electrode lines (X-TEL) and the plurality of Y-touch electrode lines (Y-TEL) intersect each other, the plurality of X-touch electrodes (X-TE), the plurality of X-touch electrode connecting lines (X-CL), the plurality of Y-touch electrodes (Y-TE), and the plurality of Y-touch electrode connecting lines (Y-CL) may be provided in two or more layers.

Referring to FIG. 8, the respective X-touch electrode lines (X-TEL) are electrically connected to corresponding X-touch pads (X-TP) via one or more X-touch routing lines (X-TL). That is, the outermost X-touch electrode (X-TE), among the plurality of X-touch electrodes (X-TE) included in one X-touch electrode line (X-TEL), is electrically connected to the corresponding X-touch pad (X-TP) via the X-touch routing line (X-TL).

The respective Y-touch electrode lines (Y-TEL) are electrically connected to corresponding Y-touch pads (Y-TP) via one or more Y-touch routing lines (Y-TL). That is, the outermost Y-touch electrode (Y-TE), among the plurality of Y-touch electrodes (Y-TE) included in one Y-touch electrode line (Y-TEL), is electrically connected to the corresponding Y-touch pad (Y-TP) via the Y-touch routing line (Y-TL).

As shown in FIG. 8, the plurality of X-touch electrode lines (X-TEL) and the plurality of Y-touch electrode lines (Y-TEL) may be arranged on the encapsulation portion (ENCAP). That is, the plurality of X-touch electrodes (X-TE) and the plurality of X-touch electrode connecting lines (X-CL) constituting the plurality of X-touch electrode lines (X-TEL) may be arranged on the encapsulation portion (ENCAP). The plurality of Y-touch electrodes (Y-TE) and the plurality of Y-touch electrode connecting lines (Y-CL) constituting the plurality of Y-touch electrode lines (Y-TEL) may be arranged on the encapsulation portion (ENCAP).

As shown in FIG. 8, the respective X-touch routing lines (X-TL) electrically connected to the plurality of X-touch electrode lines (X-TEL) may be arranged on the encapsulation portion (ENCAP) so as to extend to the area where the encapsulation portion (ENCAP) is not provided, and may be electrically connected to a plurality of X-touch pads (X-TP). The respective Y-touch routing lines (Y-TL) electrically connected to the plurality of Y-touch electrode lines (Y-TEL) may be arranged on the encapsulation portion (ENCAP) so as to extend to the area where the encapsulation portion (ENCAP) is not provided, and may be electrically connected to a plurality of Y-touch pads (Y-TP). The encapsulation portion (ENCAP) may be provided in the active area (AA) and, in some cases, may extend to the non-active area (NA).

As described above, a dam area (DA) may be provided in the boundary area between the active area (AA) and the non-active area (NA) or in the non-active area (NA) outside the active area (AA) in order to prevent any layer (e.g., an encapsulation portion in the organic light-emitting display panel) in the active area (AA) from collapsing.

As shown in FIG. 8, for example, a primary dam (DAM1) and a secondary dam (DAM2) may be arranged in the dam area (DA). The secondary dam (DAM2) may be positioned outside the primary dam (DAM1).

As alternatives to the example in FIG. 8, only the primary dam (DAM1) may be provided in the dam area (DA), and in some cases, one or more additional dams may be further arranged in the dam area (DA), as well as the primary dam (DAM1) and the secondary dam (DAM2).

Referring to FIG. 8, the encapsulation portion (ENCAP) may be positioned on the side of the primary dam (DAM1), or the encapsulation portion (ENCAP) may be positioned on the top of the primary dam (DAM1), as well as on the side thereof.

Figure 9:
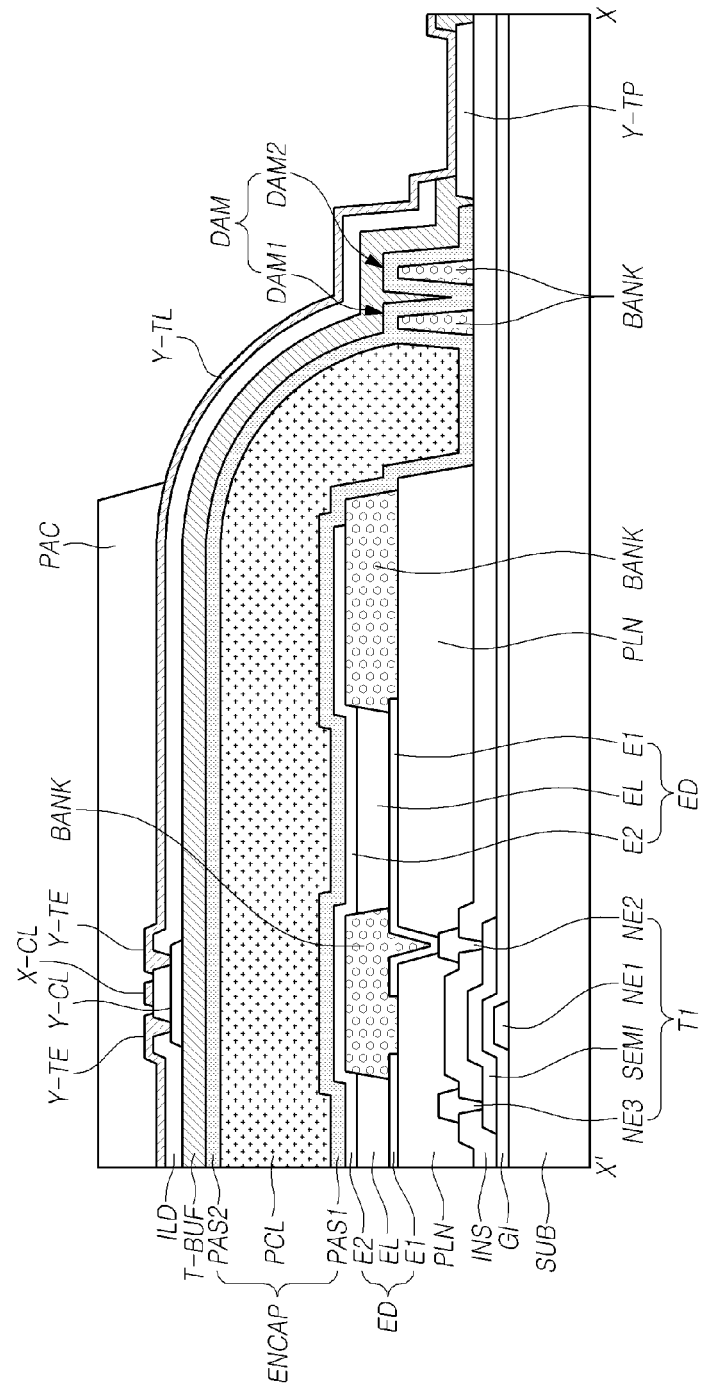
FIG. 9 is a cross-sectional view of a part of a display panel taken along the line X-X' in FIG. 8 according to embodiments of the present disclosure.

FIG. 9 is a cross-sectional view of a part of a display panel (DISP) taken along the line X-X' in FIG. 8 according to embodiments of the present disclosure. Although a plate-type touch electrode (Y-TE) is illustrated in FIG. 9, this is merely an example, and a mesh-type touch electrode may be provided.

A first transistor (T1), which is a driving transistor in each subpixel (SP) in the active area (AA), is arranged on a substrate (SUB).

The first transistor (T1) includes a first node electrode (NE1) corresponding to a gate electrode, a second node electrode (NE2) corresponding to a source electrode or a drain electrode, a third node electrode (NE3) corresponding to a drain electrode or a source electrode, a semiconductor layer (SEMI), and the like.

The first node electrode (NE1) and the semiconductor layer (SEMI) may overlap each other with a gate insulating film (GI) interposed therebetween. The second node electrode (NE2) may be formed on an insulating layer (INS) so as to come into contact with one end of the semiconductor layer (SEMI), and the third node electrode (NE3) may be formed on the insulating layer (INS) so as to come into contact with the opposite end of the semiconductor layer (SEMI).

A light-emitting device (ED) may include a first electrode (E1) corresponding to an anode electrode (or a cathode electrode), a light-emitting layer (EL) formed on the first electrode (E1), and a second electrode (E2), which corresponds to a cathode electrode (or an anode electrode), formed on the light-emitting layer (EL).

The first electrode (E1) is electrically connected to the second node electrode (NE2) of the first transistor (T1), which is exposed through a pixel contact hole passing through the planarization layer (PLN).

The light-emitting layer (EL) is formed on the first electrode (E1) in the light-emitting area provided by banks (BANK). The light-emitting layer (EL) is formed by stacking layers in the order of a hole-related layer, a light-emitting layer, and an electron-related layer, or in the reverse order thereof, on the first electrode (E1). The second electrode (E2) is formed to face the first electrode (E1) with the light-emitting layer (EL) interposed therebetween.

The encapsulation portion (ENCAP) prevents external moisture or oxygen from penetrating into the light-emitting device (ED), which is vulnerable to external moisture or oxygen.

The encapsulation portion (ENCAP) may be configured as a single layer, or may be configured as multiple layers (PAS1, PCL, and PAS2) as shown in FIG. 9.

For example, in the case where the encapsulation portion (ENCAP) is configured as multiple layers (PAS1, PCL, and PAS2), the encapsulation portion (ENCAP) may include one or more inorganic encapsulation layers (PAS1 and PAS2) and one or more organic encapsulation layers (PCL). More specifically, the encapsulation portion (ENCAP) may have a structure in which a first inorganic encapsulation layer (PAS1), an organic encapsulation layer (PCL), and a second inorganic encapsulation layer (PAS2) are sequentially stacked.

The organic encapsulation layer (PCL) may further include at least one organic encapsulation portion or at least one inorganic encapsulation portion.

The first inorganic encapsulation layer (PAS1) is formed on the substrate (SUB), on which the second electrode (E2) corresponding to a cathode electrode is formed, so as to be closest to the light-emitting device (ED). The first inorganic encapsulation layer (PAS1) is formed of an inorganic insulating material that enables low-temperature deposition, such as silicon nitride (SiNx), silicon oxide (SiOx), silicon oxynitride (SiON), aluminum oxide ($Al_2O_3$), or the like. Since the first inorganic encapsulation layer (PAS1) is deposited in a low-temperature atmosphere, the first inorganic encapsulation layer (PAS1) is able to prevent the light-emitting layer (EL), which is vulnerable to a high-temperature atmosphere, from being damaged during the deposition process.

The organic encapsulation layer (PCL) may be formed to have an area smaller than that of the first inorganic encapsulation layer (PAS1). In this case, the organic encapsulation layer (PCL) may be formed to expose both ends of the first inorganic encapsulation layer (PAS1). The organic encapsulation layer (PCL) may serve as a buffer for relieving the stress between the respective layers due to warping of the touch display device, which is an organic light-emitting display device, and may enhance the planarization performance. The organic encapsulation layer (PCL) may be formed of an organic insulating material such as an acrylic resin, an epoxy resin, polyimide, polyethylene, silicon oxycarbide (SiOC), or the like.

In the case where the organic encapsulation layer (PCL) is formed by an inkjet method, one or more dams (DAM) may be formed in the dam area (DA) corresponding to the boundary area between the non-active area (NA) and the active area (AA) or corresponding to some areas of the non-active area (NA).

For example, as shown in FIG. 9, the dam area (DA) is located between a pad area where a plurality of X-touch pads (X-TP) and a plurality of Y-touch pads (Y-TP) are formed in the non-active area (NA) and the active area (AA), and the dam area (DA) may be provided with a primary dam (DAM1) adjacent to the active area (AA) and a secondary dam (DAM2) adjacent to the pad area.

One or more dams (DAM) arranged in the dam area (DA) may prevent a liquid organic encapsulation layer (PCL) from collapsing (e.g., extending) toward the non-active area (NA) and infiltrating into the pad area when the liquid organic encapsulation layer (PCL) is dropped into the active area (AA).

This effect can be further increased in the case where the primary dam (DAM1) and the secondary dam (DAM2) are provided as shown in FIG. 9.

The primary dam (DAM1) and/or the secondary dam (DAM2) may be formed as a single-layered or a multi-layered structure. For example, the primary dam (DAM1) and/or the secondary dam (DAM2) may be formed of the same material as at least one of the banks (BANK) and spacers (not shown) at the same time. In this case, the dam structure may be formed without an additional mask process and an increase in the cost.

In addition, the primary dam (DAM1) and the secondary dam (DAM2) may have a structure in which the first inorganic encapsulation layer (PAS1) and/or the second inorganic encapsulation layer (PAS2) are stacked on the banks (BANK) as shown in FIG. 9.

In addition, the organic encapsulation layer (PCL) containing the organic material may be positioned only inside the primary dam (DAM1) as shown in FIG. 9.

Alternatively, the organic encapsulation layer (PCL) containing the organic material may also be positioned on the top of at least the primary dam (DAM1), among the primary dam (DAM1) and the secondary dam (DAM2).

The second inorganic encapsulation layer (PAS2) may be formed so as to cover the top surface and side surface of each of the organic encapsulation layer (PCL) and the first inorganic encapsulation layer (PAS1) on the substrate (SUB) on which the organic encapsulation layer (PCL) is formed. The second inorganic encapsulation layer (PAS2) minimizes or prevents external moisture or oxygen from penetrating into the first inorganic encapsulation layer (PAS1) and the organic encapsulation layer (PCL). The second inorganic encapsulation layer (PAS2) is formed of an inorganic insulating material such as silicon nitride ($SiN_x$), silicon oxide ($SiO_x$), silicon oxynitride (SiON), aluminum oxide ($Al_2O_3$), or the like.

A touch buffer film (T-BUF) may be arranged on the encapsulation portion (ENCAP). The touch buffer film (T-BUF) may be provided between the touch sensor metal including X-touch electrodes (X-TE) and Y-touch electrodes (Y-TE) and X-touch electrode connecting lines (X-CL) and Y-touch electrode connecting lines (Y-CL) and the second electrode (E2) of the light-emitting device (ED).

The touch buffer film (T-BUF) may be designed to maintain the distance between the touch sensor metal and the second electrode (E2) of the light-emitting device (ED) at a predetermined minimum separation distance (e.g., 5 μm). Accordingly, it is possible to reduce or prevent the parasitic capacitance generated between the touch sensor metal and the second electrode (E2) of the light-emitting device (ED), thereby preventing deterioration of touch sensitivity due to the parasitic capacitance.

A touch sensor metal including the X-touch electrodes (X-TE) and Y-touch electrodes (Y-TE) and the X-touch electrode connecting lines (X-CL) and Y-touch electrode connecting lines (Y-CL) may be arranged on the encapsulation portion (ENCAP) without the touch buffer film (T-BUF).

In addition, the touch buffer film (T-BUF) may prevent chemical solutions (developer, etchant, or the like) used in the manufacturing process of the touch sensor metal arranged on the touch buffer film (T-BUF) or external moisture from penetrating into the light-emitting layer (EL) including organic materials. Accordingly, the touch buffer film (T-BUF) is able to prevent damage to the light-emitting layer (EL), which is vulnerable to chemical solutions or moisture.

The touch buffer film (T-BUF) is formed of an organic insulating material, which is able to be formed at a low temperature of less than a predetermined temperature (e.g., 100 degrees C.) and has a low permittivity of 1 to 3, in order to prevent damage to the light-emitting layer (EL) including an organic material that is vulnerable to high temperature. For example, the touch buffer film (T-BUF) may be formed of an acrylic-based, epoxy-based, or siloxane-based material. The touch buffer film (T-BUF) made of an organic insulating material to have a planarization property may prevent damage to the respective encapsulation layers (PAS1, PCL, and PAS2) in the encapsulation portion (ENCAP) and the breakage of the touch sensor metal formed on the touch buffer film (T-BUF) due to warping of the organic light-emitting display device.

According to a mutual-capacitance-based touch sensor structure, X-touch electrode lines (X-TEL) and Y-touch electrode lines (Y-TEL) may be arranged so as to intersect each other on the touch buffer film (T-BUF).

The Y-touch electrode line (Y-TEL) may include a plurality of Y-touch electrodes (Y-TE) and a plurality of Y-touch electrode connecting lines (Y-CL) for electrically connecting the plurality of Y-touch electrodes (Y-TE) to each other.

As shown in FIG. 9, the plurality of Y-touch electrodes (Y-TE) and the plurality of Y-touch electrode connecting lines (Y-CL) may be provided in different layers with a touch insulating film (ILD) interposed therebetween.

The plurality of Y-touch electrodes (Y-TE) may be spaced a predetermined distance apart from each other in the y-axis direction. Each of the plurality of Y-touch electrodes (Y-TE) may be electrically connected to another Y-touch electrode (Y-TE) adjacent thereto in the y-axis direction by means of the Y-touch electrode connecting line (Y-CL).

The Y-touch electrode connecting line (Y-CL) may be formed on the touch buffer film (T-BUF) so as to be exposed through a touch contact hole passing through the touch insulating film (ILD), and may be electrically connected to two adjacent Y-touch electrodes (Y-TE) in the y-axis direction.

The Y-touch electrode connecting line (Y-CL) may be arranged to overlap the bank (BANK). Accordingly, it is possible to prevent the aperture ratio from being lowered due to the Y-touch electrode connecting line (Y-CL).

The X-touch electrode line (X-TEL) may include a plurality of X-touch electrodes (X-TE) and a plurality of X-touch electrode connecting lines (X-CL) for electrically connecting the plurality of X-touch electrodes (X-TE) to each other. The plurality of X-touch electrodes (X-TE) and the plurality of X-touch electrode connecting lines (X-CL) may be provided in different layers with a touch insulating film (ID) interposed therebetween.

The plurality of X-touch electrodes (X-TIE) may be spaced a predetermined distance apart from each other in the x-axis direction. Each of the plurality of X-touch electrodes (X-TE) may be electrically connected to another X-touch electrode (X-TE) adjacent thereto in the x-axis direction through the X-touch electrode connecting line (X-CL).

The X-touch electrode connecting line (X-CL) may be arranged on the same plane as the X-touch electrodes (X-TE), and may be electrically connected to two X-touch electrodes (X-TE), which are adjacent to each other in the x-axis direction, without separate contact holes, or may be formed integrally with two X-touch electrodes (X-TE), which are adjacent to each other in the x-axis direction.

The X-touch electrode connecting line (X-CL) may be arranged to overlap the bank (BANK). Accordingly, it is possible to prevent the aperture ratio from being lowered due to the X-touch electrode connecting line (X-CL).

The Y-touch electrode line (Y-TEL) may be electrically connected to a touch driving circuit (TDC) via the Y-touch routing line (Y-TL) and the Y-touch pad (Y-TP). Similarly, the X-touch electrode line (X-TEL) may be electrically connected to a touch driving circuit (TDC) via the X-touch routing line (X-TL) and the X-touch pad (X-TP).

A pad cover electrode covering the X-touch pad (X-TP) and the Y-touch pad (Y-TP) may be further arranged.

The X-touch pad (X-TP) may be formed separately from the X-touch routing line (X-TL), or may be formed by extending the X-touch routing line (X-TL). The Y-touch pad (Y-TP) may be formed separately from the Y-touch routing line (Y-TL), or may be formed by extending the Y-touch routing line (Y-TL).

In the case where the X-touch pad (X-TP) is formed by extending the X-touch routing line (X-TL) and the Y-touch pad (Y-TP) is formed by extending the Y-touch routing line (Y-TL), the X-touch pad (X-TP), the X-touch routing line (X-TL), the Y-touch pad (Y-TP), and Y-touch routing line (Y-TL) may be famed of the same first conductive material. The first conductive material may be formed in a single-layered or multi-layered structure using a metal, such as aluminum Al, titanium Ti, copper Cu, or molybdenum Mo, which exhibits high corrosion resistance, high acid resistance, and high conductivity.

For example, the X-touch pad (X-TP), the X-touch routing line (X-TL), the Y-touch pad (Y-TP), and Y-touch routing line (Y-TL) made of the first conductive material may be formed in a three-layered structure such as Ti/Af/Ti or Mo/Al/Mo.

The pad cover electrode capable of covering the X-touch pad (X-TP) and the Y-touch pad (Y-TP) may be made of a second conductive material that is the same as the X and Y-touch electrodes (X-TE and Y-TE). The second conductive material may be a transparent conductive material, such as indium tin oxide ITO or indium zinc oxide IZO, which exhibits high corrosion resistance and high acid resistance. The pad cover electrode may be formed to be exposed by the touch buffer film (T-BUF), so that the pad cover electrode may be bonded to the touch driving circuit (TDC) or may be bonded to a circuit film on which the touch driving circuit (TDC) is mounted.

The touch buffer film (T-BUF) may be formed to cover the touch sensor metal, thereby preventing the touch sensor metal film being corroded by external moisture or the like. For example, the touch buffer film (T-BUF) may be formed of an organic insulating material or may be formed in the form of a circular polarizer or a film of an epoxy or acrylic material. The touch buffer film (T-BUF) may not be provided on the encapsulation portion (ENCAP). That is, the touch buffer film (T-BUF) may be optional.

The Y-touch routing line (Y-TL) may be electrically connected to the Y-touch electrodes (Y-TE) through touch routing line contact holes, or may be integral with the Y-touch electrode (Y-TE).

The Y-touch routing line (Y-TL) may be extended to the non-active area (NA), and may pass over the top surface and side surface of the encapsulation portion (ENCAP) and the top surface and side surface of the dam (DAM) so as to be electrically connected to the Y-touch pad (Y-TP). Accordingly, the Y-touch routing line (Y-TL) may be electrically connected to the touch driving circuit (TDC) via the Y-touch pad (Y-TP).

The Y-touch routing line (Y-TL) may transmit a touch sensing signal from the Y-touch electrode (Y-TE) to the touch driving circuit (TDC), or may receive a touch driving signal from the touch driving circuit (TDC) and may transfer the same to the Y-touch electrode (Y-TE).

The X-touch routing line (X-TL) may be electrically connected to the X-touch electrodes (X-TE) through touch routing line contact holes, or may be integral with the X-touch electrode (X-TE).

The X-touch routing line (X-TL) may be extended to the non-active area (NA), and may pass over the top surface and side surface of the encapsulation portion (ENCAP) and the top and side of the dam (DAM) so as to be electrically connected to the X-touch pad (X-TP). Accordingly, the X-touch routing line (X-TL) may be electrically connected to the touch driving circuit (TDC) via the X-touch pad (X-TP).

The X-touch routing line (X-TL) may receive a touch driving signal from the touch driving circuit (TDC), and may transfer the same to the X-touch electrode (X-TE), or may transmit a touch sensing signal from the X-touch electrode (X-TE) to the touch driving circuit (TDC).

The layout of the X-touch routing lines (X-TL) and Y-touch routing lines (Y-TL) may be variously modified depending on the panel design.

A touch protection film (PAC) may be arranged on the X-touch electrode (X-TE) and the Y-touch electrode (Y-TE). The touch protection film (PAC) may be extended to the front or back of the dam (DAM) so as to be arranged on the X-touch outing line (X-TL) and the Y-touch outing line (Y-TL).

The cross-sectional view of FIG. 9 shows a conceptual structure, and thus the positions, thicknesses, or widths of the respective patterns (respective layers or respective electrodes) may vary depending on the viewing directions or positions, connection structures of the respective patterns may vary, other layers may be further provided in addition to the illustrated layers, or some of the illustrated layers may be omitted or integrated. For example, the width of the bank (BANK) may be smaller than that illustrated in the drawing, and the height of the dam (DAM) may be less or greater than that illustrated in the drawing.

Figure 10:
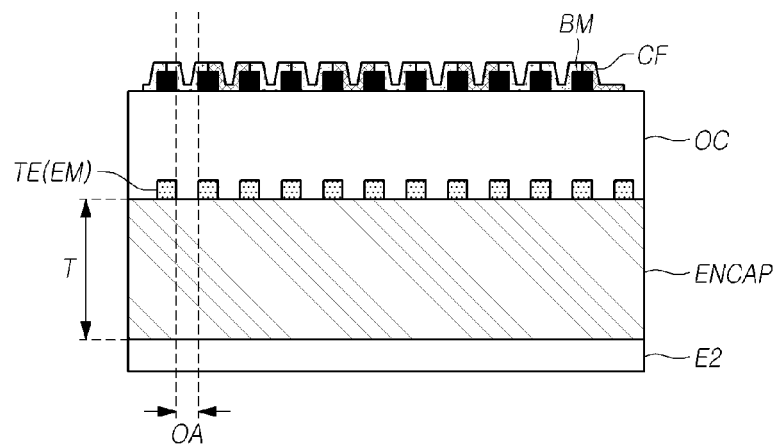
FIGS. 10 and 11 are views illustrating examples of a cross-sectional structure of a display panel including a color filter according to embodiments of the present disclosure.
Figure 11:
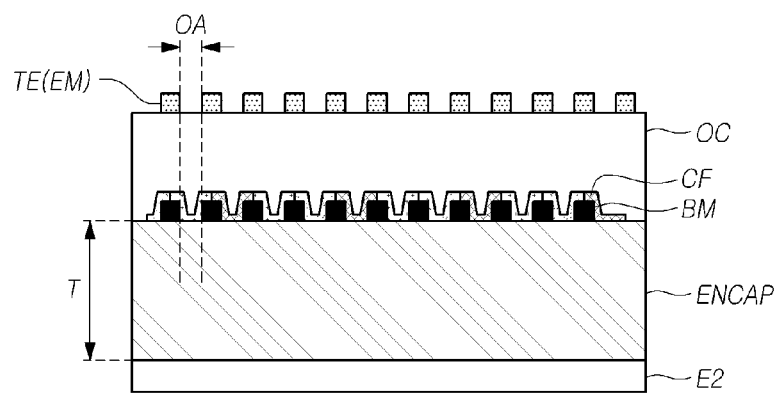

FIGS. 10 and 11 are views illustrating examples of a cross-sectional structure of a display panel (DISP) including a color filter (CF) according to embodiments of the present disclosure.

Referring to FIGS. 10 and 11, in the case where the touch panel (TSP) is embedded in the display panel (DISP) and the display panel (DISP) is implemented as an organic light-emitting display panel the touch panel (TSP) may be positioned on the encapsulation portion (ENCAP) in the display panel (DISP). In other words, the touch sensor metal, such as a plurality of touch electrodes (TE), a plurality of touch routing lines (IL), and the like, may be positioned on the encapsulation portion (ENCAP) in the display panel (DISP).

As described above, since the touch electrodes (TE) are provided on the encapsulation portion (ENCAP), it is possible to form the touch electrodes (TE) without significantly affecting the display performance and display-related layer formation.

Referring to FIGS. 10 and 11, a second electrode (E2), which may be a cathode electrode of an organic light-emitting diode (OLED), may be provided under the encapsulation portion (ENCAP).

The thickness (T) of the encapsulation portion (ENCAP) may be, for example, 5 micrometers or more.

As described above, it is possible to reduce the parasitic capacitance generated between the second electrode (E2) and the touch electrode (TE) of the organic light-emitting diode (OLED) by designing the encapsulation portion (ENCAP) to have a thickness of 5 micrometers or more. Thus, it is possible to prevent deterioration in the touch sensitivity due to the parasitic capacitance.

As described above, each of the plurality of touch electrodes (TE) is patterned in the form of a mesh in which the electrode metal (EM) has two or more openings (OA), and each of the two or more openings (OA) may correspond to one or more subpixels or the light-emitting area thereof in the vertical direction.

As described above, the electrode metal (EM) of the touch electrode (TE) is patterned such that the light-emitting area of one or more subpixels is positioned to correspond to the position of each of two or more openings (OA) provided in the area of the touch electrode (TE) on the plan view, thereby increasing the luminous efficiency of the display panel (DISP)

As shown in FIGS. 10 and 11, a black matrix (BM) may be arranged on the display panel (DISP), and a color filter (CF) may be further arranged thereon.

The position of the black matrix (BM) may correspond to the position of the electrode metal (EM) of the touch electrode (TE).

The positions of a plurality of color filters (CF) correspond to the positions of a plurality of touch electrodes (TE) or the electrode metals (EM) constituting the plurality of touch electrodes (TE).

As described above, since the plurality of color filters (CF) are provided at the positions corresponding to the positions of a plurality of openings (OA), it is possible to improve the luminous performance of the display panel (DISP).

A vertical positional relationship between the plurality of color filters (CF) and the plurality of touch electrodes (TE) will be described as follows.

As shown in FIG. 10, the plurality of color filters (CF) and black matrixes (BM) may be provided on the plurality of touch electrodes (TE).

In this case, the plurality of color filters (CF) and black matrixes (BM) may be positioned on an overcoat layer (OC) arranged on the plurality of touch electrodes (TE). The overcoat layer (OC) may, or may not, be the same layer as the touch protection film (PAC) shown in FIG. 9.

As shown in FIG. 11, the plurality of color filters (CF) and black matrixes (BM) may be provided under the plurality of touch electrodes (TE).

In this case, the plurality of touch electrodes (TE) may be positioned on the overcoat layer (OC) on the plurality of color filters (CF) and black matrixes (BM). The overcoat layer (OC) may, or may not, be the same layer as the touch buffer film (T-BUF) or the touch insulating film (ILD) in FIG. 9.

Figure 12:
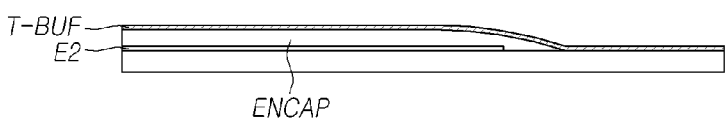
FIG. 12 is a view illustrating a process of implementing a multi-layered touch sensor structure on a display panel according to embodiments of the present disclosure.

FIG. 12 is a view illustrating a process of implementing a multi-layered touch sensor structure on a display panel (DISP) according to embodiments of the present disclosure.

Referring to FIG. 12, a touch sensor structure embedded in a display panel (DISP) according to embodiments of the present disclosure may include a plurality of X-touch electrode lines (X-TEL) and a plurality of Y-touch electrode lines (Y-TEL), and may further include a plurality of X-touch routing lines (X-TL) electrically connected to the plurality of X-touch electrode lines (X-TEL) and a plurality of Y-touch routing lines (Y-TL) electrically connected to the plurality of Y-touch electrode lines (Y-TEL).

Each of the plurality of X-touch electrode lines (X-TEL) may be a driving touch electrode line or a sensing touch electrode line, and may include a plurality of X-touch electrodes (X-TE) and a plurality of X-touch electrode connecting lines (X-CL) corresponding to bridges connecting the plurality of X-touch electrodes (X-TE) to each other. Each of the plurality of Y-touch electrode lines (Y-TEL) may be a sensing touch electrode line or a driving touch electrode line, and may include a plurality of Y-touch electrodes (Y-TE) and a plurality of Y-touch electrode connecting lines (Y-CL) corresponding to bridges connecting the plurality of Y-touch electrodes (Y-TE) to each other.

The plurality of X-touch electrodes (X-TE), the plurality of X-touch electrode connecting lines (X-CL), the plurality of Y-touch electrodes (Y-TE), the plurality of Y-touch electrode connecting lines (Y-CL), the plurality of X-touch routing lines (X-TL), and the plurality of Y-touch routing lines (Y-TL) constituting a touch sensor structure are configured as a touch sensor metal.

The touch sensor metal constituting the touch sensor structure may include a first touch sensor metal (TSM1) and a second touch sensor metal (TSM2), which are formed in different layers in terms of the formation position.

The first touch sensor metal (TSM1) may constitute a plurality of X-touch electrode connecting lines (X-CL) and/or a plurality of Y-touch electrode connecting lines (Y-CL).

The second touch sensor metal (TSM2) may constitute a plurality of X-touch electrodes (X-TE) and a plurality of Y-touch electrodes (Y-TE).

Referring to FIG. 12, a touch buffer film (T-BUF) is formed to cover the encapsulation portion (ENCAP) covering the second electrode (E2) on the substrate (SUB).

Then, a first touch sensor metal (TSM1) may be formed through a first mask process using a first mask (Mask #1). The first touch sensor metal (TSM1) may correspond to a plurality of X-touch electrode connecting lines (X-CL) and/or a plurality of Y-touch electrode connecting lines (Y-CL).

Next, a touch insulating film (ILD) may be formed through a second mask process using a second mask (Mask #2). At this time, the touch buffer film (T-BUF) may be opened in the touch pad area.

Thereafter, a second touch sensor metal (TSM2) may be formed through a third mask process using a third mask (Mask #3). The second touch sensor metal (TSM2) may correspond to a plurality of X-touch electrodes (X-TE) and a plurality of Y-touch electrodes (Y-TE), and may also correspond to a plurality of X-touch routing lines (X-TL) and a plurality of Y-touch outing lines (Y-TL).

In the third mask process, the second touch sensor metal (TSM2) may be formed up to the touch pad area, thereby constituting a plurality of X-touch pads (X-TP) and a plurality of Y-touch pads (Y-TP).

In the touch pad area, a plurality of X-touch pads (X-TP) and a plurality of Y-touch pads (Y-TP) having a dual structure, in which a metal other than the second touch sensor metal (TSM2) {for example, a metal of the same material as the source-drain electrode formed in the active area (AA)} is formed and the second touch sensor metal (TSM2) is formed thereon, may be formed.

After the third mask process, a touch protection film (PAC) for passivation may be formed through a fourth mask process using a fourth mask (Mask #4).

One or more of the touch buffer film (T-BUF) and the touch protective film (PAC) may be omitted according to the process method.

In the case where the touch sensor structure is formed as described above, the first touch sensor metal (TSM1), the touch insulating film (ILD), and the second touch sensor metal (TSM2) are required to be formed in a multi-layer on the encapsulation portion (ENCAP) or the touch buffer film (T-BUF). Therefore, the multi-layered touch sensor structure becomes thick and requires a large number of mask processes.

Accordingly, embodiments of the present disclosure can provide a single-layered touch sensor structure that is able to reduce the number of mask processes and enables a thin touch sensor structure. Hereinafter, a single-layered touch sensor structure according to embodiments of the present disclosure will be described.

FIG. 13 is a view illustrating a process of implementing a single-layered touch sensor structure on a display panel (DISP) according to embodiments of the present disclosure. Here, the same mask numbers as those in FIG. 12 are used for comparison with the processes in FIG. 12.

Referring to FIG. 13, a touch buffer film (T-BUF) is formed so as to cover the encapsulation portion (ENCAP) covering the second electrode (E2) on the substrate (SUB).

Then, a touch sensor metal (TSM) may be formed through a first mask process using a first mask (Mask #1).

The touch sensor metal (TSM) may correspond to a plurality of X-touch electrodes (X-TE), a plurality of Y-touch electrode (Y-TE), a plurality of X-touch electrode connecting lines (X-CL), and a plurality of Y-touch electrode connecting lines (Y-CL), and may also correspond to a plurality of X-touch muting lines (X-TL) and a plurality of Y-touch outing lines (Y-TL).

In the first mask process, the touch buffer film (T-BUF) may be opened in the touch pad area.

Thereafter, a touch protection film (PAC) for passivation may be formed through a fourth mask process using a fourth mask (Mask #4) without a second mask process and a third mask process.

At least one of the touch buffer film (T-BUF) and the touch protective film (PAC) may be omitted according to the process method.

In the case of forming the touch sensor structure as described above with respect to FIG. 13, all touch sensor metals (TSM) including a plurality of X-touch electrodes (X-TE), a plurality of Y-touch electrodes (Y-TE), a plurality of X-touch electrode connecting lines (X-CL), a plurality of Y-touch electrode connecting lines (Y-CL), a plurality of X-touch routing lines (X-TL), and a plurality of Y-touch muting lines (Y-TL) may be formed as a single layer on the encapsulation portion (ENCAP) or the touch buffer film (T-BUF). Therefore, the single-layered touch sensor structure becomes thin and is able to significantly reduce the number of mask processes.

In general, a single-layered touch sensor structure is available for only a self-capacitance-based touch sensing technology, and is not applicable to a mutual-capacitance-based touch sensing technology. However, the single-layered touch sensor structure according to the embodiments of the present disclosure enables the mutual-capacitance-based touch sensing. Therefore, it is possible to simplify the process, to greatly improve the yield, to reduce the manufacturing cost, and to greatly reduce the number of pads by significantly reducing the number of mask processes.

In the following, various examples of a single-layered touch sensor structure will be described.

Figure 14:
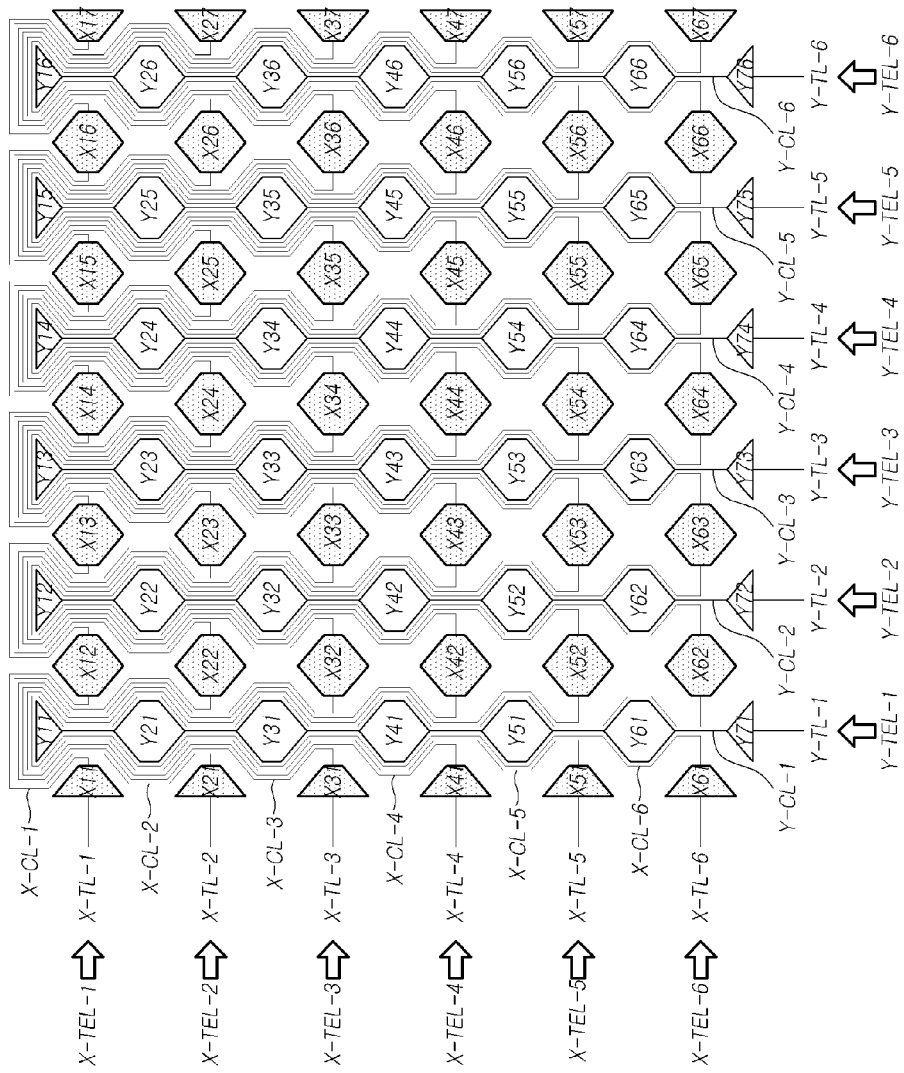
FIGS. 14 and 15 are views illustrating a first example of a single-layered touch sensor structure in a display panel according to embodiments of the present disclosure.
Figure 15:
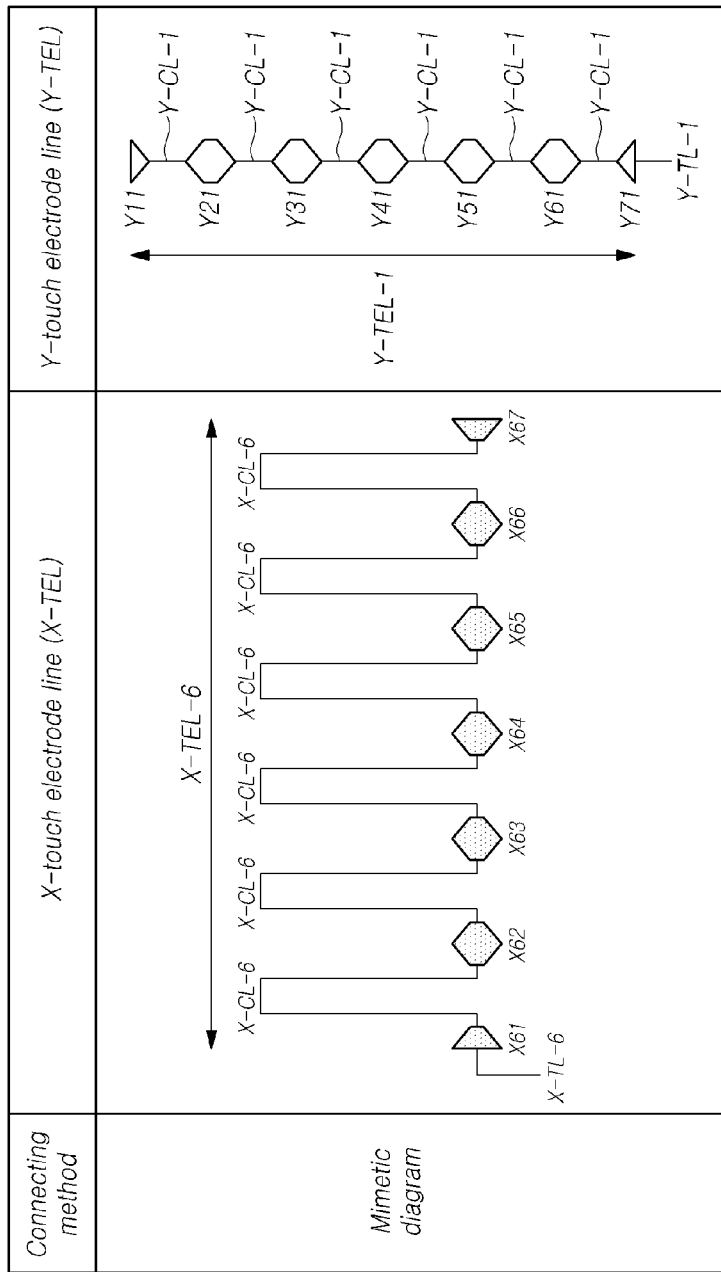

FIGS. 14 and 15 are views illustrating a first example of a single-layered touch sensor structure in a display panel according to embodiments of the present disclosure.

A plurality of touch electrodes (TE) arranged in the display panel (DISP) may constitute m X-touch electrode lines (X-TEL-1 to X-TEL-6 in the case of m=6) and n Y-touch electrode lines (Y-TEL-1 to Y-TEL-6 in the case of n=6), which are arranged to intersect each other. Here, m is an even number as a natural number of 2 or more, and n is an even number or odd number as a natural number of 2 or more.

The m X-touch electrode lines (X-TEL-1 to X-TEL-6) and the n Y-touch electrode lines (Y-TEL-1 to Y-TEL-6) are electrically separated from each other. In addition, the m X-touch electrode lines (X-TEL-1 to X-TEL-6) are electrically separated from each other, and the n Y-touch electrode lines (Y-TEL-1 to Y-TEL-6) are electrically separated from each other.

Each of the m X-touch electrode lines (X-TEL-1 to X-TEL-6) may include a plurality of X-touch electrodes (X-TE) arranged in a first direction (e.g., X-axis direction or Y-axis direction), among a plurality of touch electrodes, and a plurality of X-touch electrode connecting lines (X-CL) for electrically connecting the plurality of X-touch electrodes (X-TE) to each other.

For example, the X-touch electrode line (X-TEL-1) includes seven X-touch electrodes (X11 to X17) and six X-touch electrode connecting lines (X-CL-1) connecting the same to each other. The X-touch electrode line (X-TEL-2) includes seven X-touch electrodes (X21 to X27) and six X-touch electrode connecting lines (X-CL-2) connecting the same to each other. The X-touch electrode line (X-TEL-3) includes seven X-touch electrodes (X31 to X37) and six X-touch electrode connecting lines (X-CL-3) connecting the same to each other. The X-touch electrode line (X-TEL-4) includes seven X-touch electrodes (X41 to X47) and six X-touch electrode connecting lines (X-CL-4) connecting the same to each other. The X-touch electrode line (X-TEL-5) includes seven X-touch electrodes (X51 to X57) and six X-touch electrode connecting lines (X-CL-5) connecting the same to each other. The X-touch electrode line (X-TEL-6) includes seven X-touch electrodes (X61 to X67) and six X-touch electrode connecting lines (X-CL-6) connecting the same to each other.

In addition, the m X-touch electrode lines (X-TEL-1 to X-TEL-6) have m outermost X-touch electrodes (X11, X21, X31, X41, X51, and X61). The m outermost X-touch electrodes (X11, X21, X31, X41, X51, and X61) may be electrically connected to the X-touch outing lines (X-TL-1 to X-TL-6), respectively.

Each of the n Y-touch electrode lines (Y-TEL-1 to Y-TEL-6) may include a plurality of Y-touch electrodes (Y-TE) arranged in a second direction (e.g., Y-axis direction or X-axis direction) different from the first direction (e.g., X-axis direction or Y-axis direction), among a plurality of touch electrodes, and a plurality of Y-touch electrode connecting lines (Y-CL) for electrically connecting the plurality of Y-touch electrodes (Y-TE) to each other.

For example, the Y-touch electrode line (Y-TEL-1) includes seven Y-touch electrodes (Y11 to Y71) and six Y-touch electrode connecting lines (Y-CL-1) connecting the same to each other. The Y-touch electrode line (Y-TEL-2) includes seven Y-touch electrodes (Y12 to Y72) and six Y-touch electrode connecting lines (Y-CL-2) connecting the same to each other. The Y-touch electrode line (Y-TEL-3) includes seven Y-touch electrodes (Y3 to Y73) and six Y-touch electrode connecting lines (Y-CL-3) connecting the same to each other. The Y-touch electrode line (Y-TEL-4) includes seven Y-touch electrodes (Y14 to Y74) and six Y-touch electrode connecting lines (Y-CL-4) connecting the same to each other. The Y-touch electrode line (Y-TEL-5) includes seven Y-touch electrodes (Y15 to Y75) and six Y-touch electrode connecting lines (Y-CL-5) connecting the same to each other. The Y-touch electrode line (Y-TEL-6) includes seven Y-touch electrodes (Y16 to Y76) and six Y-touch electrode connecting lines (Y-CL-6) connecting the same to each other.

In addition, the n Y-touch electrode lines (Y-TEL-1 to Y-TEL-6) have n outermost Y-touch electrodes (Y71, Y72, Y73, Y74, Y75, and Y76). The n outermost Y-touch electrodes (Y71, Y72, Y73, Y74, Y75, and Y76) may be electrically connected to the Y-touch outing lines (Y-TL-1 to Y-TL-6), respectively.

Referring to FIGS. 14 and 15, the X-touch electrode connecting line (X-CL-6) configured to electrically connect any two adjacent X-touch electrodes (X61 and X62), among a plurality of X-touch electrodes (X61 to X67) included in the X-touch electrode line (X-TEL-6) arranged at the outermost position on one side, among the m X-touch electrode lines (X-TEL-1 to X-TEL-6), may be arranged so as to surround the whole or a part of one Y-touch electrode line (Y-TEL-1).

The X-touch electrode connecting line (X-CL-5) configured to electrically connect any two adjacent X-touch electrodes (X51 and X52), among a plurality of X-touch electrodes (X51 to X57) included in the X-touch electrode line (X-TEL-5) adjacent to the X-touch electrode line (X-TEL-6) arranged at the outermost position on one side, among the m X-touch electrode lines (X-TEL-1 to X-TEL-6), may be arranged so as to surround a part of one Y-touch electrode line (Y-TEL-1). The X-touch electrode connecting line (X-CL-5) may be arranged so as to surround a part of the X-touch electrode connecting line (X-CL-6).

In addition, the X-touch electrode connecting line (X-CL-5) and the X-touch electrode connecting line (X-CL-6) are arranged so as to surround the same Y-touch electrode line (Y-TEL-1), wherein the portion of the Y-touch electrode line (Y-TEL-1) surrounded by the X-touch electrode connecting line (X-CL-5) is less than the portion of the Y-touch electrode line (Y-TEL-1) surrounded by the X-touch electrode connecting line (X-CL-6).

The plurality of X-touch electrode connecting lines (X-CL-1 to X-CL-6) are arranged in the m X-touch electrode lines (X-TEL-1 to X-TEL-6) in the manner described above so that n outermost Y-touch electrodes (Y11 to Y16), which are not connected to the Y-touch routing lines (Y-TL-1 to Y-TL-6) and are arranged at the outermost positions, are surrounded by all the X-touch electrode connecting lines (X-CL-1 to X-CL-6) in the n Y-touch electrode lines (Y-TEL-1 to Y-TEL-6). There may be no X-touch electrode connecting line that surrounds n Y-touch electrodes (Y71 to Y76) connected to the Y-touch routing lines (Y-TL-1 to Y-TL-6) in the n Y-touch electrode lines (Y-TEL-1 to Y-TEL-6). In addition, n Y-touch electrodes (Y61 to Y66) immediately adjacent to the n Y-touch electrodes (Y71 to Y76) connected to the Y-touch routing lines (Y-TL-1 to Y-TL-6) are surrounded by the least number of X-touch electrode connecting lines (X-CL-6) in the n Y-touch electrode lines (Y-TEL-1 to Y-TEL-6).

Seven Y-touch electrodes (Y11 to Y71) constituting one Y-touch electrode line (Y-TEL-1) are connected to each other by six Y-touch electrode connecting lines (Y-CL-1) arranged along short paths. That is, the six Y-touch electrode connecting lines (Y-CL-1) may be arranged along short paths (e.g., in a straight line), instead of bypassing and surrounding other patterns.

As described above, the respective X-touch electrode connecting lines (X-CL-1 to X-CL-6) are arranged in a bypass-connection structure in which the X-touch electrode connecting lines (X-CL-1 to X-CL-6) surround the corresponding Y-touch electrode lines (Y-TEL-1 to Y-TEL-6) provided therebetween and take a long way around two X-touch electrodes, instead of passing directly therebetween, whereas the plurality of Y-touch electrode connecting lines (Y-CL-1 to Y-CL-6) are arranged in a non-bypass-connection structure to directly connect two Y-touch electrodes.

Figure 16:
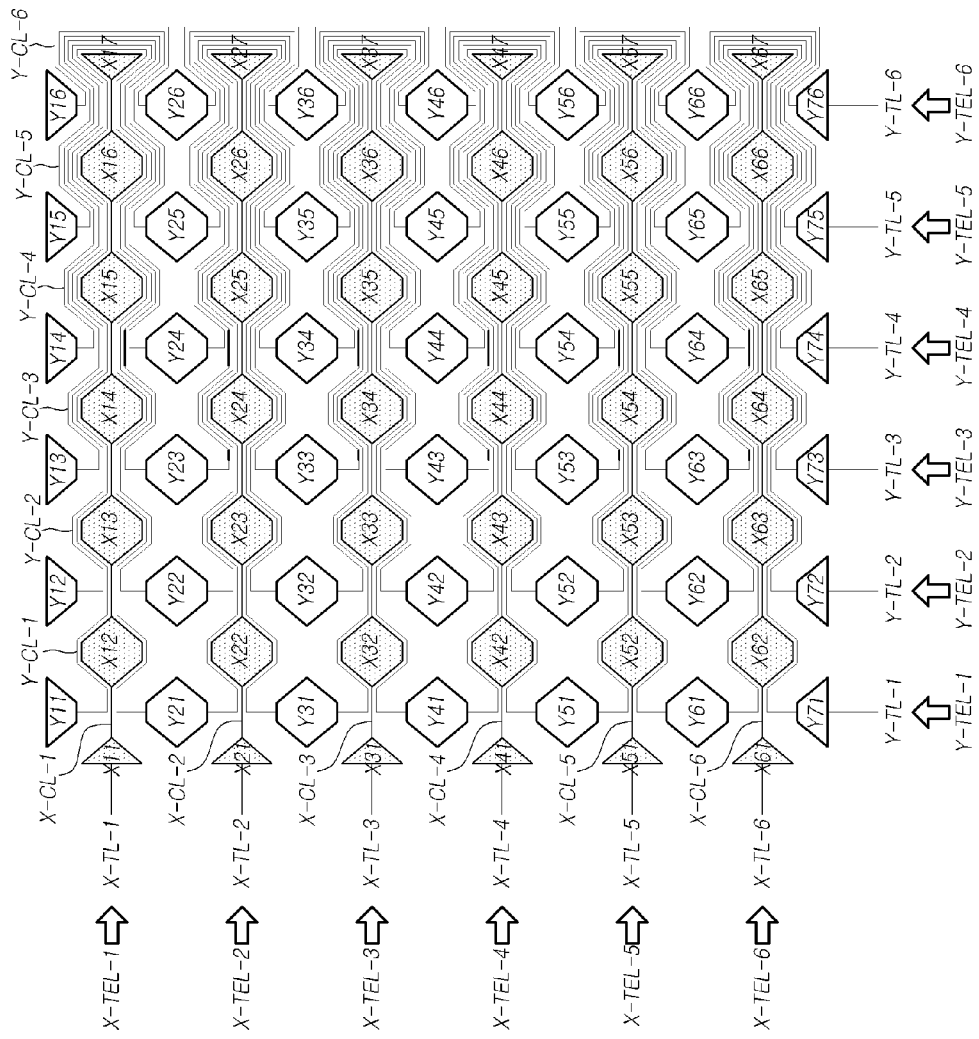
FIGS. 16 and 17 are views illustrating a second example of a single-layered touch sensor structure in a display panel according to embodiments of the present disclosure.
Figure 17:
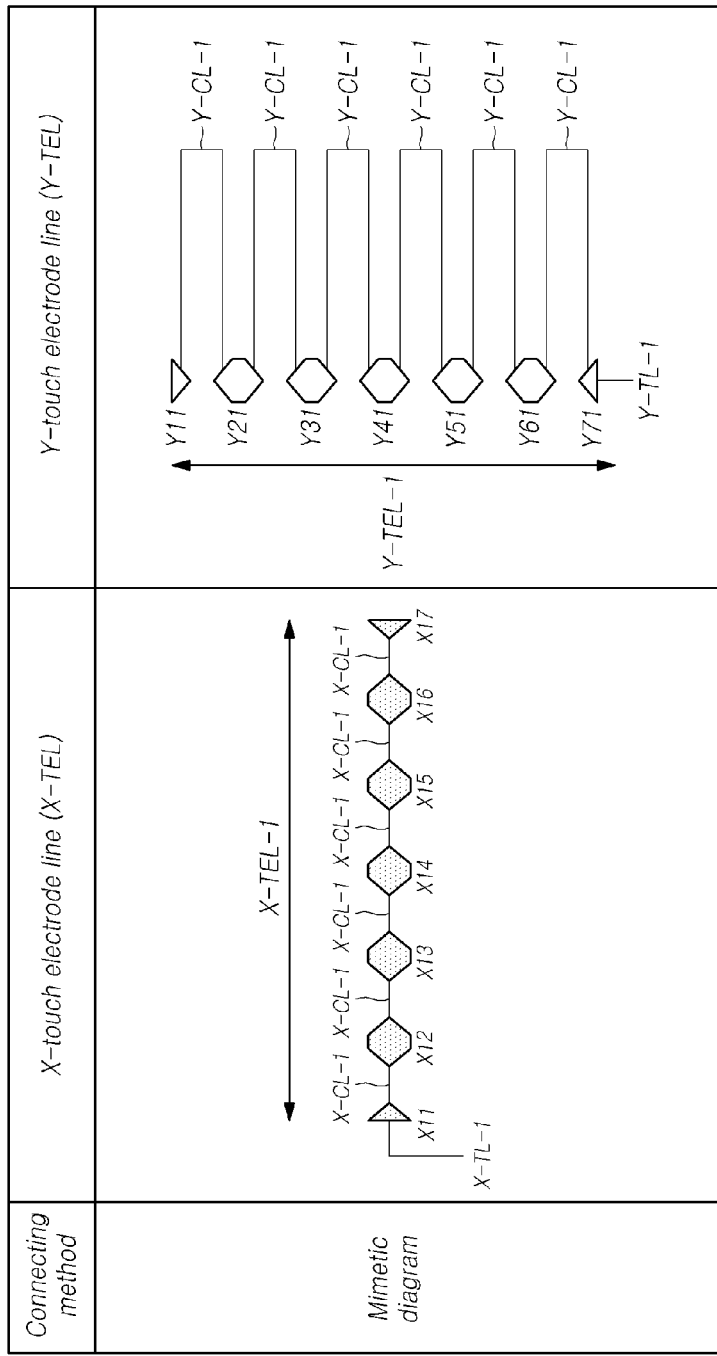

FIGS. 16 and 17 are views illustrating a second example of a single-layered touch sensor structure in a display panel (DISP) according to embodiments of the present disclosure.

Contrary to FIGS. 14 and 15, a single-layered touch sensor structure in FIGS. 16 and 17 has a plurality of Y-touch electrode connecting lines (Y-CL-1 to Y-CL-6) arranged in a bypass-connection structure in which the respective Y-touch electrode connecting lines (Y-CL-1 to Y-CL-6) surround the corresponding X-touch electrode lines (X-TEL-1 to X-TEL-6) provided therebetween so as to take a long way around two Y-touch electrodes, instead of passing directly therebetween, and a plurality of X-touch electrode connecting lines (X-CL-1 to X-CL-6) arranged in a non-bypass-connection structure to directly connect two X-touch electrodes.

For example, the Y-touch electrode connecting line (Y-CL-1) configured to electrically connect any two adjacent Y-touch electrodes (Y11 and Y21), among a plurality of Y-touch electrodes (Y11 to Y71) included in the Y-touch electrode line (Y-TEL-1) arranged at the outermost position on one side in the n Y-touch electrode lines (Y-TEL-1 to Y-TEL-6), may be arranged so as to surround the whole or a part of one X-touch electrode line (X-TEL-1).

The Y-touch electrode connecting line (Y-CL-2) configured to electrically connect any two adjacent Y-touch electrodes (Y2 and Y22), among a plurality of Y-touch electrodes (Y2 to Y72) included in the Y-touch electrode line (Y-TEL-2) adjacent to the Y-touch electrode line (Y-TEL-1) arranged at the outermost position on one side in the n Y-touch electrode lines (Y-TEL-1 to Y-TEL-6), may be arranged so as to surround a part of one X-touch electrode line (X-TEL-1). The Y-touch electrode connecting line (Y-CL-2) may be arranged so as to surround a part of the Y-touch electrode connecting line (Y-CL-1).

In addition, the Y-touch electrode connecting line (Y-CL-2) and the Y-touch electrode connecting line (Y-CL-1) are arranged so as to surround the same X-touch electrode line (X-TEL-1), wherein the portion of the X-touch electrode line (X-TEL-1) surrounded by the Y-touch electrode connecting line (Y-CL-2) is less than the portion of the X-touch electrode line (X-TEL-1) surrounded by the Y-touch electrode connecting line (Y-CL-1).

Referring to FIG. 16, the Y-touch electrode connecting lines (Y-CL-1 to Y-CL-3) may be arranged along the paths corresponding to the outlines of all or some of a plurality of first X-touch electrodes (X11, X12, X13, and X14) included in the first X-touch electrode line (X-TEL-1) surrounded by the Y-touch electrode connecting lines (Y-CL-1 to Y-CL-3).

Accordingly, it is possible to minimize the area where the touch electrode connecting lines are arranged between the touch electrodes.

For example, seven X-touch electrodes (X11 to X17) constituting one X-touch electrode line (X-TEL-1) are connected to each other by six X-touch electrode connecting lines (X-CL-1) arranged along short paths (e.g., straight lines). That is, the six X-touch electrode connecting lines (X-CL-1) may be arranged along short paths, instead of bypassing and surrounding other patterns.

Referring to FIG. 16, the m X-touch electrode lines (X-TEL-1 to X-TEL-6) are electrically connected to a plurality of X-touch routing lines (X-TL-1 to X-TL-6). The n Y-touch electrode lines (Y-TEL-1 to Y-TEL-6) are electrically connected to a plurality of Y-touch routing lines (Y-TL-1 to Y-TL-6).

As described above, the plurality of X-touch electrode connecting lines (X-CL-1 to X-CL-6) may be designed in a bypass-connection structure as shown in FIGS. 14 and 15, or the plurality of Y-touch electrode connecting lines (Y-CL-1 to Y-CL-6) may be designed in a bypass-connection structure as shown in FIGS. 16 and 17.

For the convenience of explanation, the following description will be made of an example in which a single-layered touch sensor structure is designed such that a plurality of Y-touch electrode connecting lines (Y-CL-1 to Y-CL-6) have a bypass-connection structure.

Figure 18:
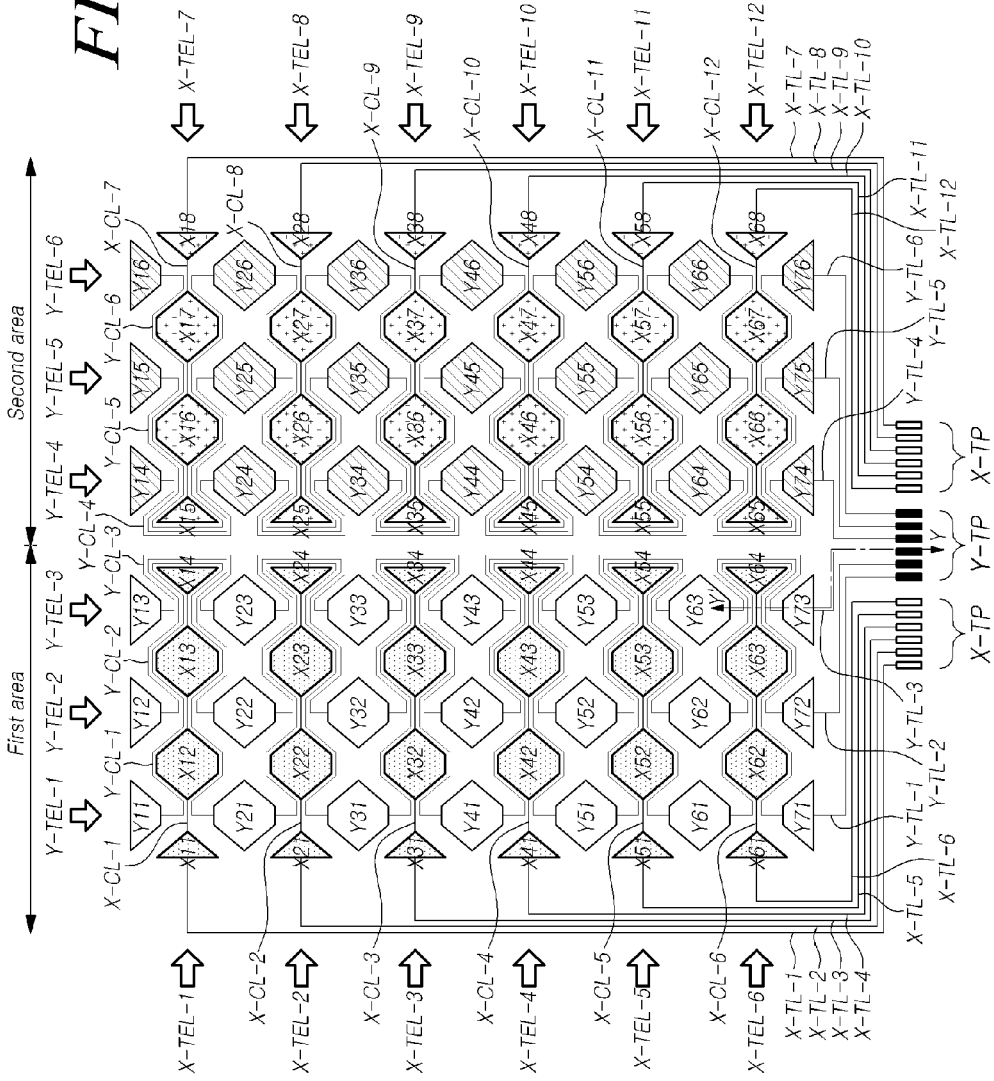
FIGS. 18 and 19 are views illustrating a third example of a single-layered touch sensor structure in a display panel according to embodiments of the present disclosure.
Figure 19:
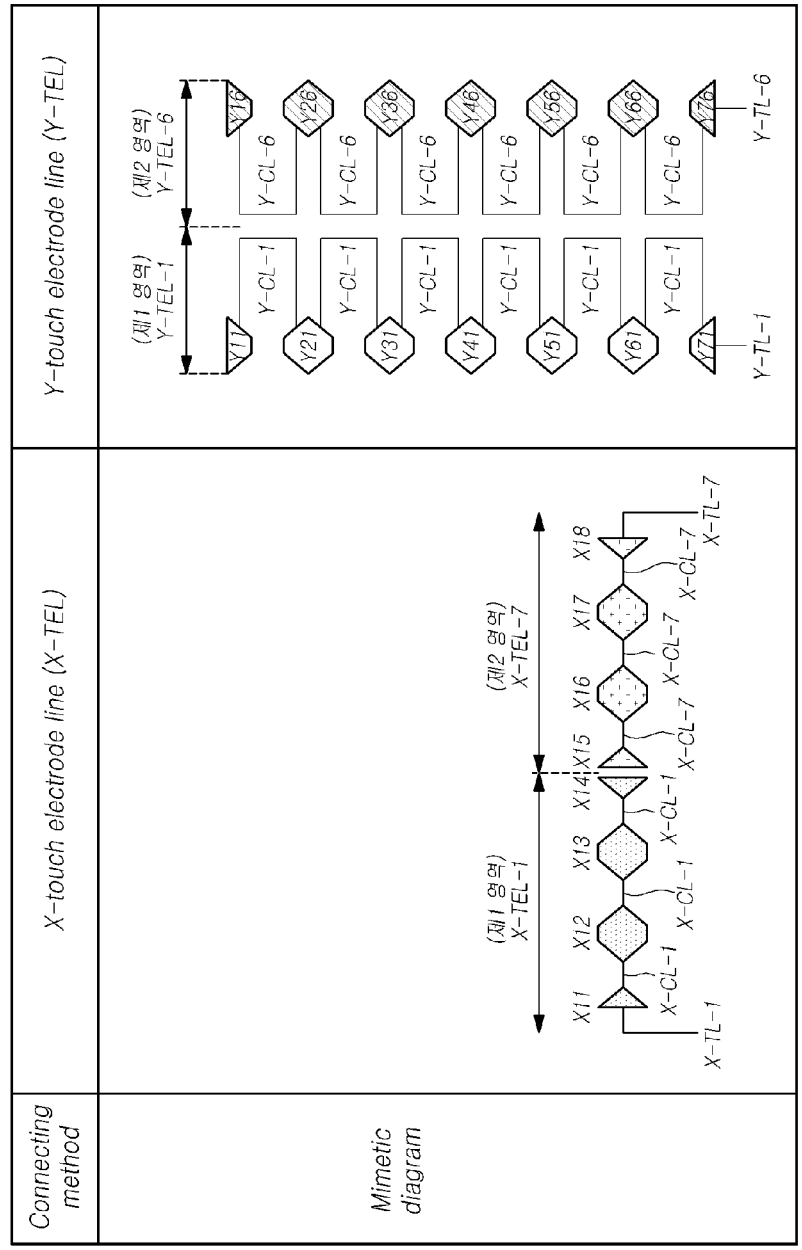

FIGS. 18 and 19 are views illustrating a third example of a single-layered touch sensor structure in a display panel (DISP) according to embodiments of the present disclosure.

Like the single-layered touch sensor structure in FIGS. 16 and 17, a single-layered touch sensor structure in FIGS. 18 and 19 has a plurality of Y-touch electrode connecting lines (Y-CL-1 to Y-CL-6) arranged in a bypass-connection structure in which the respective Y-touch electrode connecting lines (Y-CL-1 to Y-CL-6) surround the corresponding X-touch electrode lines (X-TEL-1 to X-TEL-12) provided therebetween so as to take a long way around two Y-touch electrodes, instead of passing directly therebetween, and a plurality of X-touch electrode connecting lines (X-CL-1 to X-CL-6) arranged in a non-bypass-connection structure to directly connect two X-touch electrodes.

However, the single-layered touch sensor structure shown in FIGS. 18 and 19 is different from the single-layered touch sensor structure shown in FIGS. 16 and 17 in that the touch sensing area is divided into a first area and a second area in a first direction in the display panel (DISP) so that m X-touch electrode lines (X-TEL-1 to X-TEL-12) am divided and arranged in the first area and the second area, respectively. In this case, m may be an even number (m=12 in the example of FIG. 18).

More specifically, m X-touch electrode lines (X-TEL-1 to X-TEL-12) may include m/2 first X-touch electrode lines (X-TEL-1 to X-TEL-6) and m/2 second X-touch electrode lines (X-TEL-7 to X-TEL-12) arranged in the first area and the second area, respectively, which am obtained by dividing the display panel (DISP) in the first direction.

The m/2 first X-touch electrode lines (X-TEL-1 to X-TEL-6) arranged in the first area may include a plurality of first X-touch electrodes (X11, X12, X13, X14, X21, X22, X23, X24, X31, X32, X33, X34, X41, X42, X43, X44, X51, X52, X53, X54, X61, X62, X63, and X64) arranged in the first direction, among all touch electrodes (TE) arranged in the display panel (DISP), and a plurality of first X-touch electrode connecting lines (X-CL-1 to X-CL-6) for electrically connecting the plurality of first X-touch electrodes (X11, X12, X13, X14, X21, X22, X23, X24, X31, X32, X33, X34, X41, X42, X43, X44, X51, X52, X53, X54, X61, X62, X63, and X64) to each other.

The m/2 second X-touch electrode lines (X-TEL-7 to X-TEL-12) arranged in the second area may include a plurality of second X-touch electrodes (X15, X16, X17, X18, X25, X26, X27, X28, X35, X36, X37, X38, X45, X46, X47, X48, X55, X56, X57, X58, X65, X66, X67, and X68) arranged in the first direction, among all touch electrodes (TE) arranged in the display panel (DISP), and a plurality of second X-touch electrode connecting lines (X-CL-7 to X-CL-12) for electrically connecting the plurality of second X-touch electrodes (X15, X16, X17, X18, X25, X26, X27, X28, X35, X36, X37, X38, X45, X46, X47, X48, X55, X56, X57, X58, X65, X66, X67, and X68) to each other.

The n Y-touch electrode lines (Y-TEL-1 to Y-TEL-6) may include a plurality of Y-touch electrodes (Y11, Y21, Y31, Y41, Y51, Y61, Y71, Y12, Y22, Y32, Y42, Y52, Y62, Y72, Y13, Y23, Y33, Y43, Y53, Y63, Y73, Y14, Y24, Y34, Y44, Y54, Y64, Y74, Y15, Y25, Y35, Y45, Y55, Y65, Y75, Y16, Y26, Y36, Y46, Y56, Y66, and Y76) arranged in a second direction different from the first direction and a plurality of Y-touch electrode connecting lines (Y-CL-1 to Y-CL-6) for electrically connecting the plurality of Y-touch electrodes (Y11, Y21, Y31, Y41, Y51, Y61, Y71, Y12, Y22, Y32, Y42, Y52, Y62, Y72, Y13, Y23, Y33, Y43, Y53, Y63, Y73, Y14, Y24, Y34, Y44, Y54, Y64, Y74, Y15, Y25, Y35, Y45, Y55, Y65, Y75, Y16, Y26, Y36, Y46, Y56, Y66, and Y76) to each other.

The n Y-touch electrode lines (Y-TEL-1 to Y-TEL-6) are divided into two parts and arranged in the first area and the second area. That is, n/2 Y-touch electrode lines (Y-TEL-1 to Y-TEL 3) of the n Y-touch electrode lines (Y-TEL-1 to Y-TEL-6) may be arranged in the first area, and the remaining n/2 Y-touch electrode lines (Y-TEL-4 to Y-TEL-6) may be arranged in the second area.

A plurality of first X-touch electrode connecting lines (X-CL-1 to X-CL-6) and a plurality of second X-touch electrode connecting lines (X-CL-7 to X-CL-12) included in the m/2 first X-touch electrode lines (X-TEL-1 to X-TEL-6) arranged in the first area and the m/2 second X-touch electrode lines (X-TEL-7 to X-TEL-12) arranged in the second area, respectively, have a non-bypass structure.

For example, each of a plurality of first X-touch electrode connecting lines (X-CL-1) included in the first X-touch electrode lines (X-TEL-1) arranged in the first area may directly connect two adjacent first X-touch electrodes, among a plurality of first X-touch electrodes (X11 to X14), instead of bypassing the same.

In addition, for example, each of a plurality of second X-touch electrode connecting lines (X-CL-7) included in the second X-touch electrode lines (X-TEL-7) arranged in the second area may directly connect two adjacent second X-touch electrodes, among a plurality of second X-touch electrodes (X15 to X18), instead of bypassing the same.

On the other hand, a plurality of Y-touch electrode connecting lines (Y-CL-1 to Y-CL-6) included in the n Y-touch electrode lines (Y-TEL-1 to Y-TEL-6) have a bypass-connection structure.

For example, the Y-touch electrode connecting lines (Y-CL-1) for electrically connecting a first Y-touch electrode (Y11) and a second Y-touch electrode (Y21), which are adjacent to each other, among a plurality of Y-touch electrodes (Y11 to Y71) included in the Y-touch electrode line (Y-TEL-1) arranged at the outermost position on one side in the n Y-touch electrode lines (Y-TEL-1 to Y-TEL-6), may be arranged so as to surround the whole or a part of one first X-touch electrode line (X-TEL-1).

As another example, the Y-touch electrode connecting lines (Y-CL-6) for electrically connecting a third Y-touch electrode (Y16) and a fourth Y-touch electrode (Y26), which are adjacent to each other, among a plurality of Y-touch electrodes (Y16 to Y76) included in the Y-touch electrode line (Y-TEL-6) arranged at the outermost position on the opposite side in the n Y-touch electrode lines (Y-TEL-1 to Y-TEL-6), may be arranged so as to surround the whole or a part of one second X-touch electrode line (X-TEL-7).

As shown in FIGS. 18 and 19, under the two-separation area structure in which the m X-touch electrode lines (X-TEL-1 to X-TEL-12) am divided into two parts and arranged in the first area and the second area, a plurality of Y-touch electrode connecting lines (Y-CL-1 to Y-CL-6) are designed in a bypass-connection structure, thereby relieving concentration of a large number of Y-touch electrode connecting lines (Y-CL-1 to Y-CL-6) between the X-touch electrodes (X-TE) and the Y-touch electrodes (Y-TE).

In other words, according to the example of the non-two-separation area structure shown in FIGS. 16 and 17, the maximum number of Y-touch electrode connecting lines (Y-CL) arranged between the X-touch electrodes (X-TE) and the Y-touch electrodes (Y-TE) is 6, and according to the example of the two-separation area structure shown in FIGS. 18 and 19, the maximum number of Y-touch electrode connecting lines (Y-CL) arranged between the X-touch electrodes (X-TE) and the Y-touch electrodes (Y-TE) is 3 (=6/2).

As described above, if the number of Y-touch electrode connecting lines (Y-CL) arranged between the X-touch electrodes (X-TIE) and the Y-touch electrodes (Y-TE) is reduced according to the two-separation area structure, the touch sensitivity based on the capacitance (mutual-capacitance) generated between the X-touch electrode (X-TE) and the Y-touch electrode (Y-TE) can be improved.

In addition, if the number of Y-touch electrode connecting lines (Y-CL) arranged between the X-touch electrodes (X-TE) and the Y-touch electrodes (Y-TE) is reduced according to the two-separation area structure, the gap between the X-touch electrode (X-TE) and the Y-touch electrode (Y-TE) is not required to be increased, thereby increasing the respective areas of the X-touch electrodes (X-TE) and the Y-touch electrodes (Y-TE). Therefore, the magnitude of the capacitance (mutual-capacitance) generated between the X-touch electrode (X-TE) and the Y-touch electrode (Y-TE) can be increased, thereby improving the touch sensitivity.

Referring to FIG. 18, the m X-touch electrode lines (X-TEL-1 to X-TEL-12) are electrically connected to a plurality of X-touch routing lines (X-TL-1 to X-TL-12). The n Y-touch electrode lines (Y-TEL-1 to Y-TEL-6) are electrically connected to a plurality of Y-touch routing lines (Y-TL-1 to Y-TL-6).

The plurality of X-touch routing lines (X-TL-1 to X-TL-12) are electrically connected to a plurality of X-touch pads (X-TP) arranged in the non-active area (NA). The plurality of Y-touch outing lines (Y-TL-1 to Y-TL-6) are electrically connected to a plurality of Y-touch pads (Y-TP) arranged in the non-active area (NA).

That is, the m outermost X-touch electrodes (X11, X21, X31, X41, X51, X61, X18, X28, X38, X48, X58, and X68) in the m X-touch electrode lines (X-TEL-1 to X-TEL-12) may be electrically connected to the m X-touch pads (X-TP) through the m X-touch routing lines (X-TL-1 to X-TL-6 and X-TL-7 to X-TL-12).

The n outermost Y-touch electrodes (Y71, Y72, Y73, Y74, Y75, and Y76) in the n Y-touch electrode lines (Y-TEL-1 to Y-TEL-6) may be electrically connected to the n Y-touch pads (Y-TP) through the n Y-touch muting lines (Y-TL-1 to Y-TL-6).

The m X-touch routing lines (X-TL-1 to X-TL-12) may be connected to or extended from the m outermost X-touch electrodes (X11, X21, X31, X41, X51, X61, X18, X28, X38, X48, X58, and X68), and may pass over the side of the encapsulation portion (ENCAP) and the top of at least one dam (DAM) to thus be electrically connected to the m X-touch pads (X-TP) provided in the non-active area (NA).

In addition, the n Y-touch electrode connecting lines (Y-CL-1 to Y-CL-6) may be connected to or extended from the n outermost Y-touch electrodes (Y71, Y72, Y73, Y74, Y75, and Y76), and may pass over the side of the encapsulation portion (ENCAP) and the top of at least one dam (DAM) to thus be electrically connected to the n Y-touch pads (Y-TP) provided in the non-active area (NA).

Referring to FIGS. 18 and 19, the first X-touch electrodes (X11, X21, X31, X41, X51, and X61) arranged at the outermost positions on one side, among a plurality of first X-touch electrodes included in the m/2 first X-touch electrode lines (X-TEL-1 to X-TEL-6), may have an area smaller than that of the first X-touch electrodes (X12, X13, X22, X23, X32, X33, X42, X43, X52, X53, X62, and X63), which are not arranged at the outermost positions.

In addition, the second X-touch electrodes (X18, X28, X38, X48, X58, and X68) arranged at the outermost positions on the other side, among a plurality of second X-touch electrodes included in the m/2 second X-touch electrode lines (X-TEL-7 to X-TEL-12), may have an area smaller than that of the second X-touch electrodes (X16, X17, X26, X27, X36, X37, X46, X47, X56, X57, X66, and X67), which are not arranged at the outermost positions.

For example, the area of the first X-touch electrodes (X11, X21, X31, X41, X51, and X61) arranged at the outermost positions on one side, among the plurality of first X-touch electrodes, may be half, or almost half (slightly greater or smaller than the half of), the area of the first X-touch electrodes (X12, X13, X22, X23, X32, X33, X42, X43, X52, X53, X62, and X63), which are not arranged at the outermost positions.

In addition, the area of the second X-touch electrodes (X18, X28, X38, X48, X58, and X68) arranged at the outermost positions on the other side, among the plurality of second X-touch electrodes, may be half, or almost half (slightly greater or smaller than the half of), the area of the second X-touch electrodes (X16, X17, X26, X27, X36, X37, X46, X47, X56, X57, X66, and X67), which are not arranged at the outermost positions.

For example, the shape of the first X-touch electrode (X12, X13, X22, X23, X32, X33, X42, X43, X52, X53, X62, or X63), which is not arranged at the outermost position, may be a square, such as a rhombus, or a hexagon, and the shape of the first X-touch electrode (X11, X21, X31, X41, X51, or X61) arranged at the outermost position may be a triangle obtained by symmetrically dividing a square, a square, a square obtained by symmetrically dividing a hexagon, a pentagon, or the like. The first X-touch electrode may be designed in various shapes, as well as the shapes described above.

In addition, for example, the shape of the second X-touch electrode (X16, X17, X26, X27, X36, X37, X46, X47, X56, X57, X66, or X67), which is not arranged at the outermost positions, may be a square, such as a rhombus, or a hexagon, and the shape of the second X-touch electrode (X18, X28, X38, X48, X58, or X68) arranged at the outermost position may be a triangle obtained by symmetrically dividing a square, a square, a square obtained by symmetrically dividing a hexagon, a pentagon, or the like. The second X-touch electrodes may be designed in various shapes, as well as the shapes described above.

At least one Y-touch electrode (Y11, Y12, Y13, Y14, Y15, Y16, Y71, Y72, Y73, Y74, Y75, or Y76) arranged at the outermost position, among a plurality of Y-touch electrodes included in the n Y-touch electrode lines (Y-TEL-1 to Y-TEL-6), may have an area smaller than that of the Y-touch electrode (Y21, Y22, or the like), which is not arranged at the outermost position.

For example, the area of the least one Y-touch electrode (Y11, Y12, Y13, Y14, Y15, Y16, Y71, Y72, Y73, Y74, Y75, or Y76) arranged at the outermost position may be half, or almost half, the area of the Y-touch electrode (Y21, Y22, or the like), which is not arranged at the outermost position.

For example, the shape of the Y-touch electrode (Y21, Y22, or the like), which is not arranged at the outermost position, may be a square, such as a rhombus, or a hexagon, and the shape of the Y-touch electrode (Y11, Y12, Y13, Y14, Y15, Y16, Y71, Y72, Y73, Y74, Y75, or Y76) arranged at the outermost position may be a triangle obtained by symmetrically dividing a square, a square, a square obtained by symmetrically dividing a hexagon, a pentagon, or the like. The Y-touch electrodes may be designed in various shapes, as well as the shapes described above.

According to the two-separation area structure in FIGS. 18 and 19, the first X-touch electrodes (X14, X24, X34, X44, X54, and X64) at the boundary with the second area, among a plurality of first X-touch electrodes arranged in the first area, have an area smaller than that of other first X-touch electrodes (X12, X13, and the like), which are not arranged at the outermost positions.

The second X-touch electrodes (X15, X25, X35, X45, X55, and X65) at the boundary with the first area, among a plurality of second X-touch electrodes arranged in the second area, have an area smaller than that of other second X-touch electrodes (X16, X17, or the like), which are not arranged at the outermost positions.

For example, the area of the first X-touch electrode (X14, X24, X34, X44, X54, or X64) at the boundary with the second area, among a plurality of first X-touch electrodes arranged in the first area, may be half, or almost half (slightly greater or smaller than the half of), the area of other first X-touch electrodes (X12, X13, and the like), which are not arranged at the outermost positions.

Similarly, the area of the second X-touch electrode (X15, X25, X35, X45, X55, or X65) at the boundary with the first area, among a plurality of second X-touch electrodes arranged in the second area, may be half, or almost half (slightly greater or smaller than the half of), the area of other second X-touch electrodes (X16, X17, and the like), which are not arranged at the outermost positions.

The imbalance in the area between the touch electrodes may reduce the capacitance and a variation thereof, thereby degrading the touch sensitivity.

In other words, the first X-touch electrodes (X14, X24, X34, X44, X54, and X64) having a small area, which are located at the boundary with the second area, among a plurality of first X-touch electrodes located in the first area, exhibit a small capacitance with the Y-touch electrodes and a small variation thereof, compared to the first X-touch electrodes having a large area, which are not located at the boundary. This may degrade the touch sensitivity.

In addition, the second X-touch electrodes (X15, X25, X35, X45, X55, and X65) having a small area, which are located at the boundary with the first area, among a plurality of second X-touch electrodes located in the second area, exhibit a small capacitance with the Y-touch electrodes and a small variation thereof, compared to the second X-touch electrodes having a large area, which are not located at the boundary. This may degrade the touch sensitivity.

As described above, in order to prevent the capacitance between the X-touch electrode and the Y-touch electrode and a variation thereof from being lowered due to the imbalance in the area between the first and second X-touch electrodes (X14, X24, X34, X44, X54, X64, X15, X25, X35, X45, X55, and X65), which are located around the boundary between the two separated areas, and the first and second X-touch electrodes (X12, X13, X16, X17, and the like), which are not located around the boundary, and in order to prevent the touch sensitivity from deteriorating according thereto, a touch sensor structure capable of resolving the imbalance in the area between the touch electrodes and increasing the capacitance between the X-touch electrode and the Y-touch electrode and a variation thereof, thereby improving the touch sensitivity, will be described below.

Figure 20:
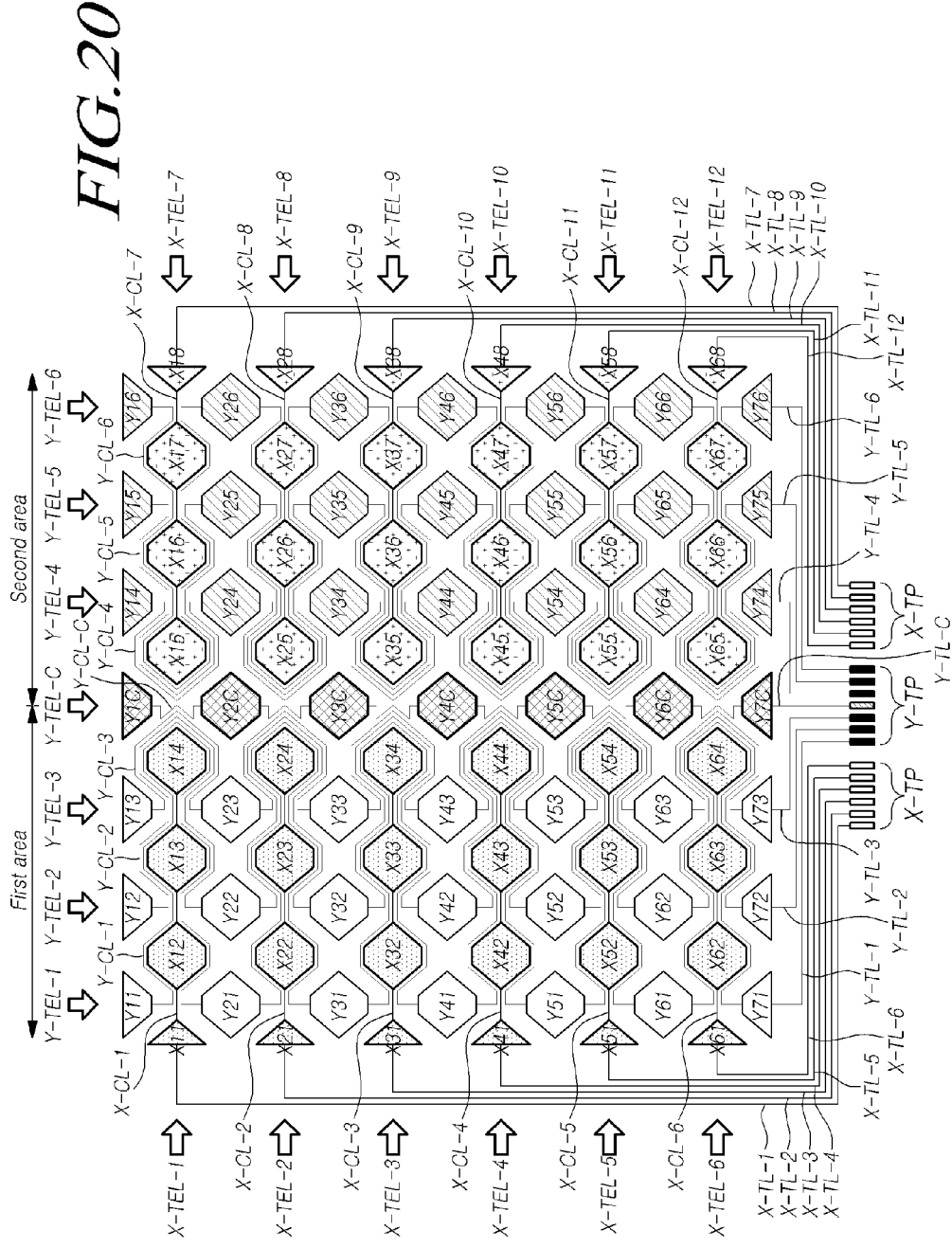
Figure 21:
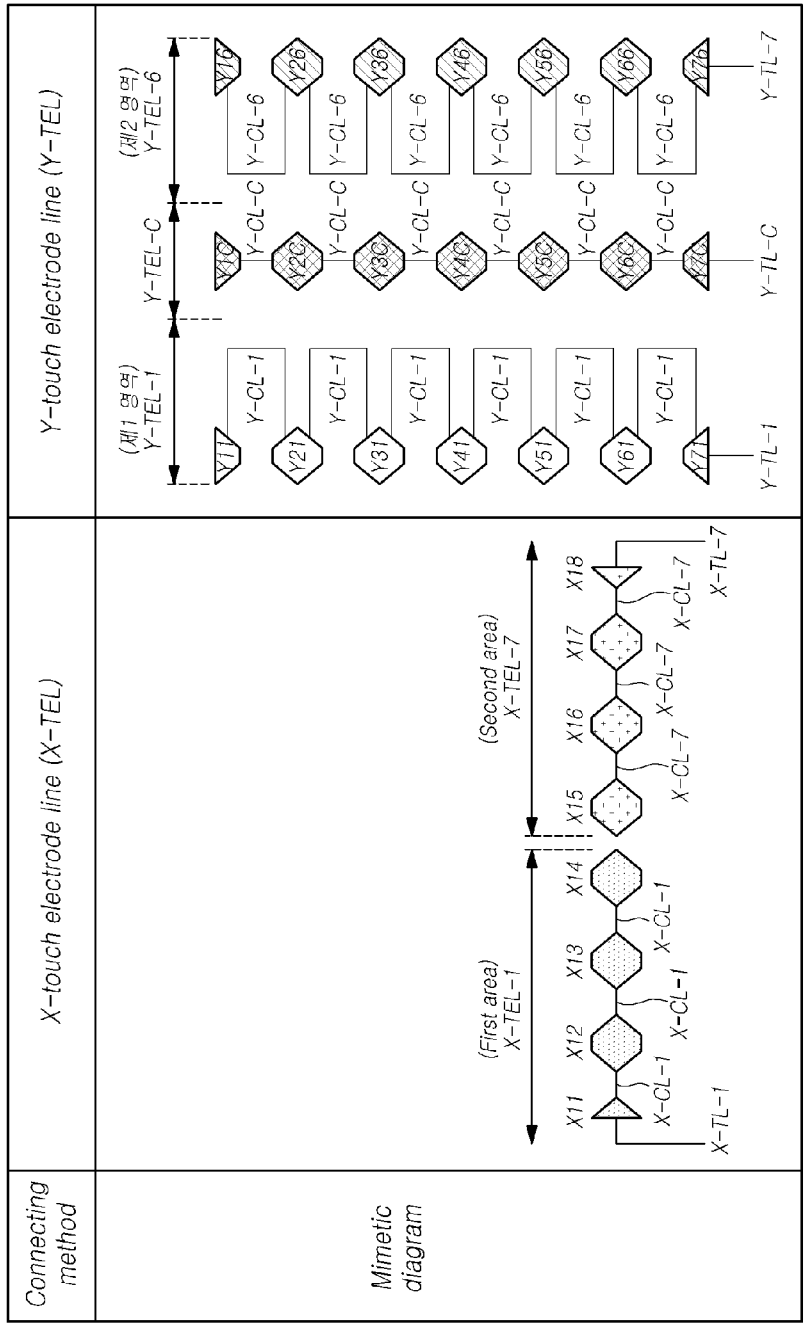
Figure 22:
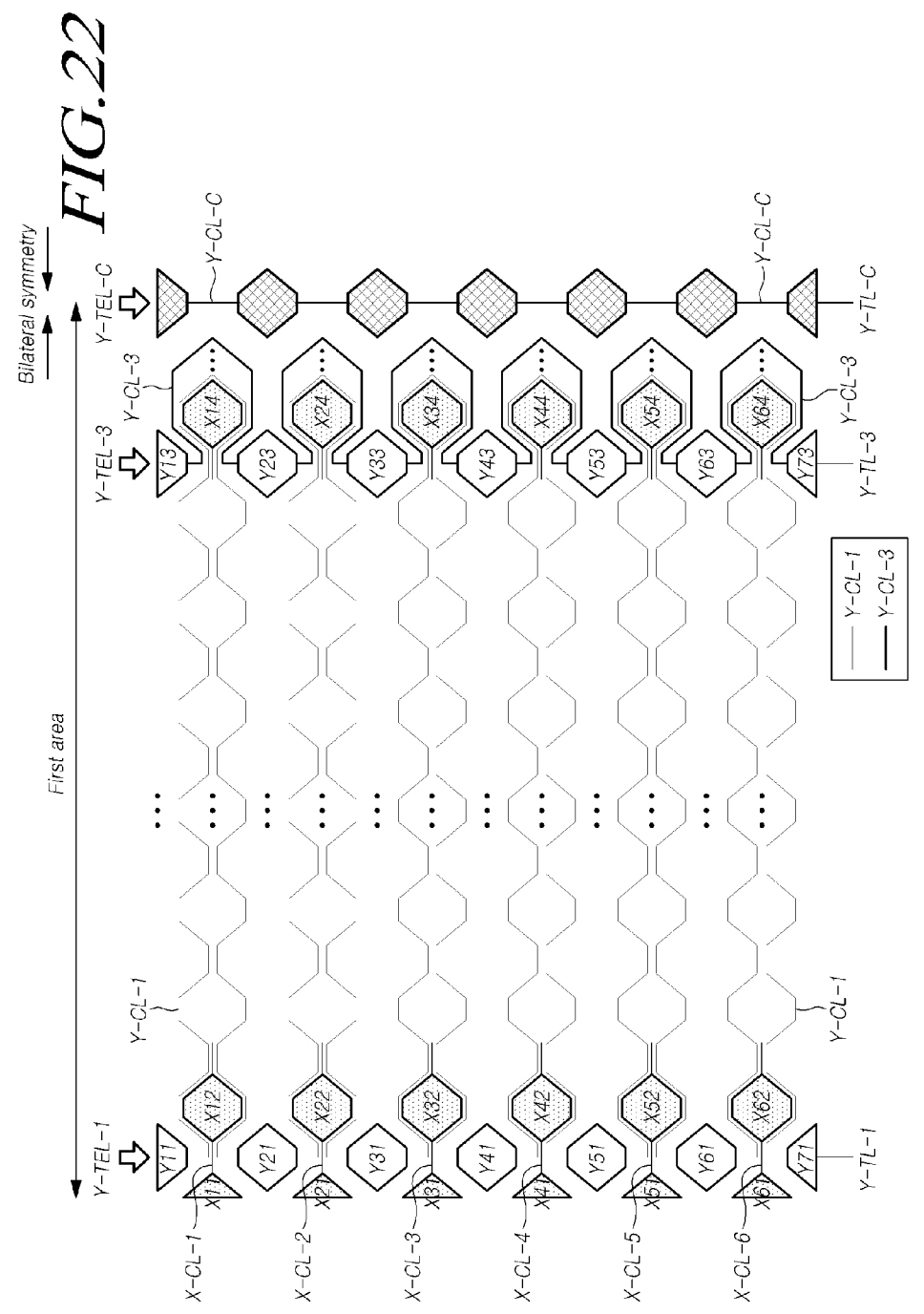

FIGS. 20 to 22 are views illustrating a fourth example of a single-layered touch sensor structure in a display panel (DISP) according to embodiments of the present disclosure.

Referring to FIGS. 20 to 22, a single-layered touch sensor structure embedded in a display panel (DISP) according to embodiments of the present disclosure may increase the capacitance between the X-touch electrode and the Y-touch electrode and a variation thereof, thereby improving the touch sensitivity by resolving the imbalance in the area between the first and second X-touch electrodes (X14, X24, X34, X44, X54, X64, X15, X25, X35, X45, X55, and X65), which are located around the boundary between the two separated areas, and the first and second X-touch electrodes (X12, X13, X16, X17, and the like), which are not located around the boundary, under the two-separation area structure for the m X-touch electrode lines (X-TEL-1 to X-TEL-12).

Referring to FIGS. 20 to 22, in the single-layered touch sensor structure embedded in the display panel (DISP) according to embodiments of the present disclosure, the area of the first X-touch electrode (X14, X24, X34, X44, X54, or X64) and the second X-touch electrode (X15, X25, X35, X45, X55, or X65), which are located around the boundary between the first area and the second area, are the same as or similar to the area of the first X-touch electrode (X12, X13, or the like) and the second X-touch electrode (X16, X17, or the like), which are not located around the boundary.

For example, the first X-touch electrode (X14, X24, X34, X44, X54, or X64) and the second X-touch electrode (X15, X25, X35, X45, X55, or X65), which are located around the boundary between the first area and the second area, may have the same shape and area as those of the first X-touch electrode (X12, X13, or the like) and the second X-touch electrode (X16, X17, or the like), which are not located around the boundary.

Accordingly, it is possible to reduce or eliminate the imbalance in the area between the first and second X-touch electrodes (X14, X24, X34, X44, X54, X64, X15, X25, X35, X45, X55, and X65), which are located around the boundary between the two areas, and the first and second X-touch electrodes (X12, X13, X16, X17, and the like), which are not located around the boundary, in the two-separation area structure of the m X-touch electrode lines (X-TEL-1 to X-TEL-12).

As described above, by allowing the area of the first X-touch electrode (X14, X24, X34, X44, X54, or X64) and the second X-touch electrode (X15, X25, X35, X45, X55, or X65), which are located around the boundary between the first area and the second area, to be the same as or similar to the area of the first X-touch electrode (X12, X13, or the like) and the second X-touch electrode (X16, X17, or the like), which are not located around the boundary, a central Y-touch electrode line (Y-TEL-C) may be further arranged between the first X-touch electrodes (X14, X24, X34, X44, X54, and X64) located in the first area and the second X-touch electrodes (X15, X25, X35, X45, X55, and X65) located in the second area around the boundary between the first area and the second area.

A Y-touch electrode connecting lines (Y-CL-C) in the central Y-touch electrode line (Y-TEL-C) has a different arrangement structure from the Y-touch electrode connecting lines (Y-CL-1 to Y-CL-6) in other Y-touch electrode lines (Y-TEL-1 to Y-TEL-6).

Hereinafter, a single-layered touch sensor structure for eliminating the imbalance in the area between the touch electrodes will be described in more detail.

A single-layered touch sensor structure for eliminating the imbalance in the area between the touch electrodes includes n Y-touch electrode lines (Y-TEL-1, Y-TEL-2, Y-TEL-3, Y-TEL-C, Y-TEL-4, Y-TEL-5, and Y-TEL-6), wherein n is an odd number and n=7 in the example in FIG. 20.

Referring to FIG. 20, the n Y-touch electrode lines (Y-TEL-1, Y-TEL-2, Y-TEL-3, Y-TEL-C, Y-TEL-4, Y-TEL-5, and Y-TEL-6) may include a central Y-touch electrode line (Y-TEL-C) arranged in the center, n1 (n1 is a natural number of 1 or more) Y-touch electrode lines (Y-TEL-1, Y-TEL-2, and Y-TEL-3) arranged in the first area at one side of the central Y-touch electrode line (Y-TEL-C), and n2 (n2 is a natural number of 1 or more, where n1+n2+1=n and n1=n2) Y-touch electrode lines (Y-TEL-4, Y-TEL-5, and Y-TEL-6) arranged in the second area at the opposite side of the central Y-touch electrode line (Y-TEL-C).

The central Y-touch electrode line (Y-TEL-C may include a plurality of Y-touch electrodes (Y1C, Y2C, Y3C, Y4C, Y5C, Y6C, and Y7C), which are arranged in the same column (or row) in the second direction, and a plurality of Y-touch electrode connecting lines (Y-CL-C) for electrically connecting the plurality of Y-touch electrodes (Y1C, Y2C, Y3C, Y4C, Y5C, Y6C, and Y7C), which are arranged in the same column (or row) in the second direction, to each other.

The n1 Y-touch electrode lines (Y-TEL-1, Y-TEL-2, and Y-TEL-3) may include a plurality of Y-touch electrodes (Y11, Y21, Y31, Y41, Y51, Y61, Y71, Y12, Y22, Y32, Y42, Y52, Y62, Y72, Y13, Y23, Y33, Y43, Y53, Y63, and Y73), which are arranged in the same column in the second direction in the first area, and a plurality of Y-touch electrode connecting lines (Y-CL-1, Y-CL-2, and Y-CL-3) for electrically connecting the plurality of Y-touch electrodes (Y11, Y21, Y31, Y41, Y51, Y61, Y71, Y12, Y22, Y32, Y42, Y52, Y62, Y72, Y13, Y23, Y33, Y43, Y53, Y63, and Y73), which are arranged in the same column in the second direction in the first area, to each other.

The n2 Y-touch electrode lines (Y-TEL-4, Y-TEL-5, and Y-TEL-6) may include a plurality of Y-touch electrodes (Y14, Y15, Y16, Y24, Y25, Y26, Y34, Y35, Y36, Y44, Y45, Y46, Y54, Y55, Y56, Y64, Y65, Y66, Y74, Y75, and Y76), which are arranged in the same column in the second direction in the second area, and a plurality of Y-touch electrode connecting lines (Y-CL-4, Y-CL-5, and Y-CL-6) for electrically connecting the plurality of Y-touch electrodes (Y14, Y15, Y16, Y24, Y25, Y26, Y34, Y35, Y36, Y44, Y45, Y46, Y54, Y55, Y56, Y64, Y65, Y66, Y74, Y75, and Y76), which are arranged in the same column in the second direction in the second area, to each other.

The first X-touch electrodes (X14, X24, X34, X44, X54, and X64) adjacent to the central Y-touch electrode line (Y-TEL-C), among the first X-touch electrodes (X14, X24, X34, X44, X54, X64, X11, X21, X31, X41, X51, and X61) arranged at the outermost positions on both sides in a plurality of first X-touch electrodes (X11, X12, X13, X14, X21, X22, X23, X24, X31, X32, X33, X34, X41, X42, X43, X44, X51, X52, X53, X54, X61, X62, X63, and X64) included in the m/2 first X-touch electrode lines (X-TEL-1 to X-TEL-6), have a larger area than the first X-touch electrodes (X11, X21, X31, X41, X51, and X61) arranged at the outermost positions at the opposite side, and may have an area equal or similar to the first X-touch electrodes (X12, X13, X22, X23, X32, X33, X42, X43, X52, X53, X62, and X63), which are not arranged at the outermost positions on both sides.

The second X-touch electrodes (X15, X25, X35, X45, X55, and X65) adjacent to the central Y-touch electrode line (Y-TEL-C), among the second X-touch electrodes (X15, X25, X35, X45, X55, X65, X18, X28, X38, X48, X58, and X68) arranged at the outermost positions on both sides in a plurality of second X-touch electrodes (X15, X16, X17, X18, X25, X26, X27, X28, X35, X36, X37, X38, X45, X46, X47, X48, X55, X56, X57, X58, X65, X66, X67, and X68) included in the m/2 second X-touch electrode lines (X-TEL-7 to X-TEL-12), have a larger area than the second X-touch electrodes (X18, X28, X38, X48, X58, and X68) arranged at the outermost positions on the opposite side, and may have an area equal or similar to the second X-touch electrodes (X16, X17, X26, X27, X36, X37, X46, X47, X56, X57, X66, and X67), which are not arranged at the outermost positions on both sides.

According to the above description, under the two-separation area structure for the m X-touch electrode lines (X-TEL-1 to X-TEL-12), it is possible to resolve the imbalance in the area between the first and second X-touch electrodes (X14, X24, X34, X44, X54, X64, X15, X25, X35, X45, X55, and X65), which are located around the boundary between the two areas, and the first and second X-touch electrodes (X12, X13, X16, X17, and the like), which are not located around the boundary, and to thus increase the capacitance between the X-touch electrode and the Y-touch electrode and a variation thereof around the boundary between two areas, thereby improving the touch sensitivity.

The Y-touch electrode connecting line (Y-CL-2) for electrically connecting the fifth Y-touch electrode (Y12) and the sixth Y-touch electrode (Y22), which are adjacent to each other, among a plurality of Y-touch electrodes (Y12, Y22, Y32, Y42, Y52, Y62, and Y72) included in the Y-touch electrode line (Y-TEL-2) adjacent to the Y-touch electrode line (Y-TEL-1) arranged at the outermost position on one side in the first area in the n Y-touch electrode lines (Y-TEL-1 to Y-TEL-6), may be arranged so as to surround a part of the first X-touch electrode lines (X-TEL-1) surrounded by the Y-touch electrode connecting line (Y-CL-1) for electrically connecting the first Y-touch electrode (Y11) and the second Y-touch electrode (Y21) included in the Y-touch electrode line (Y-TEL-1) arranged at the outermost position on one side, among the n Y-touch electrode lines (Y-TEL-1 to Y-TEL-6).

The Y-touch electrode connecting line (Y-CL-2) for electrically connecting the fifth Y-touch electrode (Y12) and the sixth Y-touch electrode (Y22), which are adjacent to each other, among a plurality of Y-touch electrodes (Y12, Y22, Y32, Y42, Y52, Y62, and Y72) included in the Y-touch electrode line (Y-TEL-2) adjacent to the Y-touch electrode line (Y-TEL-1) arranged at the outermost position on one side in the first area in the n Y-touch electrode lines (Y-TEL-1 to Y-TEL-6), may be shorter than the Y-touch electrode connecting line (Y-CL-1) for electrically connecting the first Y-touch electrode (Y11) and the second Y-touch electrode (Y21) included in the Y-touch electrode line (Y-TEL-1) arranged at the outermost position on one side, among the n Y-touch electrode lines (Y-TEL-1 to Y-TEL-6).

The Y-touch electrode connecting line (Y-CL-5) for electrically connecting the seventh Y-touch electrode (Y15) and the eighth Y-touch electrode (Y25), which are adjacent to each other, among a plurality of Y-touch electrodes (Y15, Y25, Y35, Y45, Y55, Y65, Y75) included in the Y-touch electrode line (Y-TEL-5) adjacent to the Y-touch electrode line (Y-TEL-6) arranged at the outermost position on the opposite side in the second area in the n Y-touch electrode lines (Y-TEL-1 to Y-TEL-6), may be arranged so as to surround a part of the second X-touch electrode lines (X-TEL-7) surrounded by the Y-touch electrode connecting line (Y-CL-6) for electrically connecting the third Y-touch electrode (Y16) and the fourth Y-touch electrode (Y26) included in the Y-touch electrode line (Y-TEL-6) arranged at the outermost position on the opposite side in the second area, among the n Y-touch electrode lines (Y-TEL-1 to Y-TEL-6).

The Y-touch electrode connecting line (Y-CL-5) for electrically connecting the seventh Y-touch electrode (Y15) and the eighth Y-touch electrode (Y25), which are adjacent to each other, among a plurality of Y-touch electrodes (Y15, Y25, Y35, Y45, Y55, Y65, and Y75) included in the Y-touch electrode line (Y-TEL-5) adjacent to the Y-touch electrode line (Y-TEL-6) arranged at the outermost position on the opposite side in the second area in the n Y-touch electrode lines (Y-TEL-1 to Y-TEL-6), may be shorter than the Y-touch electrode connecting line (Y-CL-6) for electrically connecting the third Y-touch electrode (Y16) and the fourth Y-touch electrode (Y26) included in the Y-touch electrode line (Y-TEL-6) arranged at the outermost position on the opposite side in the second area, among the n Y-touch electrode lines (Y-TEL-1 to Y-TEL-6).

A plurality of Y-touch electrode connecting lines (Y-CL-C) included in the central Y-touch electrode line (Y-TEL-C) may be arranged between the first area where the m/2 first X-touch electrode lines (X-TEL-1 to X-TEL-6) are arranged and the second area where the m/2 second X-touch electrode lines (X-TEL-7 to X-TEL-12) are arranged.

According to the above description, the Y-touch electrode connecting lines (Y-CL-1 to Y-CL-3) included in the n/2 first Y-touch electrode line (Y-TEL-1 to Y-TEL-3) and the Y-touch electrode connecting lines (Y-CL-4 to Y-CL-6) included in the n/2 second Y-touch electrode line (Y-TEL-4 to Y-TEL-6) may electrically connect corresponding Y-touch electrodes through a bypass-connection structure in which the Y-touch electrode connecting lines are arranged so as to surround and bypass the first and second X-touch electrode lines, whereas the Y-touch electrode connecting lines (Y-CL-C) included in the central Y-touch electrode line (Y-TEL-C) may electrically connect the Y-touch electrodes by a non-bypass-connection structure.

As shown in FIG. 22, the touch sensor structure in the first area and the touch sensor structure in the second area may be designed in bilateral symmetry. Alternatively, the touch sensor structure in the first area and the touch sensor structure in the second area may be designed identically.

Addition of the central Y-touch electrode line (Y-TEL-C) in the structure described above may enable mutual-capacitance-based touch sensing even when designing to increase the area of the first and second touch electrodes around the boundary between two areas in order to eliminate the imbalance in the area between the touch electrodes under the two-separation area structure.

Referring to FIG. 20, the n Y-touch electrode lines (Y-TEL-1 to Y-TEL-3, Y-TEL C, and Y-TEL-4 to Y-TEL-6) have different lengths. In particular, the Y-touch electrode line (Y-TEL-1) arranged at the outermost position is much longer than the Y-touch electrode line (Y-TEL-3) adjacent to the central Y-touch electrode line (Y-TEL-C).

This is due to the fact that the Y-touch electrode connecting lines (Y-CL-1) included in the outermost Y-touch electrode line (Y-TEL-1) make a detour much farther than the Y-touch electrode connecting lines (Y-CL-3) included in the Y-touch electrode line (Y-TEL-3) adjacent to the central Y-touch electrode line (Y-TEL-C).

The difference in the length between the n Y-touch electrode lines (Y-TEL-1 to Y-TEL 3, Y-TEL C, and Y-TEL-4 to Y-TEL-6) may cause the difference in the capacitance and resistance. This may also degrade the touch sensitivity.

Accordingly, a single-layered touch sensor structure capable of reducing the difference in the length between the n Y-touch electrode lines (Y-TEL-1 to Y-TEL 3, Y-TEL C, and Y-TEL-4 to Y-TEL-6) will be described below.

Figure 23:
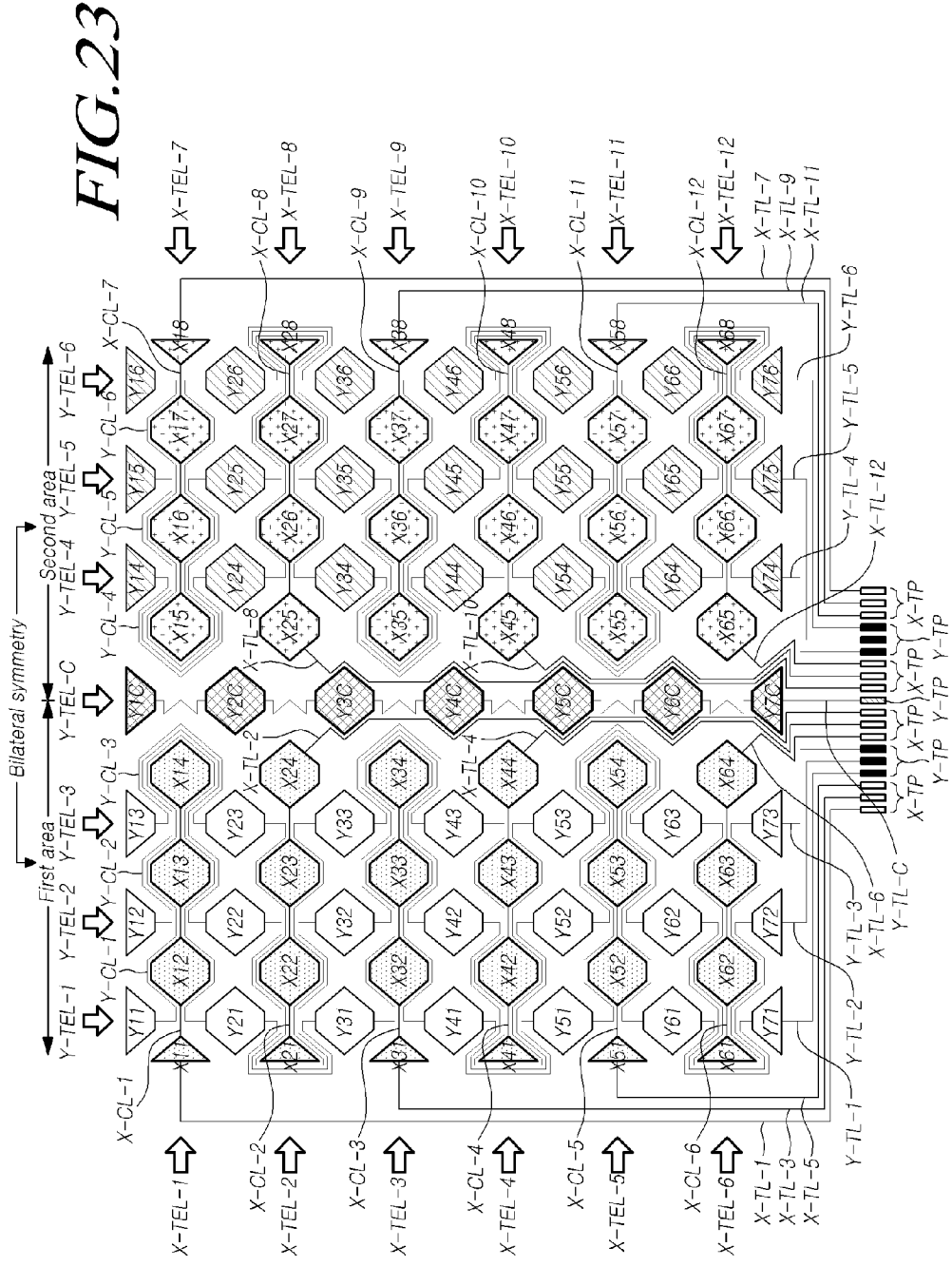
FIGS. 23 and 24 are views illustrating a fifth example of a single-layered touch sensor structure in a display panel according to embodiments of the present disclosure.
Figure 24:
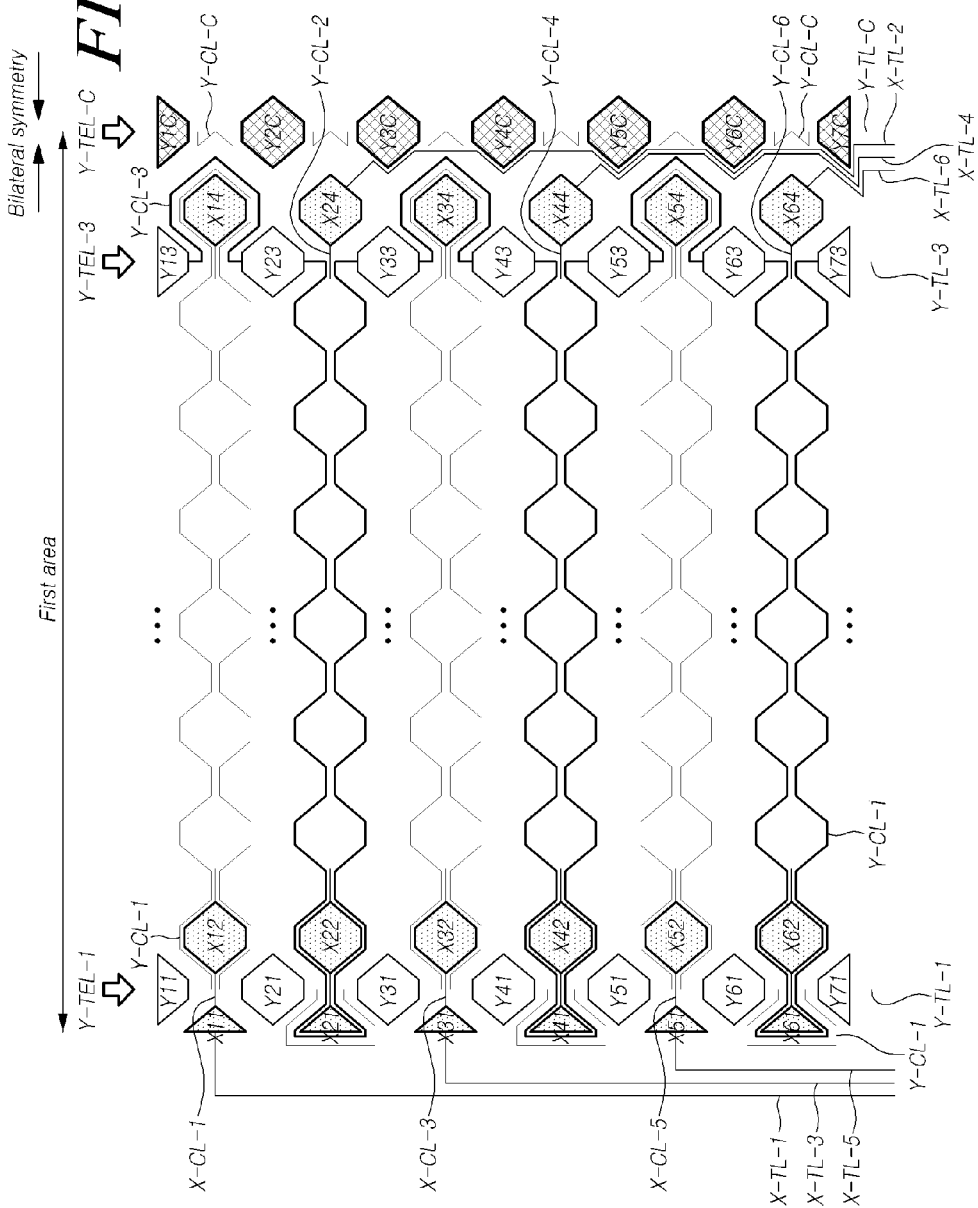
Figure 25:
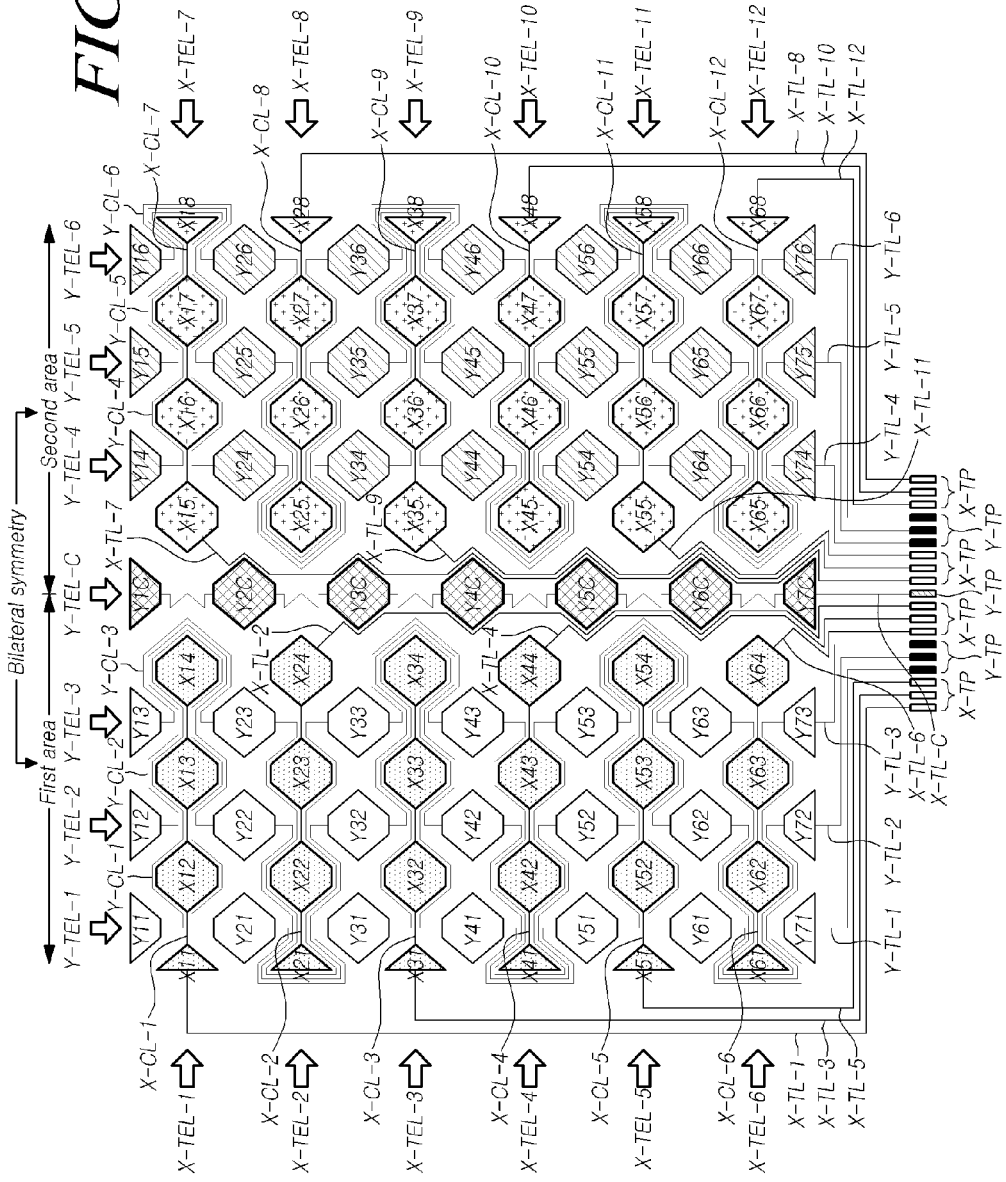
FIGS. 25 and 26 are views illustrating a sixth example of a single-layered touch sensor structure in a display panel according to embodiments of the present disclosure.
Figure 26:
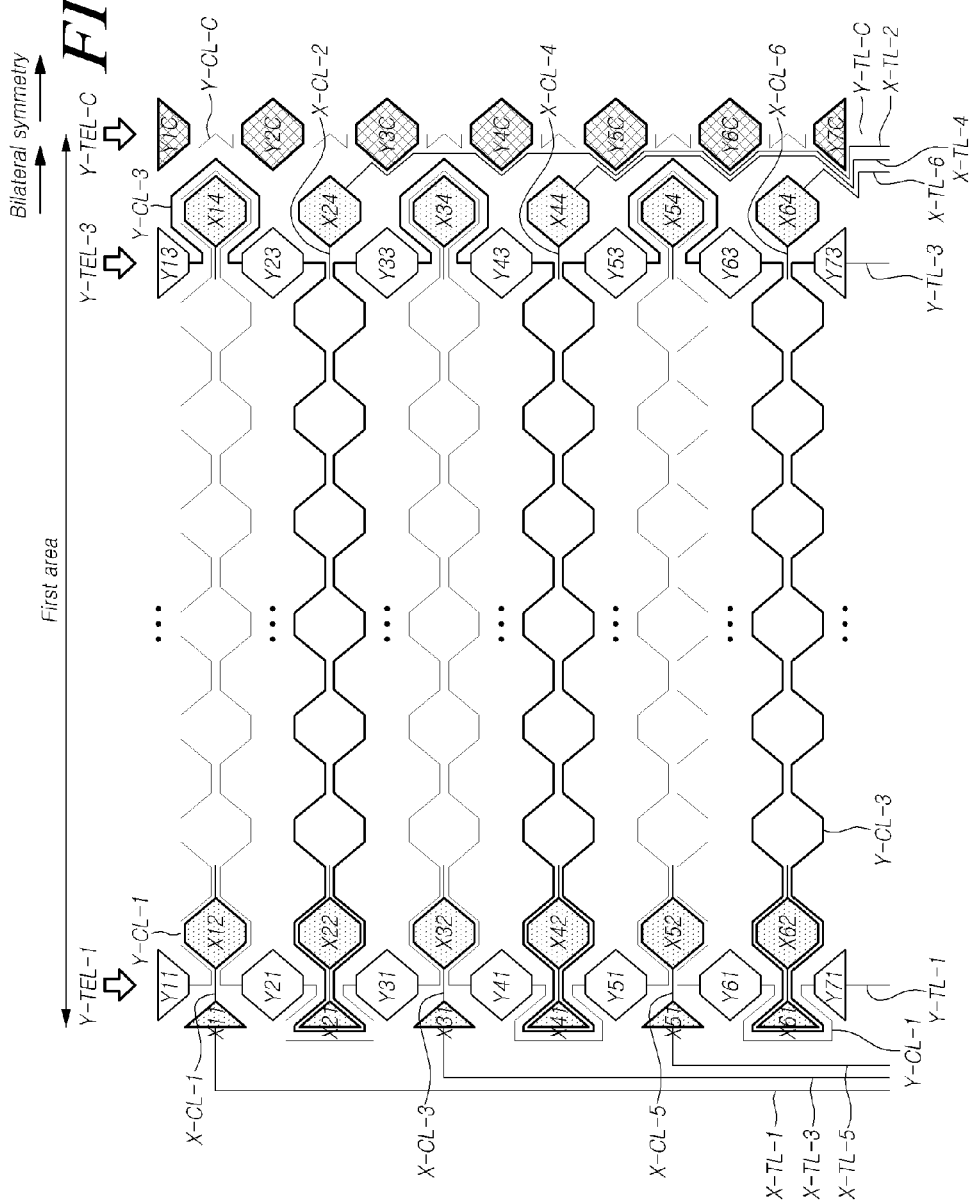

FIGS. 23 and 24 are views illustrating a fifth example of a single-layered touch sensor structure in a display panel (DISP) according to embodiments of the present disclosure, and FIGS. 25 and 26 are views illustrating a sixth example of a single-layered touch sensor structure in a display panel (DISP) according to embodiments of the present disclosure.

Referring to FIGS. 23 to 26, the Y-touch electrode connecting lines (Y-CL-1 to Y-CL-3 and Y-CL-4 to Y-CL-6) included in the Y-touch electrode lines (Y-TEL-1 to Y-TEL-3) arranged in the first area and the Y-touch electrode lines (Y-TEL-4 to Y-TEL-6) arranged in the second area, respectively, may take a detour alternately.

The alternate-bypass-connection structure of the Y-touch electrode connecting lines (Y-CL-1 to Y-CL-3 and Y-CL-4 to Y-CL-6) will be described in more detail below.

The Y-touch electrode connecting line (Y-CL-1) for electrically connecting the first Y-touch electrode (Y11) and the second Y-touch electrode (Y21), among a plurality of Y-touch electrodes (Y11, Y21, Y31, Y41, Y51, Y61, and Y71) included in the Y-touch electrode line (Y-TEL-1) arranged at the outermost position on one side in the first area in the n1 Y-touch electrode lines (Y-TEL-1 to Y-TEL-3) arranged in the first area, may extend toward the center so as to bypass and surround the whole or a part of the first X-touch electrode line (X-TEL-1) arranged between the first Y-touch electrode (Y11) and the second Y-touch electrode (Y21).

The Y-touch electrode connecting line (Y-CL-3) for electrically connecting the ninth Y-touch electrode (Y23) and the tenth Y-touch electrode (Y33) arranged with the third X-touch electrode line (X-TEL-2) under the first X-touch electrode line (X-TEL-1) interposed therebetween, among a plurality of Y-touch electrodes (Y3, Y23, Y33, Y43, Y53, Y63, and Y73) included in the Y-touch electrode line (Y-TEL-3) arranged at one side of the central Y-touch electrode line (Y-TEL-C) in the n1 Y-touch electrode lines (Y-TEL-1 to Y-TEL-3), may extend outwards from the center so as to bypass and surround the whole or a part of the second X-touch electrode line (X-TEL-2).

As described above, the Y-touch electrode connecting line (Y-CL-3) is arranged to surround the whole or a part of the second X-touch electrode line (X-TEL-2) and the Y-touch electrode connecting line (Y-CL-1) is arranged to surround the whole or a part of the first X-touch electrode line (X-TEL-1) make a detour in the opposite directions to each other such that start points and end points thereof are opposite to each other.

However, the Y-touch electrode connecting line (Y-CL-3) is arranged to surround the whole or a part of the second X-touch electrode line (X-TEL-2) has a length corresponding to the length of the Y-touch electrode connecting line (Y-CL-1) arranged so as to surround the whole or a part of the first X-touch electrode line (X-TEL-1).

According to the aforementioned alternate-bypass-connection structure of the Y-touch electrode connecting lines (Y-CL-1 to Y-CL-3 and Y-CL-4 to Y-CL-6), it is possible to reduce the difference in the length between the Y-touch electrode lines (Y-TEL-1 to Y-TEL-3 and Y-TEL-4 to Y-TEL-16) and to thus equalize the electrical characteristics (capacitance, resistance, etc.) of the respective Y-touch electrode lines (Y-TEL-1 to Y-TEL-3 and Y-TEL-4 to Y-TEL-6), thereby improving the touch sensing performance.

As shown in FIGS. 23 and 24, in terms of the alternate-bypass-connection structure, a plurality of Y-touch electrode connecting lines (Y-CL-1 to Y-CL-3) included in the n1 Y-touch electrode lines (Y-TEL-1 to Y-TEL-3) arranged in the first area at one side of the central Y-touch electrode line (Y-TEL-C and a plurality of Y-touch electrode connecting lines (Y-CL-4 to Y-CL-6) included in the n2 Y-touch electrode lines (Y-TEL to Y-TEL-6) arranged in the second area at the other side of the central Y-touch electrode line (Y-TEL-C) may be arranged symmetrically with respect to the central Y-touch electrode line (Y-TEL-C).

Alternatively, as shown in FIG. 25 and FIG. 26, in terms of the alternate-bypass-connection structure, a plurality of Y-touch electrode connecting lines (Y-CL-1 to Y-CL-3) included in the n1 Y-touch electrode lines (Y-TEL-1 to Y-TEL-3) arranged in the first area at one side of the central Y-touch electrode line (Y-TEL-C and a plurality of Y-touch electrode connecting lines (Y-CL-4 to Y-CL-6) included in the n2 Y-touch electrode lines (Y-TEL to Y-TEL-6) arranged in the second area at the other side of the central Y-touch electrode line (Y-TEL-C may arranged so as to correspond to each other with respect to the central Y-touch electrode line (Y-TEL-C).

As shown in FIG. 23, in the case of a structure in which the Y-touch electrode connecting lines (Y-CL-1 to Y-CL-3) in the first area and the Y-touch electrode connecting lines (Y-CL-4 to Y-CL-6) in the second area are symmetrical with respect to the central Y-touch electrode line (Y-TEL-C), all of n/2 (three) Y-touch electrode connecting lines (Y-CL-1 to Y-CL-3) arranged in the first area and n/2 (three) Y-touch electrode connecting lines (Y-CL-4 to Y-CL-6) in the second area are concentrated in the area between the first X-touch electrode (X14) and the second X-touch electrode (X15) at the boundary between the first area and the second area.

That is, a lot of Y-touch electrode connecting lines (Y-CL-1 to Y-CL-3 and Y-CL-4 to Y-CL-6) are concentrated in the area between the first X-touch electrode (X14) and the Y-touch electrodes (Y1C and Y2C) and between the second X-touch electrode (X15) and the Y-touch electrodes (Y1C and Y2C) at the boundary between the first area and the second area.

Therefore, in the boundary area between the first area and the second area, the gap between the first X-touch electrode (X14) and the Y-touch electrode (Y1C or Y2C) and the gap between the second X-touch electrode (X15) and the Y-touch electrode (Y1C or Y2C) are required to be increased, or the areas of the first X-touch electrode (X14), the second X-touch electrode (X15), and the Y-touch electrodes (Y1C and Y2C) need to be reduced.

This will reduce the capacitance between the first X-touch electrode (X14) and the Y-touch electrodes (Y1C and Y2C) and a variation thereof and the capacitance between the second X-touch electrode (X15) and the Y-touch electrodes (Y1C and Y2C) and a variation thereof, thereby lowering the touch sensitivity.

The gap between the first X-touch electrode (X14) and the Y-touch electrode (Y1C or Y2C) and the gap between the second X-touch electrode (X15) and the Y-touch electrode (Y1C or Y2C) in the boundary area (BA) between the first area and the second area may be as a "dead zone" that lowers the touch sensitivity.

That is, as shown in FIG. 23, in the case of a structure in which the Y-touch electrode connecting lines (Y-CL-1 to Y-CL-3) in the first area and the Y-touch electrode connecting lines (Y-CL-4 to Y-CL-6) in the second area are symmetrical with respect to the central Y-touch electrode line (Y-TEL-C, the dead zone becomes large, thereby lowering the touch performance.

However, as shown in FIG. 25, in the case of a structure in which the Y-touch electrode connecting lines (Y-CL-1 to Y-CL-3) in the first area and the Y-touch electrode connecting lines (Y-CL-4 to Y-CL-6) in the second area correspond to each other with respect to the central Y-touch electrode line (Y-TEL-C), the dead zone may be reduced, thereby improving the touch performance corresponding thereto.

More specifically, referring to FIG. 25, three Y-touch electrode connecting lines (Y-CL-1 to Y-CL-3) are arranged between the first X-touch electrode (X14) and the Y-touch electrodes (Y1C and Y2C), whereas no Y-touch electrode connecting line is arranged between the second X-touch electrode (X15) and the Y-touch electrodes (Y1C and Y2C) in the boundary area between the first area and the second area.

Thus, it is possible to reduce the gap between the second X-touch electrode (X15) and the Y-touch electrode (Y1C or Y2C), or to increase the area of the touch electrode in the boundary area between the first area and the second area. Accordingly, it is possible to increase the mutual capacitance and a variation thereof, thereby improving the touch sensitivity.

Referring to FIGS. 23 to 26, a plurality of Y-touch routing lines (Y-TL-1 to Y-TL-3, Y-TL-C, and Y-TL-1 to Y-TL-6) for electrically connecting the n Y-touch electrode lines (Y-TEL-1 to Y-TEL 3, Y-TEL C, and Y-TEL-4 to Y-TEL-6) to the touch sensing circuit (TSC) are arranged outside the area where a plurality of touch electrodes (TE) are arranged.

Referring to FIGS. 23 and 25, according to the alternate-bypass-connection structure of the Y-touch electrode connecting lines (Y-CL-1 to Y-CL-3, Y-CL-C, and Y-CL-4 to Y-CL-6) described above, some (X-TL-1, X-TL-3, X-TL-5, X-TL-7, X-TL-9, and X-TL-11 in the case of the symmetrical structure in FIG. 23 or X-TL-1, X-TL-3, X-TL-5, X-TL-8, X-TL-10, and X-TL-12 in the case of the corresponding structure in FIG. 25) of a plurality of X-touch routing lines (X-TL-1 to X-TL-6 and X-TL-7 to X-TL-12) for electrically connecting each of the m X-touch electrode lines (X-TEL-1 to X-TEL-6 and X-TEL-7 to X-TEL-12), which are divided and arranged into the first area and second area, to the touch sensing circuit (TSC) may be arranged outside the area where a plurality of touch electrodes (TE) are arranged, and the remaining X-touch routing lines (X-TL-2, X-TL-4, X-TL-6, X-TL-8, X-TL-10, and X-TL-12 in the case of the symmetrical structure in FIG. 23 or X-TL-2, X-TL-4, X-TL-6, X-TL-7, X-TL-9, and X-TL-11 in the case of the corresponding structure in FIG. 25) may be arranged in the area where a plurality of touch electrodes (TIE) are arranged.

According to the above description, it is possible to provide an arrangement structure of a plurality of X-touch routing lines (X-TL-1 to X-TL-6 and X-TL-7 to X-TL-12) suitable for the alternate-bypass-connection structure of the Y-touch electrode connecting lines (Y-CL-1 to Y-CL-3 and Y-CL-4 to Y-CL-6).

Figure 27:
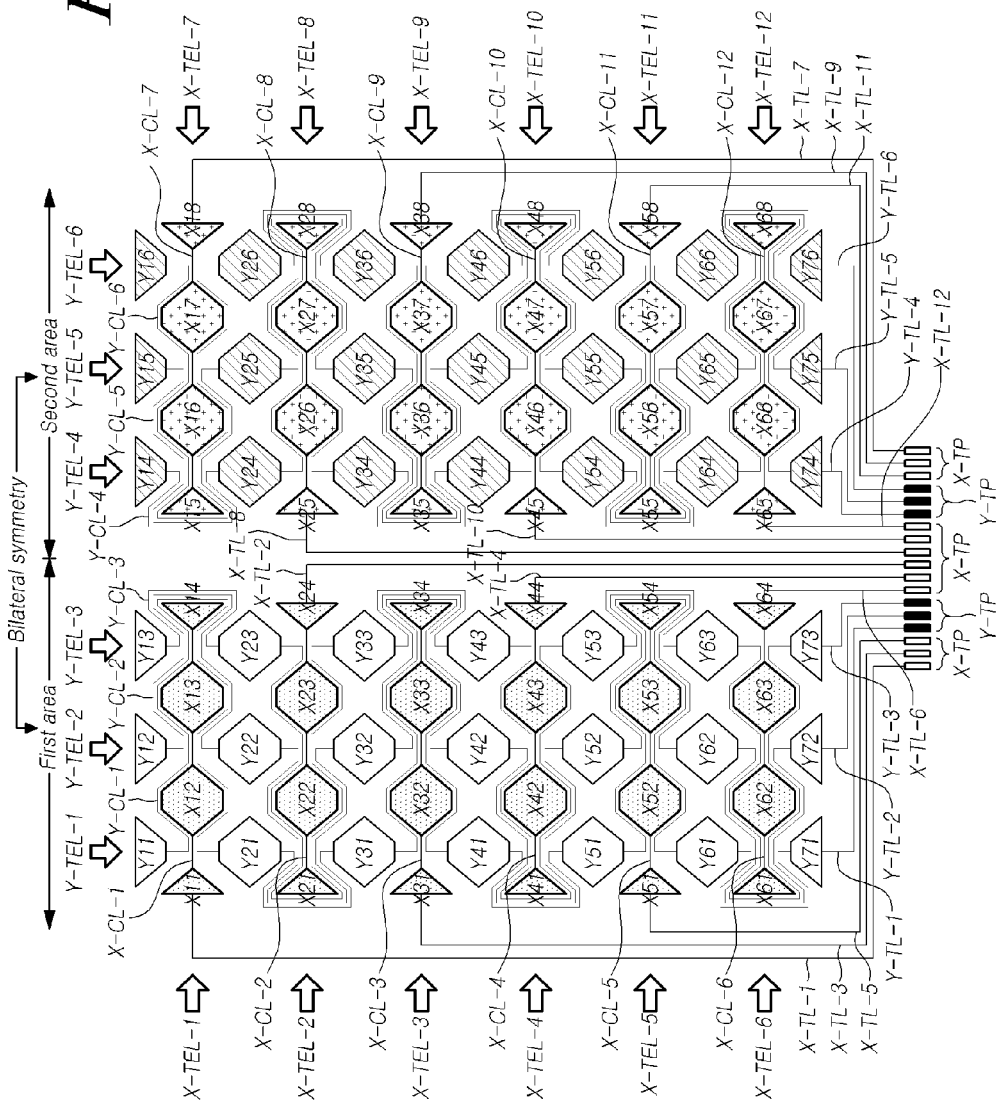
FIGS. 27 and 28 are views illustrating a seventh example of a single-layered touch sensor structure in a display panel according to embodiments of the present disclosure.
Figure 28:
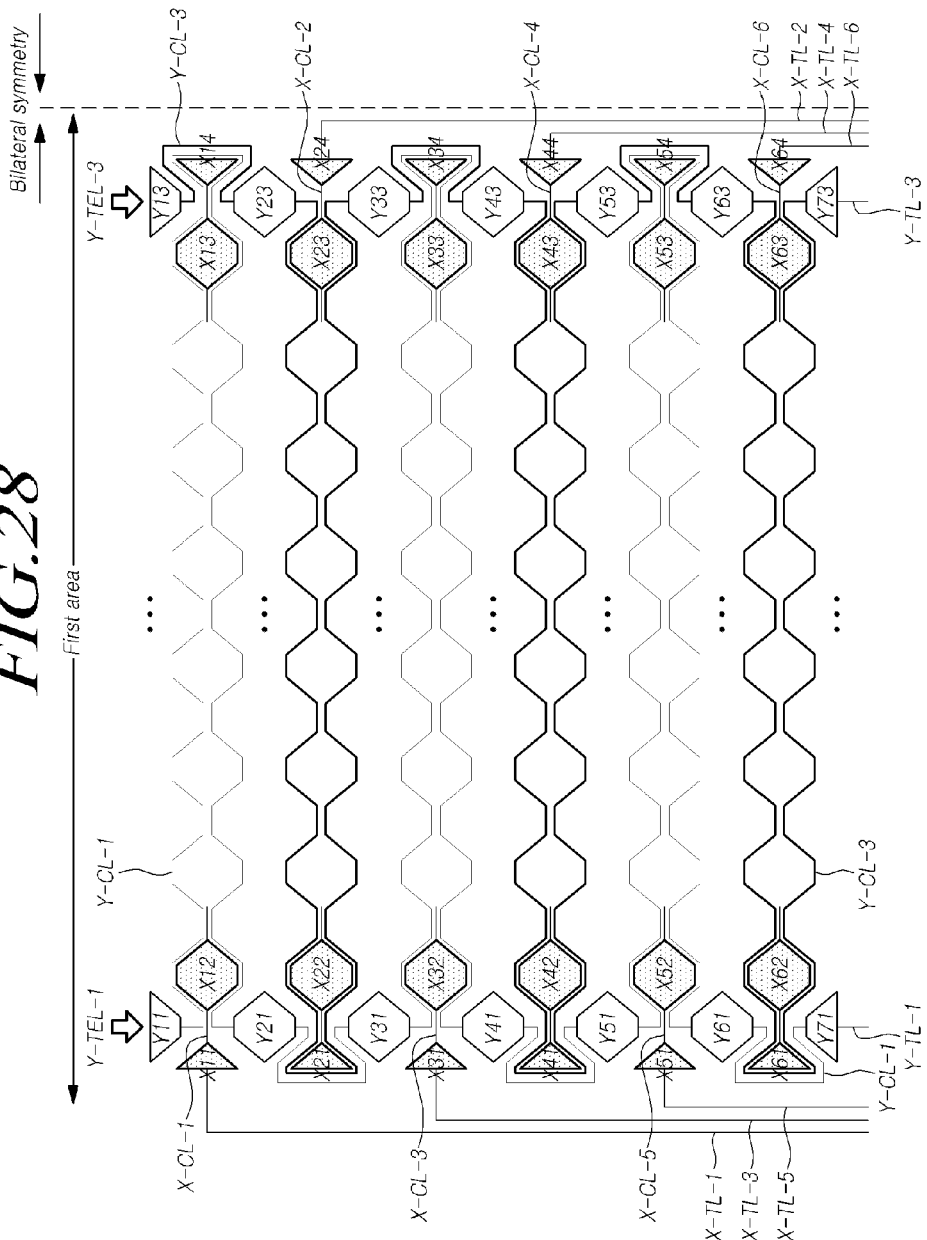
Figure 29:
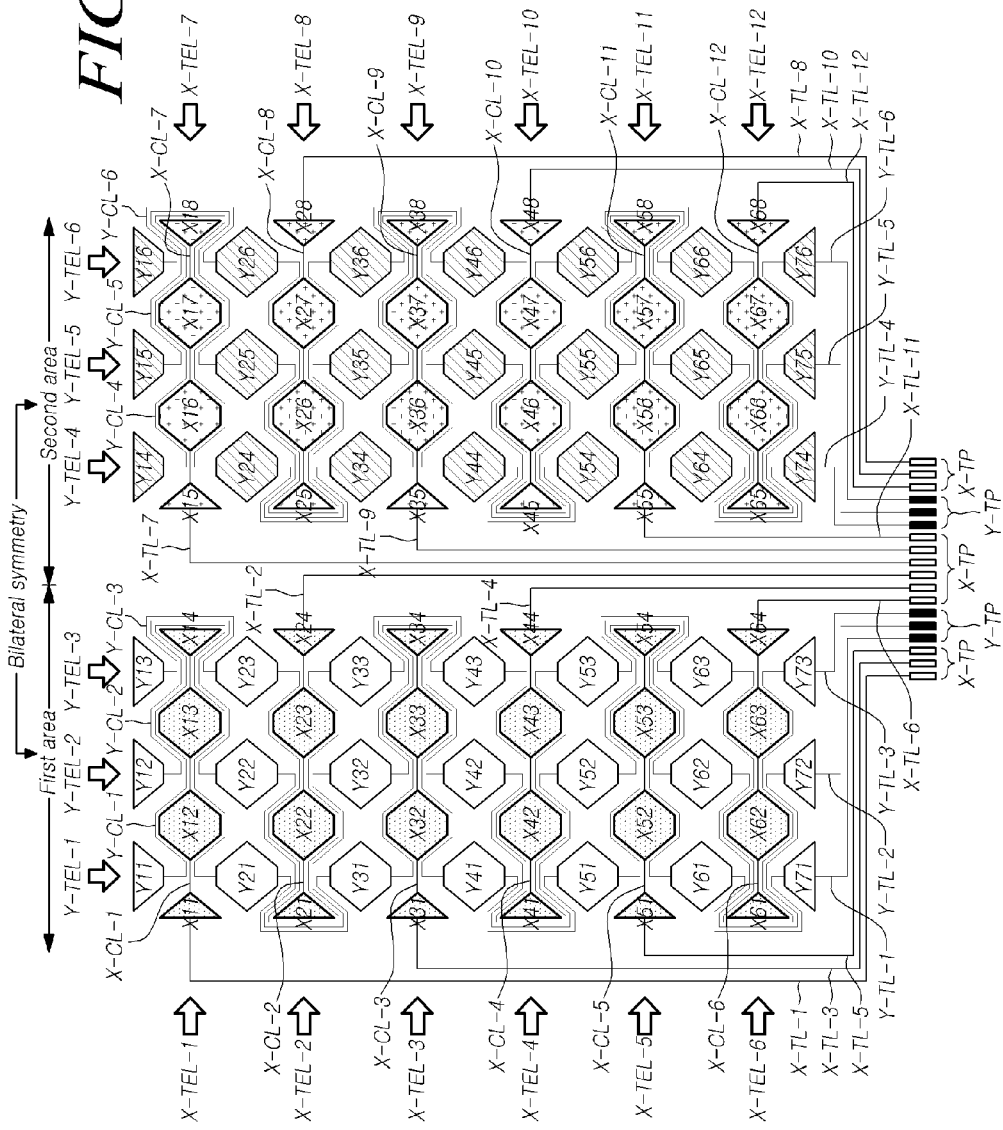
FIGS. 29 and 30 are views illustrating an eighth example of a single-layered touch sensor structure in a display panel according to embodiments of the present disclosure.
Figure 30:
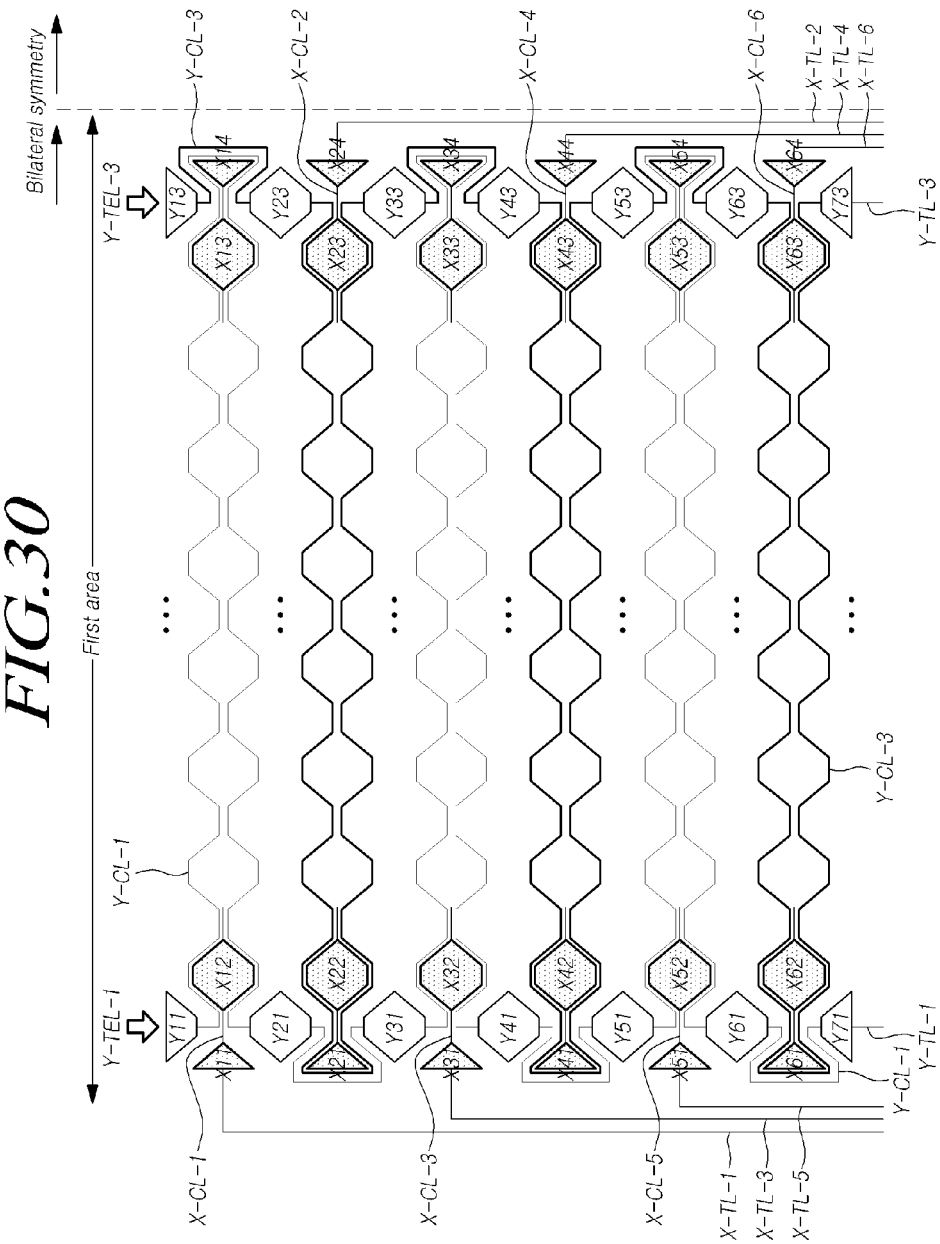

FIGS. 27 and 28 are views illustrating a seventh example of a single-layered touch sensor structure in a display panel (DISP) according to embodiments of the present disclosure, and FIGS. 29 and 30 are views illustrating an eighth example of a single-layered touch sensor structure in a display panel (DISP) according to embodiments of the present disclosure.

A touch sensor structure in FIGS. 27 and 28 is the same as the touch sensor structure in FIGS. 23 and 24, except that the central Y-touch electrode line (Y-TEL-C) arranged between the first area and the second area is removed. Likewise, a touch sensor structure in FIGS. 29 and 30 is the same as the touch sensor structure in FIGS. 25 and 26, except that the central Y-touch electrode line (Y-TEL-C) arranged between the first area and the second area is removed.

FIGS. 27 to 30, the Y-touch electrode connecting line (Y-CL-1) for electrically connecting the first Y-touch electrode (Y11) and the second Y-touch electrode (Y21), among a plurality of Y-touch electrodes (Y11, Y21, Y31, Y41, Y51, Y61, and Y71) included in the outermost Y-touch electrode line (Y-TEL-1) of the Y-touch electrode lines (Y-TEL-1 to Y-TEL-3) arranged in the first area, may be arranged so as to surround the whole or a part of the first X-touch electrode line (X-TEL-1) arranged between the first Y-touch electrode (Y11) and the second Y-touch electrode (Y21).

The Y-touch electrode connecting line (Y-CL-3) for electrically connecting the ninth Y-touch electrode (Y23) and the tenth Y-touch electrode (Y33) arranged with the third X-touch electrode line (X-TEL-2) under the first X-touch electrode line (X-TEL-1) interposed therebetween, among a plurality of Y-touch electrodes (Y13, Y23, Y33, Y43, Y53, Y63, and Y73) included in the Y-touch electrode line (Y-TEL-3) arranged closest to the second area in the Y-touch electrode lines (Y-TEL-1 to Y-TEL-3) arranged in the first area, may be arranged so as to surround the whole or a part of the third X-touch electrode line (X-TEL-2).

Referring to FIGS. 27 to 30, the Y-touch electrode connecting line (Y-CL-3) electrically connecting the ninth Y-touch electrode (Y23) and the tenth Y-touch electrode (Y33) and arranged so as to surround the whole or a part of the second X-touch electrode line (X-TEL-2) may have a length corresponding to the length of the Y-touch electrode connecting line (Y-CL-1) electrically connecting the first Y-touch electrode (Y11) and the second Y-touch electrode (Y21) and arranged so as to surround the whole or a part of the first X-touch electrode line (X-TEL-1).

By arranging the Y-touch electrode connecting lines (Y-CL-1 to Y-CL-3 and Y-CL-4 to Y-CL-6) alternately in different bypass directions, it is possible to reduce the difference in the length between the Y-touch electrode lines (Y-TEL-1 to Y-TEL-3 and Y-TEL-4 to Y-TE-6) and to thus equalize the electrical characteristics (capacitance, resistance, etc.) of the respective Y-touch electrode lines (Y-TEL-1 to Y-TEL-3 and Y-TEL-4 to Y-TEL-6), thereby improving the touch sensing performance.

Unlike the alternate-bypass-connection structure of the Y-touch electrode connecting lines (Y-CL-1 to Y-CL-3 and Y-CL-4 to Y-CL-6), the Y-touch electrode connecting lines (Y-CL-1 to Y-CL-3 and Y-CL-4 to Y-CL-6) may be arranged in a non-alternate-bypass-connection structure as shown in FIGS. 18 and 20.

In this case, the Y-touch electrode connecting line (Y-CL-3) electrically connecting the ninth Y-touch electrode (Y23) and the tenth Y-touch electrode (Y33) and arranged so as to surround the whole or a part of the third X-touch electrode lines (X-TEL-2) may have the same length as the Y-touch electrode connecting line (Y-CL-1) electrically connecting the first Y-touch electrode (Y11) and the second Y-touch electrode (Y21) and arranged so as to surround the whole or a part of the first X-touch electrode line (X-TEL-1).

Referring to FIGS. 27 and 28, a plurality of Y-touch electrode connecting lines (Y-CL-1 to Y-CL-3) included in the Y-touch electrode lines (Y-TEL-1 to Y-TEL-3) arranged in the first area and a plurality of Y-touch electrode connecting lines (Y-CL-4 to Y-CL-6) included in the Y-touch electrode lines (Y-TEL-4 to Y-TEL-6) arranged in the second area may be arranged symmetrically with respect to the central area between the first area and the second area.

Alternatively, referring to FIGS. 29 and 30, a plurality of Y-touch electrode connecting lines (Y-CL-1 to Y-CL-3) included in the Y-touch electrode lines (Y-TEL-1 to Y-TEL-3) arranged in the first area and a plurality of Y-touch electrode connecting lines (Y-CL-4 to Y-CL-6) included in the Y-touch electrode lines (Y-TEL to Y-TEL-6) arranged in the second area may be arranged to correspond to each other with respect to the central area between the first area and the second area.

As shown in FIG. 27, in the case of a structure in which the Y-touch electrode connecting lines (Y-CL-1 to Y-CL-3) in the first area and the Y-touch electrode connecting lines (Y-CL-4 to Y-CL-6) in the second area are symmetrical with respect to the central area between two areas, all of n/2 (three) Y-touch electrode connecting lines (Y-CL-1 to Y-CL-3) arranged in the first area and n/2 (three) Y-touch electrode connecting lines (Y-CL-4 to Y-CL-6) in the second area are concentrated in the area between the first X-touch electrode (X14) and the second X-touch electrode (X15) in the boundary area between the first area and the second area.

Therefore, the areas of the first X-touch electrode (X14) and the second X-touch electrode (X15) are required to be reduced.

This will reduce the capacitance between the first X-touch electrode (X14) and the adjacent Y-touch electrode and a variation thereof and the capacitance between the second X-touch electrode (X15) and the adjacent Y-touch electrode and a variation thereof, thereby degrading the touch sensitivity.

The gap between the first X-touch electrode (X14) and the adjacent Y-touch electrode and the gap between the second X-touch electrode (X15) and the adjacent Y-touch electrode in the boundary area (BA) between the first area and the second area may be as a "dead zone" that lowers the touch sensitivity.

That is, as shown in FIG. 27, in the case of a structure in which the Y-touch electrode connecting lines (Y-CL-1 to Y-CL-3) in the first area and the Y-touch electrode connecting lines (Y-CL-4 to Y-CL-6) in the second area are symmetrical with respect to the central area, the dead zone becomes large, thereby lowering the touch performance.

However, as shown in FIG. 29, in the case of a structure in which the Y-touch electrode connecting lines (Y-CL-1 to Y-CL-3) in the first area and the Y-touch electrode connecting lines (Y-CL-4 to Y-CL-6) in the second area correspond to each other with respect to the central area, the dead zone may be reduced, thereby improving the touch performance corresponding thereto.

More specifically, in the case of FIG. 27, six Y-touch electrode connecting lines (Y-CL-1 to Y-CL-3 and Y-CL-4 to Y-CL-6) are arranged between the first X-touch electrode (X14) and the second X-touch electrode (X15) in the boundary area between the first area and the second area. However, in the case of FIG. 29, only three Y-touch electrode connecting lines (Y-CL-1 to Y-CL-3) are arranged between the first X-touch electrode (X14) and the second X-touch electrode (X15) in the boundary area between the first area and the second area.

Thus, it is possible to reduce the gap between the first X-touch electrode (X14) and the adjacent Y-touch electrode and the gap between the second X-touch electrode (X15) and the adjacent Y-touch electrode, as well as the gap between the first X-touch electrode (X14) and the second X-touch electrode (X15), or to increase the overall area of the touch electrode in the boundary area between the first area and the second area by arranging the Y-touch electrode connecting lines (Y-CL-1 to Y-CL-3) in the first area and the Y-touch electrode connecting lines (Y-CL-4 to Y-CL-6) in the second area to correspond to each other with respect to the central are between the two areas as shown in FIG. 29. Accordingly, it is possible to increase the mutual capacitance and a variation thereof, thereby improving the touch sensitivity.

Referring to FIGS. 27 to 30, a plurality of Y-touch routing lines (Y-TL-1 to Y-TL-6) for electrically connecting the n Y-touch electrode lines (Y-TEL-1 to Y-TEL-6) to the touch sensing circuit (TSC) may be arranged outside the area where a plurality of touch electrodes (TE) are arranged.

On the other hand, some (X-TL-1, X-TL-3, X-TL-5, X-TL-7, X-TL-9, and X-TL-11 in the case of the symmetrical structure in FIG. 27 or X-TL-1, X-TL-3, X-TL-5, X-TL-8, X-TL-10, and X-TL 12 in the case of the corresponding structure in FIG. 29) of a plurality of X-touch routing lines (X-TL-1 to X-TL-6 and X-TL-7 to X-TL-12) for electrically connecting each of the m X-touch electrode lines (X-TEL-1 to X-TEL-12) to the touch sensing circuit may be arranged outside the area where a plurality of touch electrodes (TE) are arranged, and the remaining X-touch routing lines (X-TL-2, X-TL-4, X-TL-6, X-TL-8, X-TL-10, and X-TL-12 in the case of the symmetrical structure in FIG. 27 or X-TL-2, X-TL-4, X-TL-6, X-TL-7, X-TL-9, and X-TL-11 in the case of the corresponding structure in FIG. 29) may be arranged in the area where a plurality of touch electrodes (TE) are arranged.

According to the above description, it is possible to provide an arrangement structure of a plurality of X-touch routing lines (X-TL-1 to X-TL-6 and X-TL-7 to X-TL-12) suitable for the alternate-bypass-connection structure of the Y-touch electrode connecting lines (Y-CL-1 to Y-CL-3 and Y-CL-4 to Y-CL-6).

Figure 31:
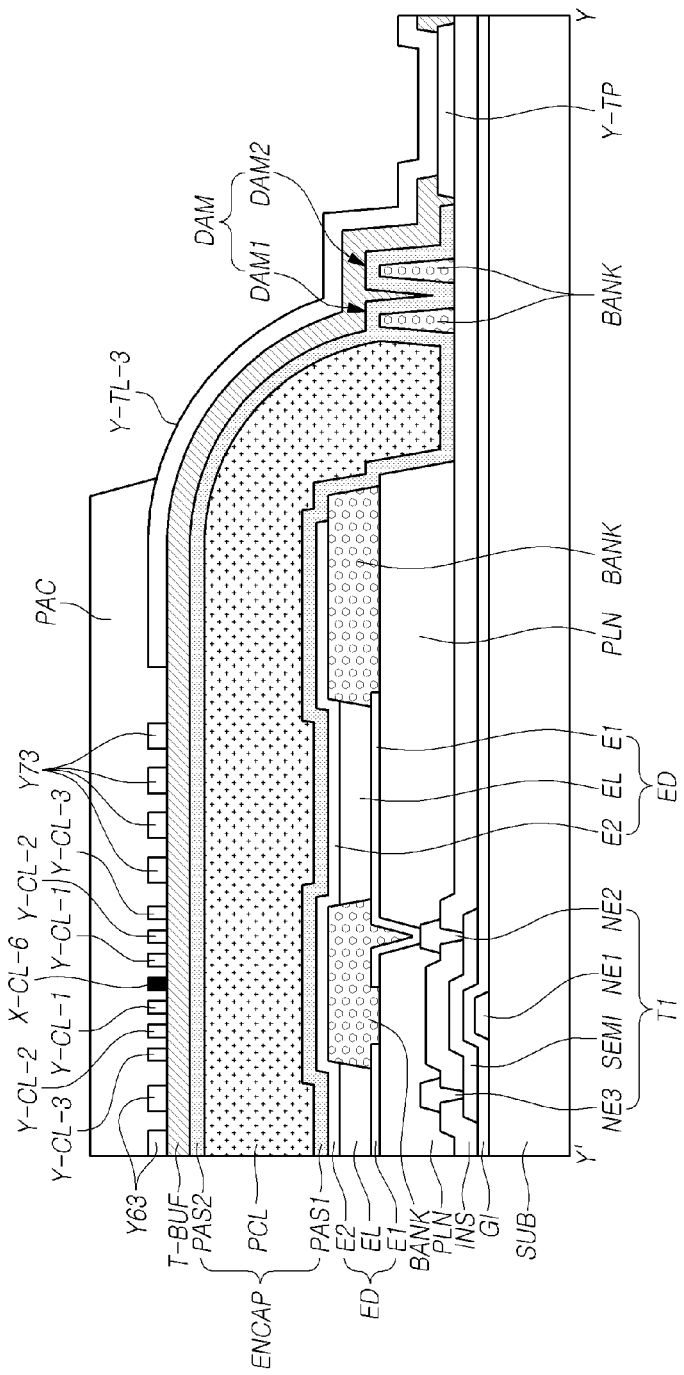
FIG. 31 is a cross-sectional view of a display panel having a single-layered touch sensor structure according to embodiments of the present disclosure.

FIG. 31 is a cross-sectional view of a display panel (DISP) having a single-layered touch sensor structure, which is taken along the lines Y-Y' in FIG. 18, according to embodiments of the present disclosure. Although mesh-type touch electrodes (Y63 and Y73) are illustrated in FIG. 31, this is only an example, and a plate-type touch electrode may be provided.

A display panel (DISP) according to embodiments of the present disclosure includes an encapsulation portion (ENCAP) arranged on the light-emitting device (ED) included in each of a plurality of subpixels (SP).

The single-layered touch sensor structure is located on the encapsulation portion (ENCAP), like the multi-layered touch sensor structure. That is, m X-touch electrode lines (X-TEL-1 to X-TEL-12) and n Y-touch electrode lines (Y-TEL-1 to Y-TEL-6) are arranged in the single layer on the encapsulation portion (ENCAP).

According to an example in FIG. 31, the X-touch electrode connecting lines (X-CL-6) included in the X-touch electrode lines (X-TEL-6) of the m X-touch electrode lines (X-TEL-1 to X-TEL-12), the Y-touch electrodes (Y73 and Y63) included in the Y-touch electrode line (Y-TEL-3) of the n Y-touch electrode lines (Y-TEL-1 to Y-TEL-6), and the Y-touch electrode connecting lines (Y-CL-1, Y-CL-2, and Y-CL-3) located therebetween may be provided in the same layer on the encapsulation portion (ENCAP).

As described above, it is possible to reduce the number of mask processes, thereby simplifying the manufacturing process, and to design a thinner structure by providing a touch sensor structure in a single layer on the encapsulation portion (ENCAP).

In the following, the cross-section of the single-layered touch sensor structure will be described in more detail.

Referring to FIG. 31, in the case of a display panel (DISP) having a single-layered touch sensor structure according to embodiments of the present disclosure, the substrate (SUB) through the touch buffer film (T-BUF) may be formed in the same manner as the structure shown in the cross-sectional view of FIG. 9.

A touch insulating film (ILD) may be arranged on the touch buffer film (T-BUF) as shown in FIG. 9, or the touch insulating film (ILD) may not be arranged on the touch buffer film (T-BUF) as shown in FIG. 31.

Referring to the example in FIG. 31, on the touch buffer film (T-BUF), two mesh-type Y-touch electrodes (Y63 and Y73) having openings, the Y-touch electrode connecting line (Y-CL-3) for electrically connecting the two Y-touch electrodes (Y63 and Y73), and the Y-touch electrode connecting lines (Y-CL-1 and Y-CL-2) around the same may be provided in the same layer, and the X-touch electrode connecting line (X-CL-6) for electrically connecting two X-touch electrodes (X63 and X64), which are positioned between the two Y-touch electrodes (Y63 and Y73) on the plan view, may also be provided in the same layer. Further, the Y-touch routing line (Y-TL-3) connected to the Y-touch electrode (Y73) arranged at the outermost position, among the two Y-touch electrodes (Y63 and Y73), may be provided in the same layer.

As described above, all the touch sensor metals (TSM) may be located in the same layer, thereby implementing a single-layered touch sensor structure.

Referring to an example in FIG. 31, the Y-touch line (Y-TL-3) may be directly or indirectly connected to the Y-touch pad (Y-TP) by passing over the dam (DAM) along the touch buffer film (T-BUF).

Referring to FIG. 31, a touch protection layer (PAC) may be formed on the layer in which the touch sensor metal (TSM) is formed. In some cases, the touch protection film (PAC) may be omitted.

Referring to FIG. 18 and FIG. 31, the m X-touch electrode lines (X-TEL-1 to X-TEL-12) may be connected to the m outermost X-touch electrodes (X11, X21, X31, X41, X51, X61, X18, X28, X38, X48, X58, and X68), and may be electrically connected to the m X-touch pads (X-TP) located in the non-active area (NA) by passing over the side of the encapsulation portion (ENCAP) and the tops of one or more damns (DAM1) and (DAM2).

In addition, the n Y-touch routing lines (Y-TL-1 to Y-TL-6) may be connected to the n outermost Y-touch electrodes (Y71, Y72, Y73, Y74, Y75, and Y76), and may be electrically connected to the n Y-touch pads (Y-TP) located in the non-active area (NA) by passing over the side of the encapsulation portion (ENCAP) and the tops of one or more dams (DAM1 and DAM2).

Referring to FIG. 31, the encapsulation portion (ENCAP) may have a multi-layered structure including two or more inorganic encapsulation layers (PAS1 and PAS2) and one or more organic encapsulation layers (PCL) provided between the two or more inorganic encapsulation layers (PAS1 and PAS2).

The one or more organic encapsulation layers (PCL) included in the encapsulation portion (ENCAP) may be positioned at one side of at least one dam (DMA), or may be positioned at one side and top of at least one dam (DAM).

According to the above structure, one or more dams (DMA) may prevent the encapsulation portion (ENCAP) and the organic encapsulation layer (PCL) thereof from collapsing.

The cross-sectional view of FIG. 31 shows a conceptual structure, and thus the positions, thicknesses, or widths of the respective patterns (respective layers or respective electrodes) may vary depending on the viewing directions or positions, connection structures of the respective patterns may vary, other layers may be further provided in addition to the illustrated layers, or some of the illustrated layers may be omitted or integrated. For example, the width of the bank (BANK) may be smaller than that illustrated in the drawing, and the height of the dam (DAM) may be less or more than that illustrated in the drawing.

Figure 32:
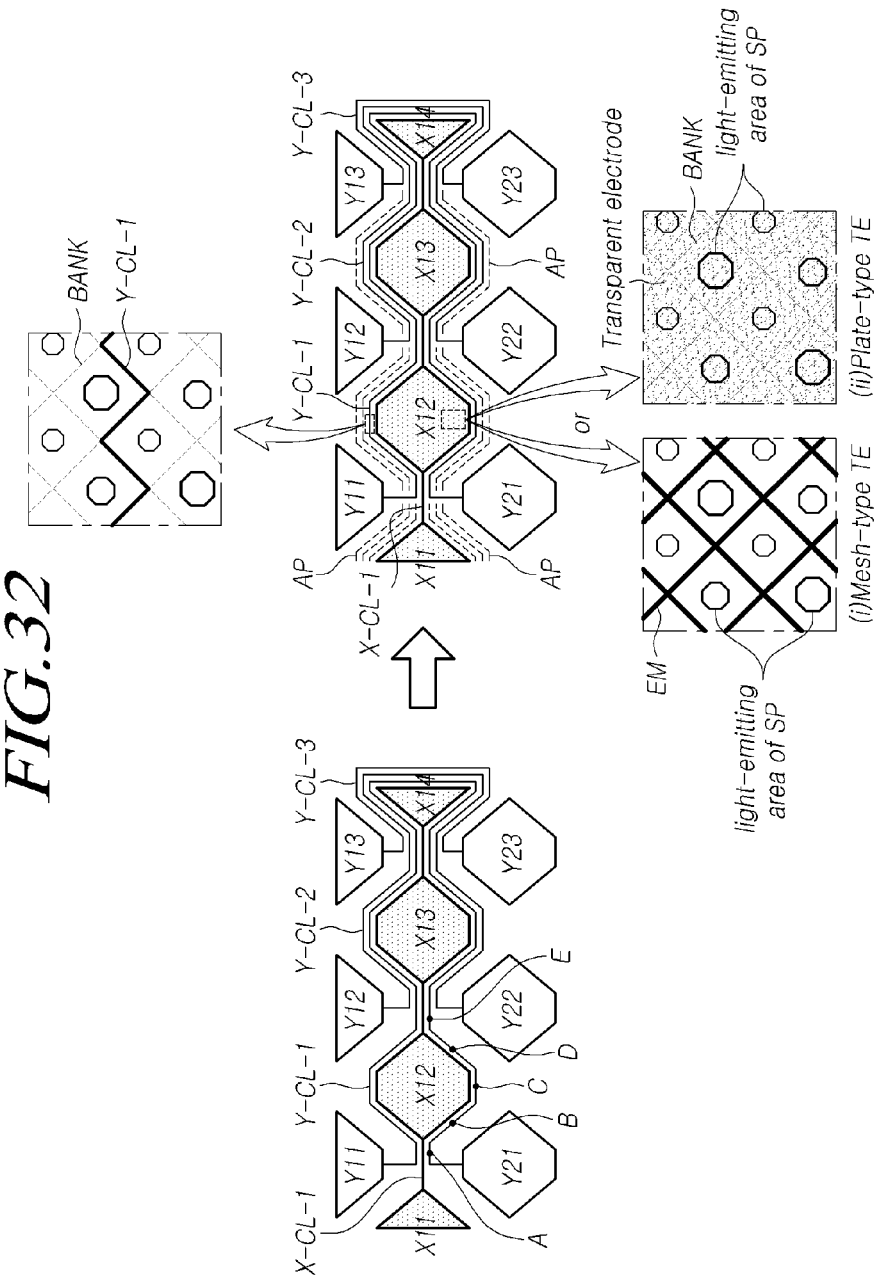
FIG. 32 is a view illustrating additional patterns arranged in a blank area in a display panel having a single-layered touch sensor structure according to embodiments of the present disclosure.

FIG. 32 is a view illustrating additional patterns arranged in a blank area in a display panel (DISP) having a single-layered touch sensor structure according to embodiments of the present disclosure.

FIG. 32 is a view showing the area where four X-touch electrodes (X11, X12, X13 and X14) and six Y-touch electrodes (Y11, Y12, Y13, Y21, Y22, and Y23) are arranged in the single-layered touch sensor structures in FIG. 16 or the like.

Referring to FIG. 32, the four X-touch electrodes (X11, X12, X13 and X14) included in the first X-touch electrode line (X-TEL-1) may have an electrical connection through the X-touch electrode connecting lines (X-CL-1).

Referring to FIG. 32, the Y-touch electrodes (Y11 and Y21) included in the first Y-touch electrode line (Y-TEL-1) may be electrically connected through the first Y-touch electrode connecting line (Y-CL-1). The Y-touch electrodes (Y12 and Y22) included in the second Y-touch electrode line (Y-TEL-2) may be electrically connected through the second Y-touch electrode connecting line (Y-CL-2). The Y-touch electrodes (Y13 and Y23) included in the third Y-touch electrode line (Y-TEL-3) may be electrically connected through the third Y-touch electrode connecting line (Y-CL-3).

Referring to FIG. 32, the four X-touch electrodes (X11, X12, X13 and X14) included in the first X-touch electrode line (X-TEL-1) may have a blank area therearound, where no Y-touch electrode connecting line is arranged. One or more additional patterns (AP) may be arranged in the blank area.

The additional patterns (AP) may be remnants formed when other touch electrode connecting lines (Y-CL-1, Y-CL-2, and Y-CL-3) are formed.

It is possible to improve the touch sensing performance by forming the additional patterns (AP) in the blank area, as described above, and by applying various voltages to the additional patterns (AP). For example, it is possible to reduce the influence of noise on the touch electrodes or to equalize the surrounding electrical environments of all touch electrodes by driving the additional patterns (AP).

Referring to FIG. 32, the numbers of Y-touch electrode connecting lines arranged around the four X-touch electrodes (X11, X12, X13 and X14) included in the first X-touch electrode line (X-TEL-1) are different from each other.

For example, no Y-touch electrode connecting line is arranged around the X-touch electrode (X11). One Y-touch electrode connecting line (Y-CL-1) is arranged around the X-touch electrode (X12). Two Y-touch electrode connecting lines (Y-CL-1 and Y-CL-2) are arranged around the X-touch electrode (X13). Three Y-touch electrode connecting lines (Y-CL-1, Y-CL-2, and Y-CL-3) are arranged around the X-touch electrode (X14).

As described above, the numbers of additional patterns (AP) arranged in the blank area around the four X-touch electrodes (X11, X12, X13 and X14) included in the first X-touch electrode line (X-TEL-1) may be different from each other depending on the different numbers of Y-touch electrode connecting lines arranged around the four X-touch electrodes (X11, X12, X13 and X14) included in the first X-touch electrode line (X-TEL-1).

For example, three additional patterns (AP) may be arranged around the X-touch electrode (X11). Two additional patterns (AP) may be arranged around the X-touch electrode (X12). One additional pattern (AP) may be arranged around the X-touch electrode (X13). No additional pattern (APs) may be arranged around the X-touch electrode (X14).

Accordingly, it is possible to equalize the surrounding environments of the respective X-touch electrodes (X11, X12, X13 and X14).

One or more additional patterns (AP) may be in a voltage state corresponding to a touch driving signal or a touch sensing signal, may be in a voltage state in which a ground voltage or a specific voltage is applied, or may be in a floating voltage state. In addition, one or more additional patterns (AP) may be in various electrical states for improving the touch sensing performance.

For example, one or more additional patterns (AP) may be electrically connected to the Y-touch electrode connecting lines or the X-touch electrode connecting lines arranged therearound so as to be in the voltage state corresponding to a touch driving signal or a touch sensing signal.

The touch sensing performance can be improved by control of the electrical states of the additional patterns (AP). For example, it is possible to reduce the influence of noise on the touch electrodes or to equalize the surrounding electrical environments of the respective X-touch electrodes by driving the additional patterns (AP).

As described above, each of the touch electrodes (X11, X12, X13, X14, Y11, Y12, Y13, Y21, Y22, and Y23) may be a mesh-type touch electrode (TE), or may be a plate-type touch electrode (TE).

In the case of a mesh-type touch electrode (TE), the respective touch electrodes (X11, X12, X13, X14, Y11, Y12, Y13, Y21, Y22, and Y23) may be patterned in the form of a mesh, thereby obtaining an electrode metal (EM) having two or more openings (OA).

Each of the two or more openings (OA) may correspond to a light-emitting area of one or more subpixels (SP).

The electrode metal (EM) corresponding to each of the touch electrodes (X11, X12, X13, X14, Y11, Y12, Y13, Y21, Y22, and Y23) may be located on the bank (BANK) that is provided in the area other than the light-emitting area of two or more subpixels (SP).

In the case of a plate-type touch electrode, the respective touch electrodes (X11, X12, X13, X14, Y11, Y12, Y13, Y21, Y22, and Y23) may be transparent electrodes.

In this case, each of the touch electrodes (X11, X12, X13, X14, Y11, Y12, Y13, Y21, Y22, and Y23) may be positioned on the light-emitting area of the subpixels (SP), or may be positioned on the bank (BANK).

A plurality of Y-touch electrode connecting lines (Y-CL-1 to Y-CL-3) may be positioned on the bank (BANK) arranged in the area other than the light-emitting area of a plurality of subpixels (SP).

A plurality of first X-touch electrode connecting lines and a plurality of second X-touch electrode connecting lines for electrically connecting the touch electrodes (X-TE) to each other, as well as the plurality of Y-touch electrode connecting lines (Y-CL-1 to Y-CL-3), may be positioned on the bank (BANK).

Accordingly, even if the X-touch electrode connecting lines for connecting the X-touch electrodes (X-TE) to each other and the Y-touch electrode connecting lines for connecting the Y-touch electrodes (Y-TE) to each other are arranged in the active area (AA), they do not degrade the light-emitting performance of the display panel (DISP) because they are positioned on the bank (BANK).

The X-touch electrode connecting lines for connecting the X-touch electrodes (X-TIE) and the Y-touch electrode connecting lines for connecting the Y-touch electrodes (Y-TE) may vary depending on the shape of the bank (BANK).

For example, if the bank (BANK) is arranged in a sawtooth shape, the X-touch electrode connecting lines for connecting the X-touch electrodes (X-TE) and the Y-touch electrode connecting lines for connecting the Y-touch electrodes (Y-TE) may also be arranged in a sawtooth shape.

As described above, the Y-touch electrode connecting lines (Y-CL-1) for electrically connecting a plurality of Y-touch electrodes (Y11 and Y21) in the second direction may be provided in the same layer as a plurality of X-touch electrode connecting lines (X-CL-1) for electrically connecting a plurality of X-touch electrodes (X11, X12, X13, and X14) arranged in the first direction.

The Y-touch electrode connecting lines (Y-CL-1) for electrically connecting a plurality of Y-touch electrodes (Y11 and Y21) arranged in the second direction may include portions (A and E) arranged in parallel with a plurality of X-touch electrode connecting lines (X-CL-1) and portions (B, C, and D) arranged in parallel with the outlines of a plurality of X-touch electrodes (X11, X12, X13 and X14) arranged in the first direction.

According to the above structure, it is possible to design the touch sensor structure as a single layer and to design the touch sensor structure having space utilization optimized on a plane.

Figure 33:
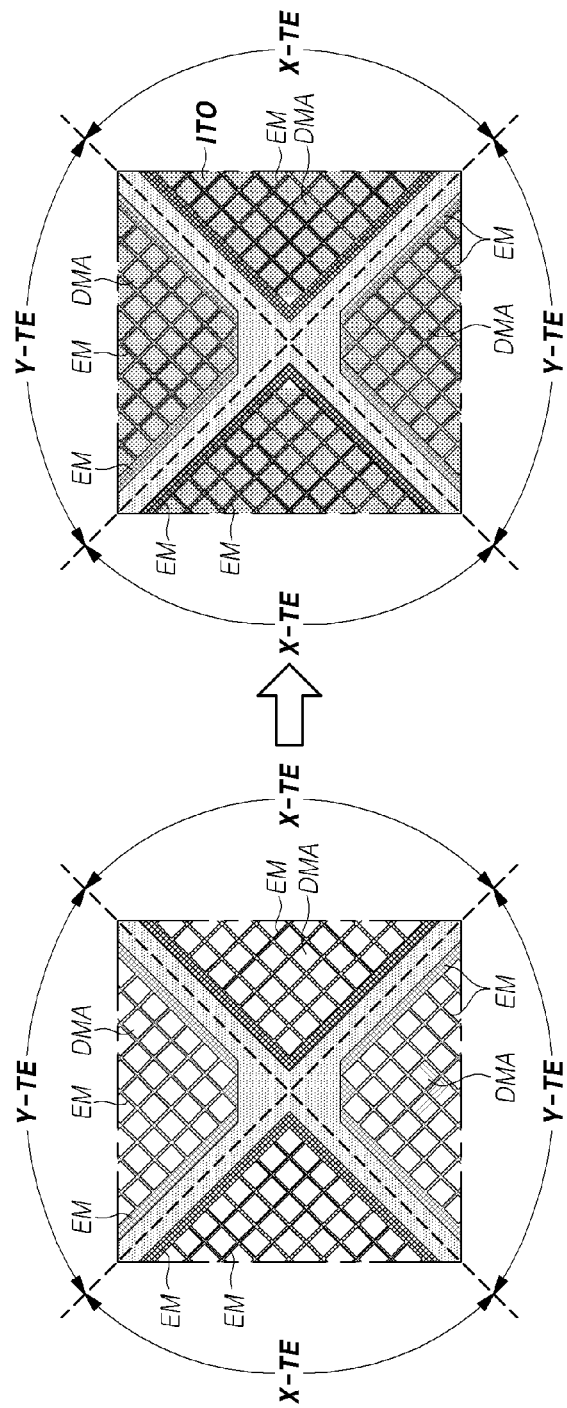
FIGS. 33 to 35 are views illustrating examples of a transparent electrode arranged in a touch electrode area in the display panel according to the embodiments of the present disclosure.
Figure 34:
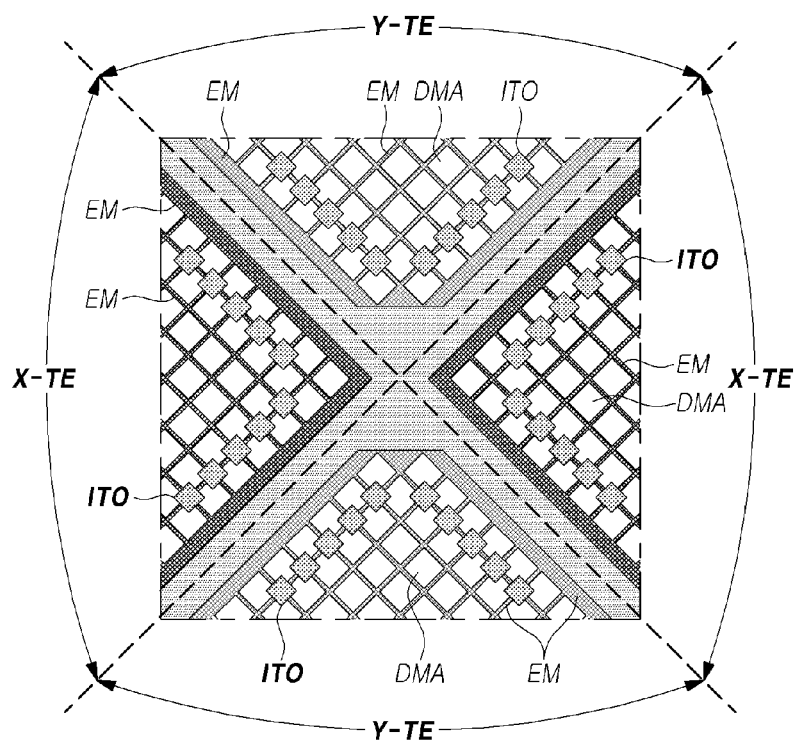
Figure 35:
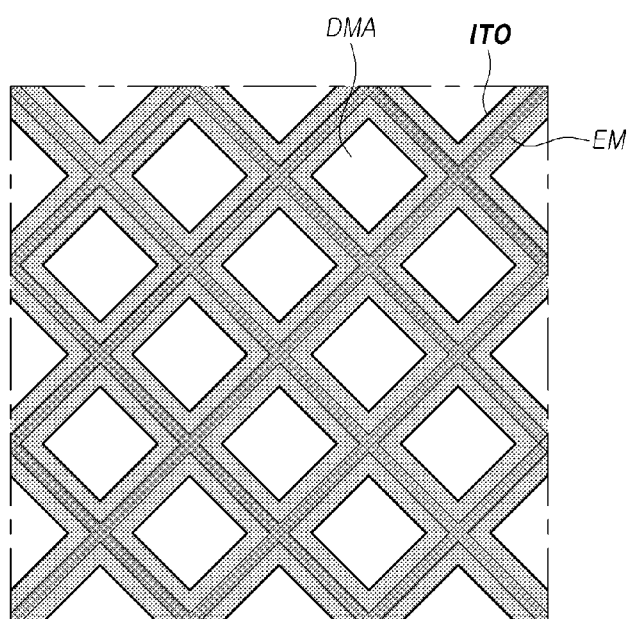

FIGS. 33 to 35 are view illustrating examples of a transparent electrode (ITO) arranged in a touch electrode area in the display panel (DISP) according to the embodiments of the present disclosure.

FIG. 33 is a view showing an area where two X-touch electrodes (X-TIE) and two Y-touch electrodes (Y-TE) cross each other.

Each of the two X-touch electrodes (X-TE) and two Y-touch electrodes (Y-TE) illustrated in FIG. 33 is an electrode metal (EM) that is patterned in the form of a mesh and has dummy metals (DM) therein. However, the dummy metals (DM) are omitted and the area where the dummy metals (DM) are omitted is denoted as a dummy metal area (DMA) in FIG. 33.

Referring to FIG. 33, transparent electrodes (ITO) may be formed in the entire touch electrode area where the X-touch electrodes (X-TE) and the Y-touch electrodes (Y-TE) are arranged.

Referring to FIG. 34, the transparent electrodes (ITO) may be formed only in the partial area in the form of an island, instead of the entire touch electrode area where the X-touch electrodes (X-TE) and the Y-touch electrodes (Y-TE) are arranged.

Referring to FIG. 35, the transparent electrodes (ITO) may be formed in the form of a mesh along the electrode metal (EM) in the touch electrode area where the X-touch electrodes (X-TE) and the Y-touch electrodes (Y-TIE) are arranged.

That is, referring to FIGS. 33 to 35, the respective touch electrodes (X-TE and Y-TE) may have a multi-layered structure, and the transparent electrodes (ITO) may be patterned in various forms and provided on or under the electrode metal (EM).

Accordingly, since the effective area of the X-touch electrode (X-TE) and the Y-touch electrode (Y-TE) generating the mutual capacitance can be increased, it is possible to change the mutual capacitance and a variation thereof, thereby improving the touch sensitivity.

Figure 36:
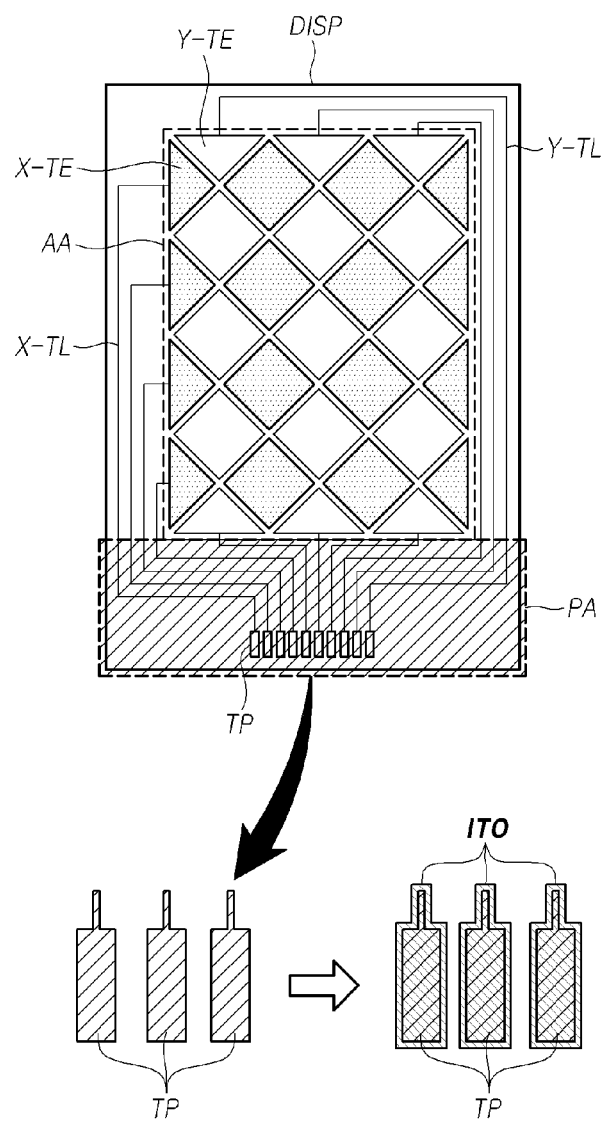
FIG. 36 is a view illustrating an example of a transparent electrode arranged in a non-active area in a display panel according to embodiments of the present disclosure.

FIG. 36 is a view illustrating an example of a transparent electrode (ITO) arranged in a non-active area (NA) in a display panel (DISP) according to embodiments of the present disclosure.

Referring to FIG. 36, a transparent electrode (ITO) may be formed in a pad area (PA) on which a touch pad (TP) is formed in the non-active area (NA) outside the active area (AA) of the display panel (DISP).

The transparent electrodes (ITO) may be arranged in the entire pad area (PA), or may be arranged on the touch pads (IP) in the pad area (PA).

The m X-touch electrode lines (X-TEL) included in the single-layered touch sensor structure described above may be driving touch electrode lines to which a touch driving signal is applied, and the n Y-touch electrode lines (Y-TEL) thereof may be sensing touch electrode lines in which a touch sensing signal is detected.

On the other hand, the n Y-touch electrode lines (Y-TEL) may be driving touch electrode lines to which a touch driving signal is applied, and the m X-touch electrode lines (X-TEL) may be sensing touch electrode lines in which a touch sensing signal is detected.

Thus, it is possible to sense a touch based on the mutual capacitance by driving one of the m X-touch electrode lines (X-TEL) and the n Y-touch electrode lines (Y-TEL) and by sensing the remainder.

The touch driving signal applied to one of the m X-touch electrode line (X-TEL) and the n Y-touch electrode line (Y-TEL) may be a signal with a constant voltage level, or may be a signal with a variable voltage level.

If the touch driving signal has a variable voltage level, the touch driving signal may have various waveforms such as a square wave, a sine wave, a triangular wave (chopping wave), or the like.

The touch driving signal may have a predetermined frequency.

The frequency of the touch driving signal may be constant or variable.

If the frequency of the touch driving signal is variable, the frequency of a touch driving signal supplied to the X-touch electrode lines or the Y-touch electrode lines, which correspond to the driving touch electrode lines, may be changed at random or according to a predetermined rule.

If the frequency of the touch driving signal is changed randomly, the frequency may vary within a predetermined frequency range (e.g., 200 KHz or more).

If the frequency of the touch driving signal is changed according to a predetermined rule, as described above, the frequency may vary in consideration of the time constant (e.g., RC delay) of signal transmission paths including the respective driving touch electrode lines.

According to the frequency varying technique of a touch driving signal, it is possible to prevent deterioration of touch sensitivity due to the difference in the length between the signal transmission paths, and to perform touch driving while avoiding the noise in the touch display device. Hereinafter, a method of varying the frequency of the touch driving signal according to a predetermined rule in consideration of the time constant will be described.

The length of the signal transmission path through which a touch driving signal (or touch sensing signal) is transmitted between the touch sensing circuit (TSC) and the corresponding touch electrode (TE) may correspond to a sum of the length of the X-touch electrode line (X-TEL) and the length of the X-touch routing line (X-TL)

One X-touch electrode line (X-TEL) includes plurality of X-touch electrodes (X-TIE) and a plurality of X-touch electrode connecting lines (X-CL) for connecting the same. Thus, the length of one X-touch electrode line (X-TEL) may correspond to a value obtained by adding all the lengths of the plurality of X-touch electrodes (X-TE) and the plurality of X-touch electrode connecting lines (X-CL) for connecting the same.

Alternatively, the length of the signal transmission path through which a touch driving signal (or touch sensing signal) is transmitted between the touch sensing circuit (TSC) and the corresponding touch electrode (TE) may correspond to a sum of the length of the Y-touch electrode line (Y-TEL) and the length of the Y-touch routing line (Y-TL). One Y-touch electrode line (Y-TEL) includes plurality of Y-touch electrodes (Y-TE) and a plurality of Y-touch electrode connecting lines (Y-CL) for connecting the same. Thus, the length of one Y-touch electrode line (Y-TEL) may correspond to a value obtained by adding all the lengths of the plurality of Y-touch electrodes (Y-TE) and the plurality of Y-touch electrode connecting lines (Y-CL) for connecting the same.

The lengths of the signal transmission paths corresponding to the m X-touch electrode lines (X-TEL) may be different from each other depending on their positions. Accordingly, the signal transmission paths corresponding to the m X-touch electrode lines (X-TEL) may have different time constants from each other. The time constant may be, for example, an RC delay (resistive-capacitive delay). The difference in the time constant between the signal transmission paths may cause a difference in the touch sensitivity between the signal transmission paths, thereby lowering the touch sensing performance.

Likewise, the touch sensing performance may be degraded due to the difference in the length between the signal transmission paths corresponding to the n Y-touch electrode lines (Y-TEL).

Therefore, the frequencies of touch driving signals applied to one or more of the m X-touch electrode lines (X-TEL) may be different from each other depending on the length of the signal transmission path for the touch driving signal. Alternatively, the frequencies of touch driving signals applied to one or more of the n Y-touch electrode lines (Y-TEL) may be different from each other.

Accordingly, it is possible to improve the touch sensing performance by compensating for the touch sensitivity variation due to the difference in the length between the signal transmission paths through frequency variation.

Now, a multi-frequency driving method in which the frequency of a touch driving signal varies will be described.

Figure 37:
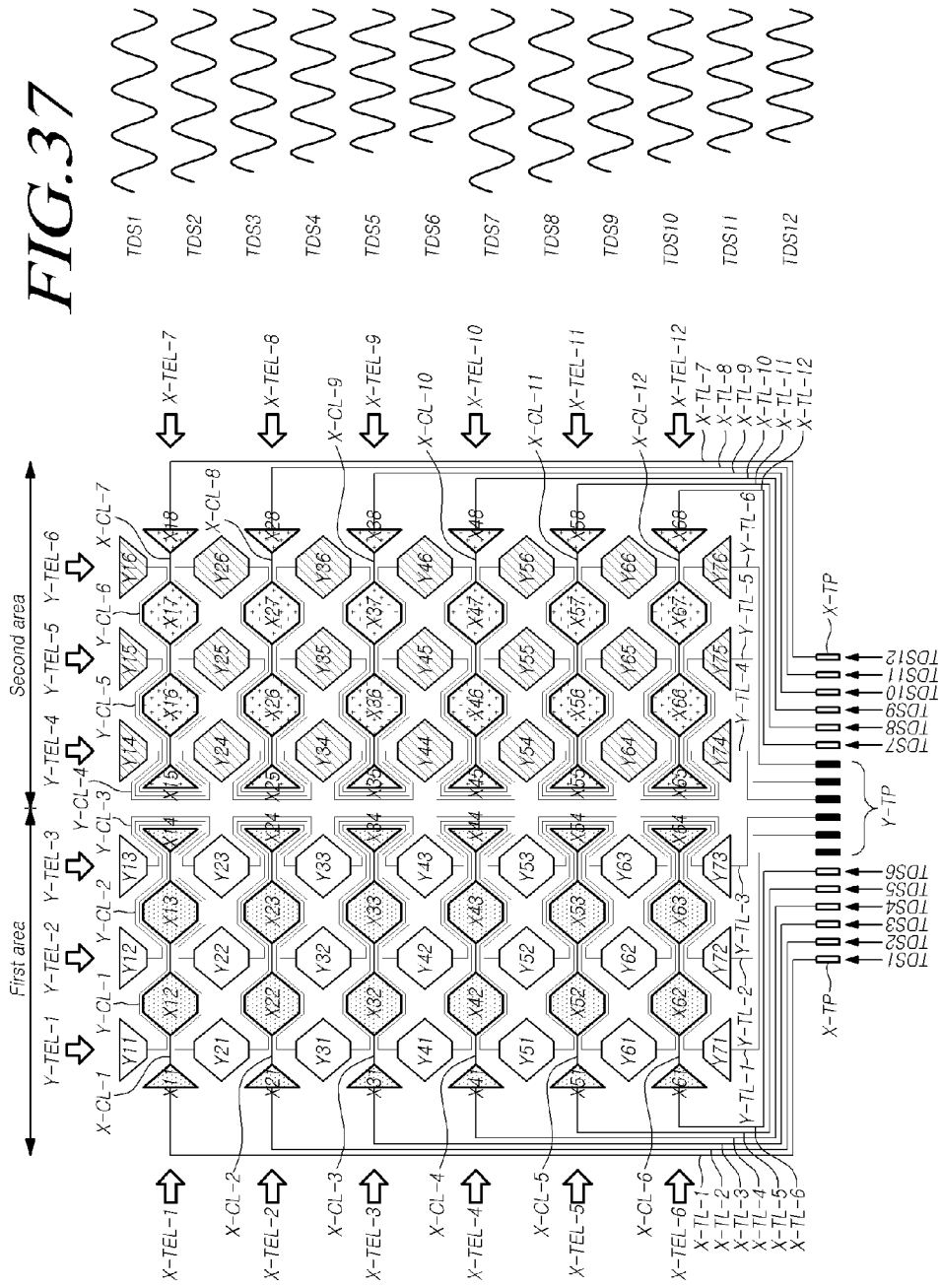
FIGS. 37 and 38 are views for explaining a multi-frequency driving method of a touch display device according to embodiments of the present disclosure.
Figure 38:
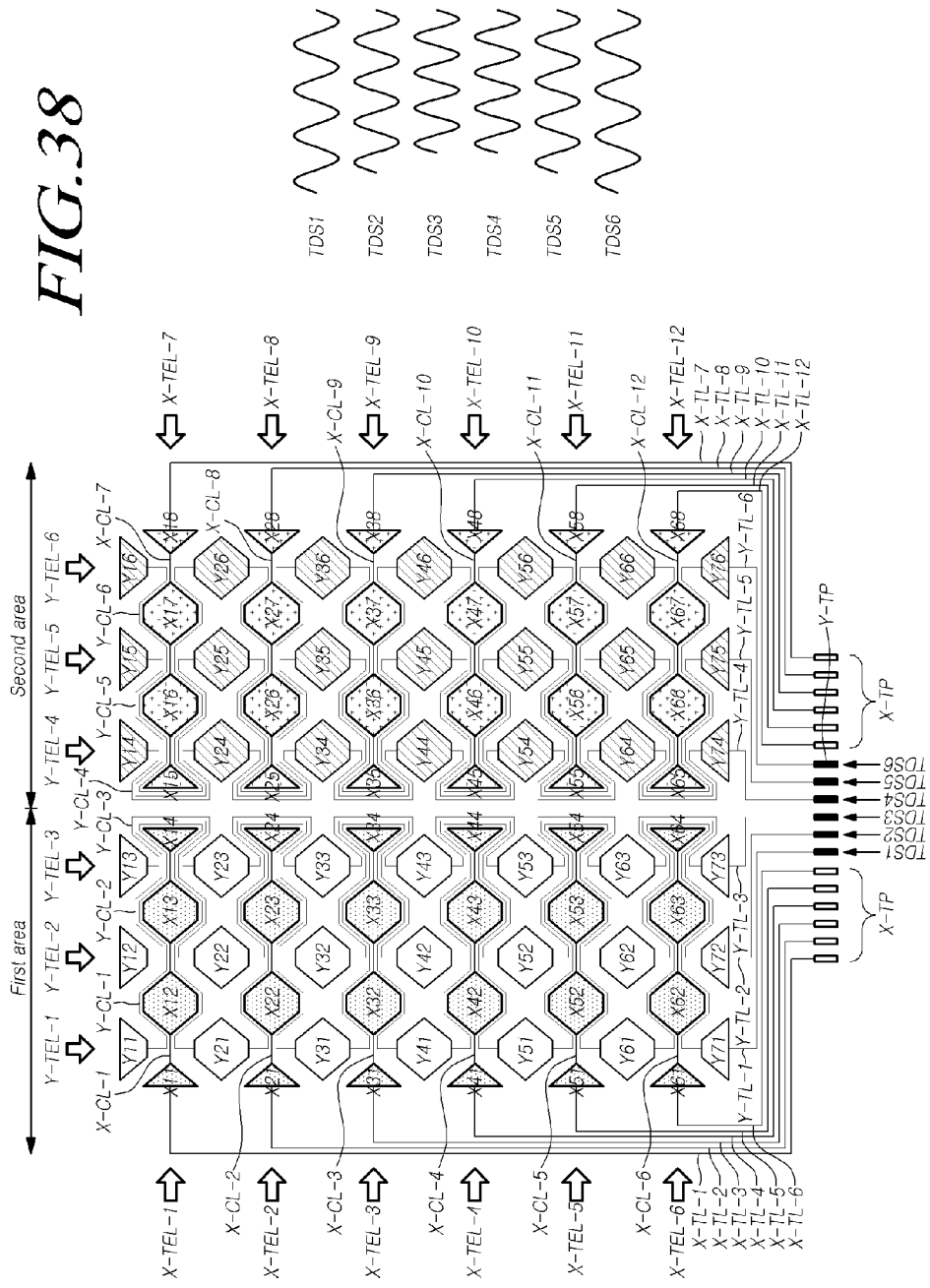

FIGS. 37 and 38 are views for explaining a multi-frequency driving method of a touch display device according to embodiments of the present disclosure.

FIG. 37 is a view for explaining a multi-frequency driving method for an example in which twelve X-touch electrode lines (X-TEL-1 to X-TEL-12) are driving touch electrode lines to which touch driving signals (TDS1 to TDS12) are applied and six Y-touch electrode lines (Y-TEL-1 to Y-TEL-6) are sensing touch electrode lines where touch sensing signals are detected.

Referring to FIG. 37, twelve X-touch electrode lines (X-TEL-1 to X-TEL-12) include six first X-touch electrode lines (X-TEL-1 to X-TEL-6) arranged in the first area and six second X-touch electrode lines (X-TEL-7 to X-TEL-12) arranged in the second area.

The six first X-touch electrode lines (X-TEL-1 to X-TEL-6) arranged in the first area and the six second X-touch electrode lines (X-TEL-7 to X-TEL-12) arranged in the second area have the same or similar signal transmission lengths.

The six first X-touch electrode lines (X-TEL-1 to X-TEL-6) arranged in the first area is connected to six first X-touch routing lines (X-TL-1 to X-TL-6) to correspond thereto. The six second X-touch electrode lines (X-TEL-7 to X-TEL-12) arranged in the second area are connected to six second X-touch routing lines (X-TL-7 to X-TL-12) to correspond thereto.

The six first X-touch routing lines (X-TL-1 to X-TL-6) have different lengths from each other. The six second X-touch routing lines (X-TL-7 to X-TL-12) also have different lengths from each other.

Thus, the six first X-touch routing lines (X-TL-1 to X-TL-6) have different time constants, such as an RC delay, from each other. The six second X-touch routing lines (X-TL-7 to X-TL-12) also have different time constants, such as an RC delay, from each other.

With regard to the first area, among the six first X-touch routing lines (X-TL-1 to X-TL-6), the first X-touch routing line (X-TL-1) having the maximum length may have the largest time constant, and the first X-touch routing line (X-TL-6) having the minimum length may have the smallest time constant.

Accordingly, the touch sensing circuit (TSC) may supply a touch driving signal (TDS1) having the lowest frequency to the first X-touch routing line (X-TL-1) having the largest time constant, and may supply a touch driving signal (TDS6) having the highest frequency to the first X-touch routing line (X-TL-6) having the smallest time constant, among the six first X-touch routing lines (X-TL-1 to X-TL-6).

With regard to the second area, among the six second X-touch routing lines (X-TL-7 to X-TL-12), the second X-touch routing line (X-TL-7) having the maximum length may have the largest time constant, and the second X-touch routing line (X-TL-12) having the minimum length may have the smallest time constant Accordingly, the touch sensing circuit (TSC) may supply a touch driving signal (TDS7) having the lowest frequency to the second X-touch routing line (X-TL-7) having the largest time constant, and may supply a touch driving signal (TDS12) having the highest frequency to the second X-touch routing line (X-TL-12) having the smallest time constant, among the six second X-touch routing lines (X-TL-7 to X-TL-12).

In other words, as the X-touch electrode line has a longer X-touch electrode connecting line or has a longer x-touch routing line for a connection with the touch sensing circuit (TSC) in the twelve X-touch electrode lines (X-TEL-1 to X-TEL-12), the frequency of the touch driving signal may be lowered. The length of the signal transmission path may correspond to a value obtained by adding all the lengths of the X-touch electrodes, the lengths of the X-touch electrode connecting lines, and the lengths of the x-touch routing lines.

FIG. 38 is a view for explaining a multi-frequency driving method for an example in which six Y-touch electrode lines (Y-TEL-1 to Y-TEL-6) am driving touch electrode lines to which touch driving signals (TDS1 to TDS6) are applied and twelve X-touch electrode lines (X-TEL-1 to X-TEL-12) are sensing touch electrode lines where touch sensing signals are detected.

Each of the six Y-touch electrode lines (Y-TEL-1 to Y-TEL-6) includes seven Y-touch electrodes and Y-touch electrode connecting lines for connecting the same.

The Y-touch electrode connecting line (Y-CL-1) for connecting seven Y-touch electrodes (Y11, Y21, Y31, Y41, Y51, Y61, and Y71) included in the outermost Y-touch electrode line (Y-TEL-1), among the Y-touch electrode connecting lines (Y-CL-1, Y-CL-2, and Y-CL-3) included in three Y-touch electrode lines (Y-TEL-1, Y-TEL-2, and Y-TEL-3) arranged in the first area, is the longest. In addition, the Y-touch electrode connecting line (Y-CL-3) for connecting seven Y-touch electrodes (Y13, Y23, Y33, Y43, Y53, Y63, and Y73) included in the Y-touch electrode line (Y-TEL-3) closest to the second area is the shortest.

Therefore, the three Y-touch electrode lines (Y-TEL-1, Y-TEL-2, and Y-TEL-3) arranged in the first area have different time constants, such as an RC delay, from each other depending on the difference in the length between the Y-touch electrode connecting lines (Y-CL-1, Y-CL-2, and Y-CL-3).

Similarly, the three Y-touch electrode lines (Y-TL-4, Y-TEL-5, and Y-TEL) arranged in the second area have different time constants, such as RC delay.

Among the three Y-touch electrode lines (Y-TEL-1, Y-TEL-2, and Y-TEL-3) arranged in the first area, the Y-touch electrode line (Y-TEL-1) including the longest Y-touch electrode connecting line (Y-CL-1) may have the largest time constant, and the Y-touch electrode line (Y-TEL-3) including the shortest Y-touch electrode connecting line (Y-CL-3) may have the smallest time constant.

Accordingly, the touch sensing circuit (TSC) may supply a touch driving signals (TDS1) having the lowest frequency to the Y-touch electrode line (Y-TEL-1) having the largest time constant, and may supply a touch driving signals (TDS3) having the highest frequency to the Y-touch electrode line (Y-TEL-3) having the smallest time constant, among the three Y-touch electrode lines (Y-TEL-1, Y-TEL-2, and Y-TEL-3) arranged in the first area.

Among the three Y-touch electrode lines (Y-TEL-4, Y-TEL-5, and Y-TEL-6) arranged in the second area, the Y-touch electrode line (Y-TEL-6) including the longest Y-touch electrode connecting line (Y-CL-6) may have the largest time constant, and the Y-touch electrode line (Y-TEL-4) including the shortest Y-touch electrode connecting line (Y-CL-4) may have the smallest time constant.

Accordingly, the touch sensing circuit (TSC) may supply a touch driving signals (TDS6) having the lowest frequency to the Y-touch electrode line (Y-TEL-6) having the largest time constant, and may supply a touch driving signals (TDS4) having the highest frequency to the Y-touch electrode line (Y-TEL-4) having the smallest time constant, among the three Y-touch electrode lines (Y-TEL-4, Y-TEL-5, and Y-TEL-6) arranged in the second area.

In other words, as the Y-touch electrode line has a longer Y-touch electrode connecting line or has a longer Y-touch routing line for a connection with the touch sensing circuit (TSC) in the six Y-touch electrode lines (Y-TEL-1 to Y-TEL-6), the frequency of the touch driving signal may be lowered. The length of the signal transmission path may correspond to a value obtained by adding all the lengths of the Y-touch electrodes, the lengths of the Y-touch electrode connecting lines, and the lengths of the Y-touch routing lines.

Figure 39:
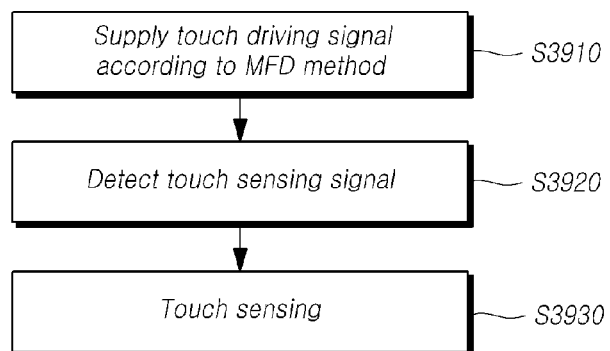
FIG. 39 is a flowchart of a touch sensing method according to embodiments of the present disclosure.

FIG. 39 is a flowchart of a touch sensing method according to embodiments of the present disclosure.

Referring to FIG. 39, a touch sensing method according to embodiments of the present disclosure may include a step (S3910) of supplying a touch driving signal to a plurality of driving touch electrodes by a touch sensing circuit (TSC), a step (S3920) of detecting a touch sensing signal from a plurality of sensing touch electrodes by the touch sensing circuit (TSC), and a step (S3930) of sensing whether or not a touch is performed or the touch position on the basis of the touch sensing signal by the touch sensing circuit (TSC).

The length of the path through which the touch driving signal is transmitted from the touch sensing circuit (TSC) to the first driving touch electrode of the plurality of driving touch electrodes may be different from the length of the path through which the touch driving signal is transmitted from the touch sensing circuit (TSC) to the second driving touch electrode of the plurality of driving touch electrodes.

The touch driving signal supplied to the first driving touch electrode and the touch driving signal supplied to the second driving touch electrode may have different frequencies.

If the path through which the touch driving signal is transmitted from the touch sensing circuit (TSC) to the first driving touch electrode of the plurality of driving touch electrodes is longer than the path through which the touch driving signal is transmitted from the touch sensing circuit (TSC) to the second driving touch electrode of the plurality of driving touch electrodes, the touch driving signal supplied to the first driving touch electrode may have a lower frequency than that of the touch driving signal supplied to the second driving touch electrode.

The path through which the touch driving signal is transmitted to the first driving touch electrode (e.g., Y71) may be longer than the path through which the touch driving signal is transmitted to the second driving touch electrode (e.g., Y72). In this case, the touch driving signal supplied to the first driving touch electrode (e.g., Y71) may have a lower frequency than that of the touch driving signal supplied to the second driving touch electrode (e.g., Y72).

The touch driving signal supplied to the first driving touch electrode (e.g., Y71) may be applied to another first driving touch electrode (e.g., Y61) through the first driving touch electrode connecting line (Y-CL-1) by surrounding and bypassing the sensing touch electrodes (e.g., X62, X63, and X64).

The touch driving signal supplied to the second driving touch electrode (e.g., Y72) may be applied to another second driving touch electrode (e.g., Y62) through the second driving touch electrode connecting line (Y-CL-2) by surrounding and bypassing the sensing touch electrodes (e.g., X63 and X64).

As described above, it is possible to prevent deterioration of touch sensitivity due to the difference in the length between the signal transmission paths according to a single-layered touch sensor structure using a multi-frequency driving method in which the frequency of a touch driving signal varies.

According to the embodiments of the present disclosure described above, it is possible to provide a touch display device having a touch sensor structure that enables a simple manufacturing process, a high manufacturing yield, and a low manufacturing cost, and a touch sensing method thereof.

According to the embodiments of the present disclosure, it is possible to provide a touch display device having a single-layered touch sensor structure and a touch sensing method thereof.

According to the embodiments of the present disclosure, it is possible to provide a touch display device having a touch sensor structure capable of reducing the number of mask processes and a touch sensing method thereof.

According to the embodiments of the present disclosure, it is possible to provide a touch display device having a touch sensor structure capable of reducing the number of touch pads and a touch sensing method thereof.

According to the embodiments of the present disclosure, it is possible to provide a touch display device a touch sensing method capable of preventing deterioration of touch sensitivity even if there is the difference in the length between the signal transmission paths in a touch sensor structure.

According to the embodiments of the present disclosure, it is possible to provide a touch display device a touch sensing method capable of eliminating the imbalance in the area between the touch electrodes in the central area, thereby improving touch sensitivity.

The above description and the accompanying drawings merely show the examples of the technical concept of the present disclosure, and thus it will be apparent to those skilled in the art that various modifications and variations can be made without departing from the essential subject matter of the present disclosure by means of combination, separation, replacement, and alteration of the elements in the present disclosure. Therefore, the embodiments disclosed in the present disclosure are intended to explain the technical concept of the present disclosure, instead of limiting the scope of the same, and thus the scope of the present disclosure is not limited by the embodiments. The scope of protection of the present disclosure should be construed according to the following claims, and all technical ideas within the range of equivalents should be construed as falling within the scope of the present disclosure.

What is claimed is:

1. A touch display device comprising:
   a display panel having a plurality of subpixels arranged therein and having a plurality of touch electrodes arranged therein; and a touch sensing circuit configured to supply a touch driving signal to the display panel and configured to detect a touch sensing signal to thus sense whether or not a touch is performed or a touch position, wherein the plurality of touch electrodes constitute m X-touch electrode lines and n Y-touch electrode lines arranged to intersect each other, where m is an even number as a natural number of 2 or more and n is an even number or an odd number as a natural number of 2 or more, wherein the m X-touch electrode lines comprise m/2 first X-touch electrode lines and m/2 second X-touch electrode lines arranged in a first area and a second area, respectively, which are obtained by dividing the display panel in a first direction, wherein each of the m/2 first X-touch electrode lines comprises a plurality of first X-touch electrodes arranged in the first direction, among the plurality of touch electrodes, and a plurality of first X-touch electrode connecting lines configured to electrically connect the plurality of first X-touch electrodes to each other, wherein each of the m/2 second X-touch electrode lines comprises a plurality of second X-touch electrodes arranged in the first direction, among the plurality of touch electrodes, and a plurality of second X-touch electrode connecting lines configured to electrically connect the plurality of second X-touch electrodes to each other, wherein in a case where n is an odd number, the n Y-touch electrode lines comprise a central Y-touch electrode line arranged in a center, n1 (n1 is a natural number of 1 or more) Y-touch electrode lines arranged in the first area at one side of the central Y-touch electrode line, and n2 (n2 is a natural number of 1 or more, where n1+n2+1=n and n1=n2) Y-touch electrode lines arranged in the second area at the other side of the central Y-touch electrode line, wherein the central Y-touch electrode line comprises a plurality of Y-touch electrodes arranged in a same column in the second direction and a plurality of Y-touch electrode connecting lines configured to electrically connect the plurality of Y-touch electrodes arranged in the same column in the second direction, wherein each of the n1 Y-touch electrode lines comprises a plurality of Y-touch electrodes arranged in the same column in the second direction in the first area and a plurality of Y-touch electrode connecting lines configured to electrically connect the plurality of Y-touch electrodes arranged in the same column in the second direction in the first area, wherein each of the n2 Y-touch electrode lines comprises a plurality of Y-touch electrodes arranged in the same column in the second direction in the second area and a plurality of Y-touch electrode connecting lines configured to electrically connect the plurality of Y-touch electrodes arranged in the same column in the second direction in the second area, wherein a Y-touch electrode connecting line configured to electrically connect a first Y-touch electrode and a second Y-touch electrode, which are adjacent to each other, among a plurality of Y-touch electrodes included in the Y-touch electrode line arranged at an outermost position on one side, among the n1 Y-touch electrode lines arranged in the first area, is arranged so as to surround a whole or a part of one first X-touch electrode line arranged in the first area, and wherein a Y-touch electrode connecting line configured to electrically connect a third Y-touch electrode and a fourth Y-touch electrode, which are adjacent to each other, among a plurality of Y-touch electrodes included in the Y-touch electrode line arranged at the outermost position on the other side, among the n2 Y-touch electrode lines arranged in the second area, is arranged so as to surround a whole or a part of one second X-touch electrode line arranged in the second area.

2. The touch display device of claim 1, wherein first X-touch electrodes adjacent to the central Y-touch electrode line, among the first X-touch electrodes arranged at the outermost positions on both sides in the plurality of first X-touch electrodes included in each of the m/2 first X-touch electrode lines, have an area greater than the first X-touch electrodes arranged at the outermost positions on an opposite side and have an area equal or corresponding to the first X-touch electrodes, which are not arranged at the outermost positions on both sides, and wherein second X-touch electrodes adjacent to the central Y-touch electrode line, among the second X-touch electrodes arranged at the outermost positions on both sides in the plurality of second X-touch electrodes included in each of the m/2 second X-touch electrode lines, have an area greater than the second X-touch electrodes arranged at the outermost positions on the opposite side and have an area equal or corresponding to the second X-touch electrodes, which are not arranged at the outermost positions on both sides.

3. The touch display device of claim 1, wherein a Y-touch electrode connecting line configured to electrically connect a fifth Y-touch electrode and a sixth Y-touch electrode, which are adjacent to each other, among a plurality of Y-touch electrodes included in a Y-touch electrode line adjacent to a Y-touch electrode line arranged at the outermost position on one side in the first area, among the n Y-touch electrode lines, is arranged so as to surround a part of a first X-touch electrode line surrounded by a Y-touch electrode connecting line configured to electrically connect the first Y-touch electrode and the second Y-touch electrode, and wherein a Y-touch electrode connecting line configured to electrically connect a seventh Y-touch electrode and an eighth Y-touch electrode, which are adjacent to each other, among a plurality of Y-touch electrodes included in a Y-touch electrode line adjacent to a Y-touch electrode line arranged at the outermost position on the other side in the second area, among the n Y-touch electrode lines, is arranged so as to surround a part of a second X-touch electrode line surrounded by a Y-touch electrode connecting line configured to electrically connect the third Y-touch electrode and the fourth Y-touch electrode.

4. The touch display device of claim 1, wherein a plurality of Y-touch electrode connecting lines included in the central Y-touch electrode line are arranged between the first area where the m/2 first X-touch electrode lines are arranged and the second area where the m/2 second X-touch electrode lines are arranged.

5. The touch display device of claim 1, wherein a Y-touch electrode connecting line configured to electrically connect the first Y-touch electrode and the second Y-touch electrode, among a plurality of Y-touch electrodes included in a Y-touch electrode line arranged at the outermost position, among the Y-touch electrode lines arranged in the first area, is arranged so as to surround the whole or a part of the first X-touch electrode line arranged between the first Y-touch electrode and the second Y-touch electrode,
  wherein a Y-touch electrode connecting line configured to electrically connect a ninth Y-touch electrode and a tenth Y-touch electrode arranged with the third X-touch electrode line under the first X-touch electrode line interposed therebetween, among a plurality of Y-touch electrodes included in a Y-touch electrode line arranged closest to the second area, among the Y-touch electrode lines arranged in the first area, is arranged so as to surround the whole or a part of the third X-touch electrode line, and
  wherein the Y-touch electrode connecting line arranged so as to surround the whole or a part of the third X-touch electrode line has a length different from the length of the Y-touch electrode connecting line arranged to so as surround the whole or a part of the first X-touch electrode line.

6. The touch display device of claim 1, wherein each of the plurality of touch electrodes is an electrode metal patterned in a form of a mesh to have two or more openings, and each of the two or more openings corresponds to a light-emitting area of one or more subpixels,
  wherein the electrode metal corresponding to each of the plurality of touch electrodes is provided on a bank arranged in an area other than the light-emitting area of the two or more subpixels, and
  wherein the plurality of first X-touch electrode connecting lines, the plurality of second X-touch electrode connecting lines, and the plurality of Y-touch electrode connecting lines are provided on a bank arranged in an area other than the light-emitting area of the plurality of subpixels.

7. The touch display device of claim 6, wherein each of the plurality of touch electrodes has a multi-layered structure, and a transparent electrode is patterned on or under the electrode metal.

8. The touch display device of claim 1, wherein each of the plurality of Y-touch electrode connecting lines is arranged along a path corresponding to outlines of all or some of a plurality of first X-touch electrodes included in the first X-touch electrodes line surrounded by the Y-touch electrode connecting line.

9. The touch display device of claim 1, wherein a blank area, in which no Y-touch electrode connecting line is arranged, is provided around a plurality of first X-touch electrodes included in the first X-touch electrode line, and one or more additional patterns are arranged in the blank area.

10. The touch display device of claim 9, wherein numbers of Y-touch electrode connecting lines arranged around the plurality of first X-touch electrodes included in the first X-touch electrode line are different from each other, and
  wherein numbers of additional patterns arranged in the blank area around the plurality of first X-touch electrodes included in the first X-touch electrode line are different from each other depending on the different numbers of Y-touch electrode connecting lines.

11. The touch display device of claim 9, wherein the one or more additional patterns are in a voltage state corresponding to the touch driving signal or the touch sensing signal, in a voltage state in which a ground voltage or a specific voltage is applied, or in a floating voltage state.

12. The touch display device of claim 9, wherein the one or more additional patterns is electrically connected to Y-touch electrode connecting lines or X-touch electrode connecting lines arranged therearound.

13. The touch display device of claim 1, wherein the m X-touch electrode lines are driving touch electrode lines to which the touch driving signal is applied, and the n Y-touch electrode lines are sensing touch electrode lines where the touch sensing signal is detected, or
  wherein the n Y-touch electrode lines are driving touch electrode lines to which the touch driving signal is applied, and the m X-touch electrode lines are sensing touch electrode lines where the touch sensing signal is detected.

14. The touch display device of claim 1, wherein frequencies of the touch driving signals applied to one or more of the m X-touch electrode lines are different from each other, or
  wherein the frequencies of the touch driving signals applied to one or more of the n Y-touch electrode lines are different from each other.

15. The touch display device of claim 14, wherein as the X-touch electrode line has a longer X-touch electrode connecting line or has a longer X-touch routing line configured to connect the touch sensing circuit, among the m X-touch electrode lines, a frequency of the touch driving signal becomes low, or
  wherein as the Y-touch electrode line has a longer Y-touch electrode connecting line or has a longer Y-touch routing line configured to connect the touch sensing circuit, among the n Y-touch electrode lines, the frequency of the touch driving signal becomes low.

16. The touch display device of claim 1, wherein the display panel further comprises an encapsulation portion arranged on a light-emitting device included in each of the plurality of subpixels, and
  wherein the m X-touch electrode lines and the n Y-touch electrode lines are arranged in a single layer positioned on the encapsulation portion.

17. The touch display device of claim 16, wherein the display panel comprises an active area where an image is displayed and a non-active area outside the active area, and comprises:
  at least one dam positioned in the non-active area or positioned at a boundary between the active area and the non-active area;
  a plurality of X-touch routing lines electrically connected to the m X-touch electrode lines, respectively;
  a plurality of X-touch pads electrically connected to the plurality of X-touch routing lines and arranged in the non-active area;
  a plurality of Y-touch routing lines configured to electrically connect each of the n Y-touch electrode lines; and
  a plurality of Y-touch pads electrically connected to the plurality of Y-touch routing lines and arranged in the non-active area,
  wherein the plurality of X-touch routing lines and the plurality of Y-touch routing lines pass over the side of the encapsulation portion and a top of the at least one dam so as to be electrically connected to the plurality of X-touch pads and the plurality of Y-touch pads positioned in the non-active area.

18. The touch display device of claim 16, wherein the encapsulation portion comprises two or more inorganic encapsulation layers and one or more organic encapsulation layers provided between the two or more inorganic encapsulation layers, and wherein the one or more organic encapsulation layers are provided at one side of the at least one dam or are provided at one side and on a top of the at least one dam.

19. A touch display device comprising:
m X-touch electrode lines; and
n Y-touch electrode lines arranged to intersect the m X-touch electrode lines, where m is an even number as a natural number of 2 or more and n is an even number or an odd number as a natural number of 2 or more,
wherein each of the m X-touch electrode lines comprises a plurality of X-touch electrodes arranged in a first direction and a plurality of X-touch electrode connecting lines configured to electrically connect the plurality of X-touch electrodes to each other,
wherein each of the n Y-touch electrode lines comprises a plurality of Y-touch electrodes arranged in a second direction different from the first direction and a plurality of Y-touch electrode connecting lines configured to electrically connect the plurality of Y-touch electrodes to each other,
wherein the plurality of Y-touch electrode connecting lines configured to electrically connect the plurality of Y-touch electrodes arranged in the second direction to each other and the plurality of X-touch electrode connecting lines configured to electrically connect the plurality of X-touch electrodes arranged in the first direction to each other are provided in a same layer, and
wherein the plurality of Y-touch electrode connecting lines configured to electrically connect the plurality of Y-touch electrodes arranged in the second direction to each other comprises a Y-touch electrode connecting line arranged so as to bypass in the first direction and surround one or more X-touch electrodes to thus connect two Y-touch electrodes, which are adjacent to each other in the second direction, and a Y-touch electrode connecting line configured to directly connect two Y-touch electrodes, which are adjacent to each other in the second direction.

* * * * *